US012754565B2

(12) United States Patent
Besley et al.

(10) Patent No.: US 12,754,565 B2
(45) Date of Patent: Oct. 6, 2026

(54) SYSTEM AND ASSOCIATED METHODOLOGY FOR ADAPTIVE AERIAL SURVEY

(71) Applicant: Nearmap Australia Pty Ltd., Barangaroo (AU)

(72) Inventors: James Austin Besley, Barangaroo (AU); Robert Alan Mitchell, Barangaroo (AU); Mark Harold Tarlinton, Barangaroo (AU); Dawid Oosthuizen, Barangaroo (AU); Andrew Millin, Barangaroo (AU); Tom Celinski, Barangaroo (AU)

(73) Assignee: NEARMAP AUSTRALIA PTY LTD., Barangaroo (AU)

( * ) Notice: Subject to any disclaimer, the term of this patent is extended or adjusted under 35 U.S.C. 154(b) by 27 days.

(21) Appl. No.: 18/917,197

(22) Filed: Oct. 16, 2024

(65) Prior Publication Data

US 2025/0123632 A1 Apr. 17, 2025

Related U.S. Application Data

(60) Provisional application No. 63/544,262, filed on Oct. 16, 2023.

(51) Int. Cl.
*G05D 1/689* (2024.01)
*G01C 11/02* (2006.01)
(Continued)

(52) U.S. Cl.
CPC ......... *G05D 1/6445* (2024.01); *G01C 11/025* (2013.01); *G05D 1/689* (2024.01);
(Continued)

(58) Field of Classification Search
CPC .. G05D 1/6445; G05D 1/689; G05D 2111/30; G05D 2109/20; G05D 2105/87;
(Continued)

(56) References Cited

U.S. PATENT DOCUMENTS 5,894,323 A * 4/1999 Kain ...................... G01C 11/02 348/116
11,222,204 B2 * 1/2022 Wagner ................ G01C 11/025
(Continued)

FOREIGN PATENT DOCUMENTS

WO WO-2020164092 A1 * 8/2020 ............. G06V 20/17

OTHER PUBLICATIONS

Cabreira, Survey on Coverage Path Planning with Unmanned Aerial Vehicles, Jan. 3, 2019, MDPI, Drones (Year: 2019).*

*Primary Examiner* — Matthias S Weisfeld
(74) *Attorney, Agent, or Firm* — XSENSUS LLP

(57) ABSTRACT

A method of performing an adaptive aerial survey includes capturing images of a target area, by at least one camera system disposed on an aerial vehicle, as the aerial vehicle travels along a flight map that includes a plurality of flight lines. The method also includes determining coverage of the target area based on the images captured by the at least one camera system, and adjusting at least one of the flight map and an orientation of the at least one camera system based on the coverage of the target area determined based on the images captured by the at least one camera system. The method can be performed by a control system including circuitry to perform the above steps.

17 Claims, 64 Drawing Sheets

(51) Int. Cl.

| | |
|---|---|
| ***G05D 1/644*** | (2024.01) |
| ***G05D 109/20*** | (2024.01) |
| ***G06Q 40/08*** | (2012.01) |
| ***G06Q 50/16*** | (2024.01) |
| ***G06V 20/17*** | (2022.01) |
| *G05D 105/80* | (2024.01) |
| *G05D 111/10* | (2024.01) |
| *G05D 111/30* | (2024.01) |
| *G05F 1/644* | (2006.01) |

(52) U.S. Cl.
CPC ............. *G06Q 40/08* (2013.01); *G06Q 50/16* (2013.01); *G06V 20/17* (2022.01); *G05D 2105/87* (2024.01); *G05D 2109/20* (2024.01); *G05D 2111/10* (2024.01); *G05D 2111/30* (2024.01)

(58) Field of Classification Search
CPC .. G05D 2111/10; G06V 20/17; G01C 11/025; G06Q 40/08; G06Q 50/16
USPC .............................................................. 701/3
See application file for complete search history.

(56) References Cited

U.S. PATENT DOCUMENTS

| | | | | |
|---|---|---|---|---|
| 2017/0061249 | A1* | 3/2017 | Estrada | G06V 10/454 |
| 2017/0061625 | A1* | 3/2017 | Estrada | G06V 10/774 |
| 2020/0210676 | A1* | 7/2020 | Barnea | G01C 11/02 |
| 2024/0111147 | A1* | 4/2024 | Barnea | H04N 23/60 |
| 2024/0263964 | A1* | 8/2024 | Kapil | G01C 21/3415 |

* cited by examiner

SYSTEM AND ASSOCIATED METHODOLOGY FOR ADAPTIVE AERIAL SURVEY

CROSS-REFERENCE TO RELATED APPLICATIONS

The present application is related, and claims priority, to U.S. Provisional Application No. 63/544,262, filed on Oct. 16, 2023. This application is also related to U.S. Non-Provisional application Ser. No. 18/797,590, filed Aug. 8, 2024, and International Application No. PCT/AU2024/050851, filed Aug. 9, 2024. The entire contents of all prior applications are hereby incorporated by reference.

BACKGROUND

Technical Field

The present disclosure relates to systems and methods for aerial surveys, and specifically for systems and methods for adaptive aerial surveys that adapt aerial survey parameters in response to changing conditions.

Discussion of Background

Aerial surveys are typically performed using a camera system mounted on an aircraft, manned or unmanned, that files along a specific flight path as the camera system captures images at predetermined time intervals. For the sake of efficiency, camera systems used in aerial surveys may be able to capture sets of images, including both oblique and nadir images. This results in a large amount of data captured during an aerial survey flight; data that, because of its size, is not typically reviewed until the aircraft has completed the flight and returned to the airport.

Frequently, changing conditions during an aerial survey flight can impact the quality of image capture. For example, a cloud may obstruct a line of sight (LOS) of the camera, turbulence may cause the airplane to move suddenly and unpredictably and blur one or more images and so on. However, because the captured images are not typically reviewed until after the aerial survey flight is completed, identifying and retaking defective images that may be unacceptable for use involves planning another aerial survey flight. This results in added cost and delay in completing the aerial survey.

Accordingly, there is a need for systems and methods capable of adapting to changing conditions to either prevent defective imagery or to retake images while the aircraft is still performing the aerial survey.

SUMMARY

In an exemplary aspect, a method of performing an adaptive aerial survey includes capturing images of a target area, by at least one camera system disposed on an aerial vehicle, as the aerial vehicle travels along a flight map that includes a plurality of flight lines. The method also includes determining coverage of the target area based on the images captured by the at least one camera system, and adjusting at least one of the flight map and an orientation of the at least one camera system based on the coverage of the target area determined based on the images captured by the at least one camera system.

In an exemplary aspect, a non-transitory computer-readable medium stores computer-readable instructions that, when executed by processing circuitry, cause the processing circuitry to perform a method that includes capturing images of a target area, by at least one camera system disposed on an aerial vehicle, as the aerial vehicle travels along a flight map that includes a plurality of flight lines. The method also includes determining coverage of the target area based on the images captured by the at least one camera system and/or associated data, and adjusting at least one of the flight map, an orientation of the at least one camera system, a priority queue of image captures, or one or more key parameters of the image capture based on the coverage of the target area determined based on the images captured by the at least one camera system.

In an exemplary aspect, a control system for controlling adaptive aerial surveys, includes circuitry that captures images of a target area, by at least one camera system disposed on an aerial vehicle, as the aerial vehicle travels along a flight map that includes a plurality of flight lines. The circuitry also determines coverage of the target area based on the images captured by the at least one camera system and/or associated data, and adjusts at least one of the flight map, an orientation of the at least one camera system, a priority queue of image captures, or one or more key parameters of the image capture based on the coverage of the target area determined based on the images captured by the at least one camera system.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1A:
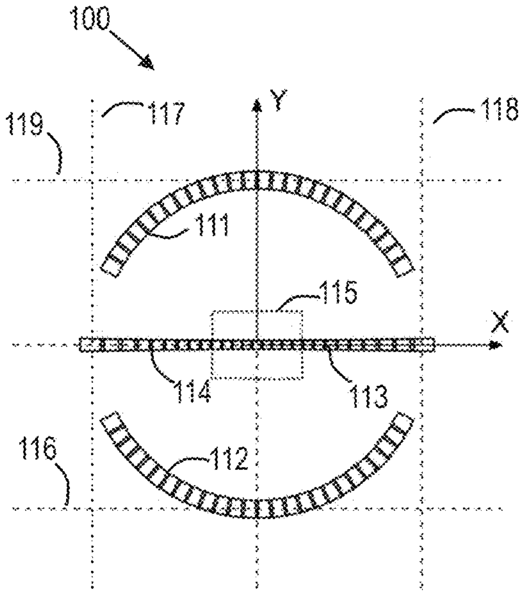
FIG. 1*a* illustrate scan patterns for a scanning camera system according to exemplary aspects of the present disclosure.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

A camera system may include one or more cameras mounted in or on a vehicle, for example on a stabilization platform such as a gimbal or more directly to the body of the vehicle. A scanning camera system may include multiple cameras and coupled beam steering mechanisms mounted in or on a vehicle. For example, a scanning camera system may be mounted within a survey hole of an aerial vehicle or in an external space such as a pod. For the sake of clarity, an aerial vehicle will be used to facilitate discussion of the various embodiments presented herein, though it can be appreciated by one of skill in the art that the vehicle is not limited to being an aerial vehicle. Examples of aerial vehicles include, but are not limited to airplanes, drones, unmanned aerial vehicles (UAV), airships, helicopters, quadcopters, balloons, spacecraft and satellites.

The scanning camera system is controlled to capture a series of images of an object area (typically the ground) as the aerial vehicle follows a path over a survey region. Each image captures a projected region on the object area with an elevation angle (the angle of the central ray of the image or 'line of sight' (LOS) to the horizontal plane) and an azimuthal angle (the angle of the central ray around the vertical axis relative to a defined zero azimuth axis). The elevation may also be expressed in terms of the obliqueness (the angle of the central ray of the image or LOS to the vertical axis), so that vertical imagery with a high elevation corresponds to a low obliqueness and an elevation of 90° corresponds to an obliqueness of 0°. This disclosure uses the ground as the exemplary object area for various embodiments discussed herein, but it can be appreciated that the object does not have to be a ground in other embodiments. For example, the exemplary object area may also include parts of buildings, bridges, walls, other infrastructure, vegetation, natural features such as cliffs, bodies of water, or any other object imaged by the scanning camera system.

The images captured by a scanning camera system may be used to create a number of image derived products including: photomosaics including orthomosaic and panoramas; oblique imagery; 3D models (with or without texture); and raw image viewing tools. It is noted that the term photomap is used interchangeably with photomosaic in the description below. These may be generated by fusing multiple captured images together, for example taking into account photogrammetric information such as camera pose (position and orientation) information at the time of capture. Further image derived products may include products generated by detecting, measuring, and/or classifying objects or features in images. For example, this may include determining the location, extent, shape, condition and makeup of property features (e.g., roofing, decking, swimming pools, etc.), roads, utilities, vegetation etc. The processing may use suitable techniques including machine learning, artificial intelligence (AI), computer vision and the like. It may analyze captured images directly or other image derived products (e.g., photomaps or 3D models). The processing may use other sources of information in addition to image data, for example geospatial data, property data, insurance data, etc.

The calculation of the projected geometry on the object area from a camera may be performed based on the focal length of the lens, the size of the camera sensor, the location and orientation of the camera, distance to the object area and the geometry of the object area. The calculation may be refined based on nonlinear distortions in the imaging system such as barrel distortions, atmospheric effects and other corrections. Furthermore, if the scanning camera system includes beam steering elements, such as mirrors, then these must be taken into account in the calculation, for example by modelling a virtual camera based on the beam steering elements to use in place of the actual camera in the projected geometry calculation.

A scanning camera system may include one or more scan drive units, each of which includes a scanning element such as a scanning mirror to perform beam steering. The drive unit may also include any suitable rotating motor (such as a piezo rotation stage, a stepper motor, DC motor or brushless motor) coupled by a gearbox, direct coupled or belt driven, to drive the scanning mirror. Alternatively, the scanning mirror may be coupled to a linear actuator or linear motor via a gear. Each scan drive unit also includes a lens to focus light beams onto one or more camera sensors. As one of ordinary skill would recognize, the lens may be any one of a dioptric lens, a catoptric lens, and a catadioptric lens. Each scan drive unit also includes one or more cameras that are configured to capture a series of images, or frames, of the object area. Each frame has a view elevation and azimuth determined by the scan drive unit geometry and scan angle, and may be represented on the object area by a projected geometry. The projected geometry is the region on the object area imaged by the camera.

Figure 1B:
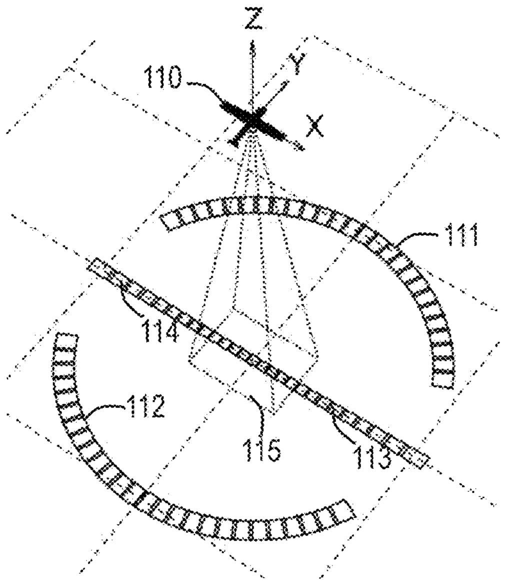
FIG. 1*b* illustrates a perspective view of scan patterns for a scanning camera system according to exemplary aspects of the present disclosure.

The projected geometry of a sequence of frames captured by a scan drive unit may be combined to give a scan pattern, also referred to as a coverage pattern. Referring now to the drawings, where like reference numerals designate identical or corresponding parts throughout the several views, FIG. 1*a* illustrates scan patterns for a scanning camera system 100 with three scan drive units from a top down view. FIG. 1*b* illustrates the same scan patterns from a perspective view and also illustrates an aerial vehicle 110. It is noted that the frames in the scan patterns in FIG. 1*a* and FIG. 1*b* are all are captured for the same aerial vehicle 110 location. However, in real-world systems, the aerial vehicle 110 will move between frame captures as will be discussed later. The x- and y-axes in the scan patterns of FIG. 1*a* and FIG. 1*b* meet at the location on the ground directly under the aerial vehicle 110. The grid lines 117, 118 correspond to a distance to the left and right of the aerial vehicle 110 equal to the altitude of the aerial vehicle 110. Similarly, the grid lines 119, 116 correspond to a distance forward and behind the aerial vehicle 110 equal to the altitude of the aerial vehicle 110. The two curved scan patterns 111, 112 correspond to the two cameras of a scan drive unit 101, which may be a single scan drive unit, while the two scan patterns 113, 114 are symmetric about the y-axis and correspond to the single camera of each of two other scan drive units 102 and 103. The dashed single projective geometry 115 corresponds to a fixed lower resolution overview camera image.

The aerial vehicle 110 may capture images while tracking a set of flight lines over a survey region. The survey lines might be a set of parallel lines such as the seven lines numbered 0 to 7 in FIG. 3*a*. In order to capture a set of parallel flight lines efficiently, the aerial vehicle 110 may take a serpentine path such as that illustrated in FIG. 3*c*, where adjacent flight lines are captured in sequence, and neighboring flight lines are captured in opposing directions connected by short corners. The trajectory of the corners may be limited by the dynamics of the aerial vehicle 110, i.e., how tightly it can turn, etc. The serpentine flight path is characterized by a flight line spacing that is the spacing of adjacent flight lines (0 to 1, 1 to 2, etc.) perpendicular to the flight direction. In general, the flight path and its parameters such as flight line spacing are fixed, but these may be adaptive as will be discussed in further detail below. Furthermore, depending on the performance of the aerial vehicle during capture, the environment and other factors, the order of capture of the flight lines of a survey may not be simple or sequential, and some flight lines may be captured in shorter segments. It is further noted that the combined width of the scan patterns may be wider, or much wider than the flight line spacing for some camera systems, for example for systems that capture both oblique and vertical imagery. However, the combined width of the scan patterns may also be narrower or have the same width as the flight line spacing without departing from the scope of the present disclosure.

Each scan pattern is repeated as the aerial vehicle 110 moves along its flight path over the survey area to give a dense coverage of the scene in the survey area with a suitable overlap of captured images for photogrammetry, forming photomosaics such as orthomosaics (also referred to as vertical photomap herein) or panoramas (also referred to as oblique photomaps herein), as well as other uses. Across the flight line this can be achieved by setting the scan angles of frames within a scan pattern close enough together. Along the flight lines this can be achieved by setting a forward spacing between scan patterns (i.e. sets of frames captured as the scan angle is varied) that is sufficiently small. The timing constraints of each scan drive unit may be estimated based on the number of frames per scan pattern, the forward spacing and the speed of the aerial vehicle over the ground. The constraints may include a time budget per frame capture and a time budget per scan pattern.

Figure 1C:
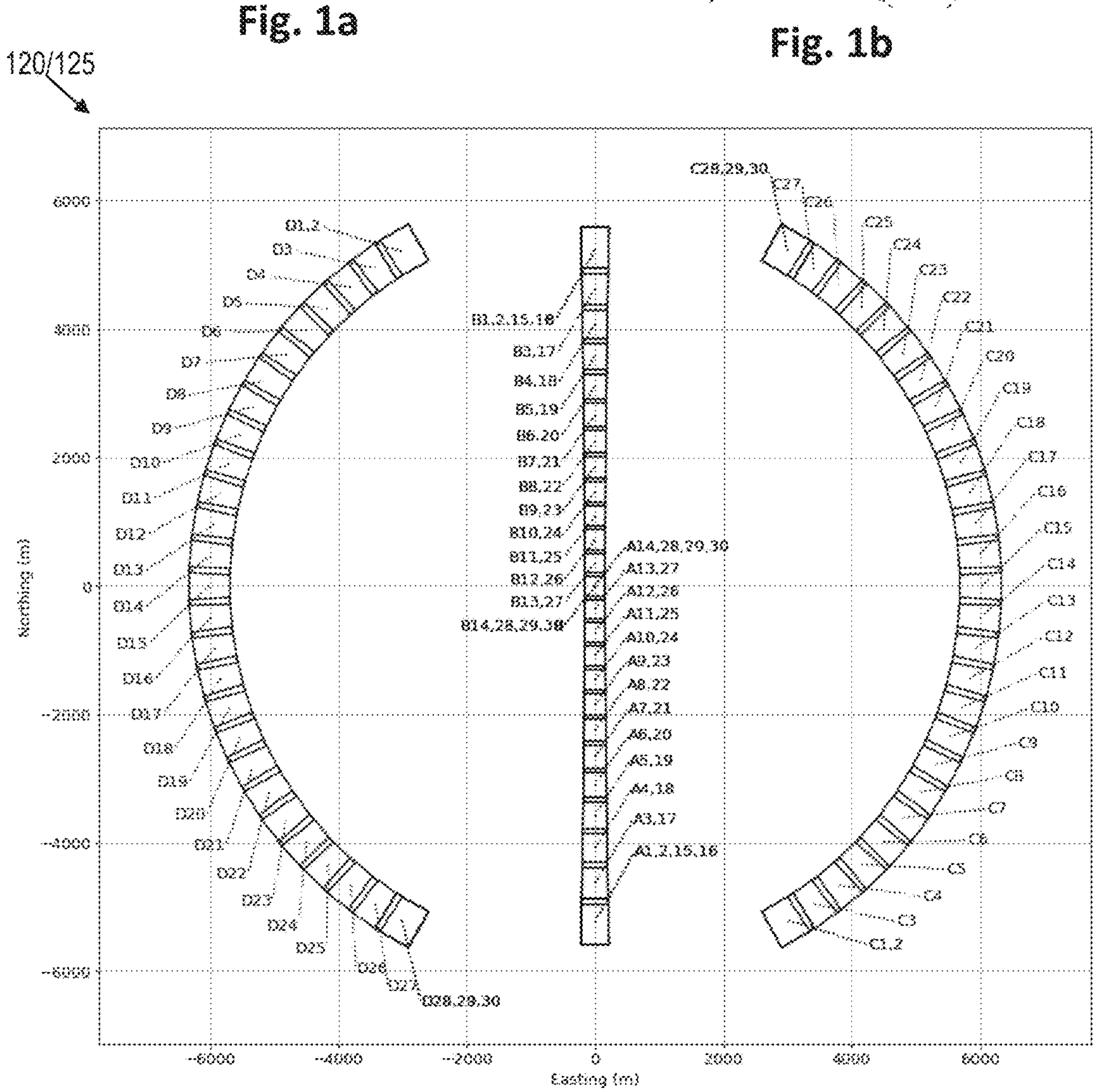
FIG. 1*c* is a ground projection of a hypershot from a scanning camera system according to exemplary aspects of the present disclosure.

A set of frames, as seen in the scan pattern of FIG. 1*a* or FIG. 1*b*, may be referred to as a hypershot, and the time budget for the frames of the scan pattern as a hypershot time. FIG. 1*c* illustrates the ground projection for a set of frames of a hypershot for camera system 120 configured to capture frames according to an alternative set of mirror angle settings. The scan pattern shown in FIG. 1*c* assumes that the aerial vehicle 110 is located at 6000 meters (m) above the ground at the origin, and that it does not move between frame captures. The projection geometry of a camera system may be determined based on the camera position and orientation relative to the ground. The calculation may use ray tracing techniques and may depend on the orientations and parameters of optical components at the time of capture (e.g., sensor geometry, lens focal length, mirror orientations, etc.). It may also use information related to the height of the ground, obtained for example from a digital elevation map (DEM). A full projection geometry may be computed based on the full size of the sensor capturing images, or a reduced projection may be obtained based on a reduced sensor size where a region around the outside of the sensor is excluded from the projection based on assumed overlap requirements. The geometry of the components installed in the camera system may be known from manufacturing designs and/or measurements. Alternatively, they may be inferred using photogrammetric techniques to analyze image and other data from the current or previously flown surveys, which may be advantageous in terms of accuracy. The photogrammetry may be performed either in flight on the aerial vehicle or remotely and may use images at multiple resolutions. The geometry and/or photogrammetry data for the camera system may be pre-stored on the aerial vehicle prior to the flight or loaded via a communications link (e.g., 420 of FIG. 4 discussed below). The geometry may be fixed over a flight or may be expressed as a function of factors such as temperature and pressure over one or more locations around the camera system. For example, the focal length, focal and principal plane positions and geometry, principal point, distortion parameters, and other parameters of a lens, may be expressed as polynomial or interpolation functions of temperature and pressure.

The parameters and use of the captured frames for hypershot configuration 125 are presented in Tables 1 to 5. Exposure frames are primarily used to refine the exposure of subsequent frames, focus frames are used to refine the focus of subsequent frames, while publishable frames are intended for use, for example as reference images, or to generate image derived products. In some configurations, a small random offset is included in the scan angles applied to the scanning mirrors in order to improve the reliability of the mirror drives over many surveys. Further, in some configurations, the random offsets for various scan angles may be defined in order to maintain a suitable expected overlap between projections on the ground. For example, the random offset changes minimally or does not change at all between frames captured as part of the same sweep of a scan drive within a hypershot scan in order to maintain a suitable overlap between captured images throughout the sweep. For example, the random offsets for the frames corresponding to the cameras of scan drive units 102 and 103 given in Table 1 and 2 may be offset by the same magnitude in the same direction on the ground by offsetting the obliqueness angles in the opposite direction. In some configurations, the order of frames in the hypershot is modified to improve some aspect of the performance. For example, the final publishable frame may be captured between two focus frames in order to reduce the total movement of the focus mechanism. In some configurations, additional repeat frames may be added at the same line of sight with longer or shorter exposure times that may be used to generate higher dynamic range publishable content or for use in content-based exposure control.

TABLE 1

| Hypershot configuration 125 for camera of scan drive unit 102 of camera system 120 | | | |
|---|---|---|---|
| Frames | Azimuth (°) | Obliqueness (°) | Comment |
| A1 | 270 | 41.5 | Exposure |
| A2-A14 | 270 | 41.5 to 0 | Publishable (including vertical photomap) |
| A15 | 270 | 41.5 | Exposure |
| A16-A28 | 270 | 41.5 to 0 | Publishable (including vertical photomap) |
| A29-A30 | 270 | 0 | Focus |

TABLE 2

| Hypershot configuration 125 for camera of scan drive unit 103 of camera system 120 | | | |
|---|---|---|---|
| Frames | Azimuth (°) | Obliqueness (°) | Comment |
| B1 | 90 | 41 | Exposure |
| B2-B14 | 90 | 41 to 0 | Publishable (including vertical photomap) |
| B15 | 90 | 41 | Exposure |
| B16-B28 | 90 | 41 to 0 | Publishable (including vertical photomap) |
| B29-B30 | 90 | 0 | Focus |

TABLE 3

| Hypershot configuration 125 for first camera of scan drive unit 101 of camera system 120 | | | |
|---|---|---|---|
| Frames | Azimuth (°) | Obliqueness (°) | Comment |
| C1 | 30 | 45 | Exposure |
| C2-C28 | 30-150 | 45 | Publishable (including oblique photomaps) |
| C29-C30 | 150 | 45 | Focus |

TABLE 4

| Hypershot configuration 125 for second camera of scan drive unit 101 of camera system 120 | | | |
|---|---|---|---|
| Frames | Azimuth (°) | Obliqueness (°) | Comment |
| D1 | 210 | 45 | Exposure |
| D2-D28 | 210-330 | 45 | Publishable (including oblique photomaps) |
| D29-D30 | 330 | 45 | Focus |

TABLE 5

| Hypershot configuration 125 for fixed cameras of camera system 120. There are two fixed cameras, one red-green-blue (RGB) and one infrared (IR). The projection geometry for the fixed cameras is not shown in FIG. 1c. | | | |
|---|---|---|---|
| Frames | Azimuth (°) | Obliqueness (°) | Comment |
| 1 | 0 | 0 | Publishable overview (NIR) |
| 2-3 | 0 | 0 | Focus (optional) |

Figure 1D:
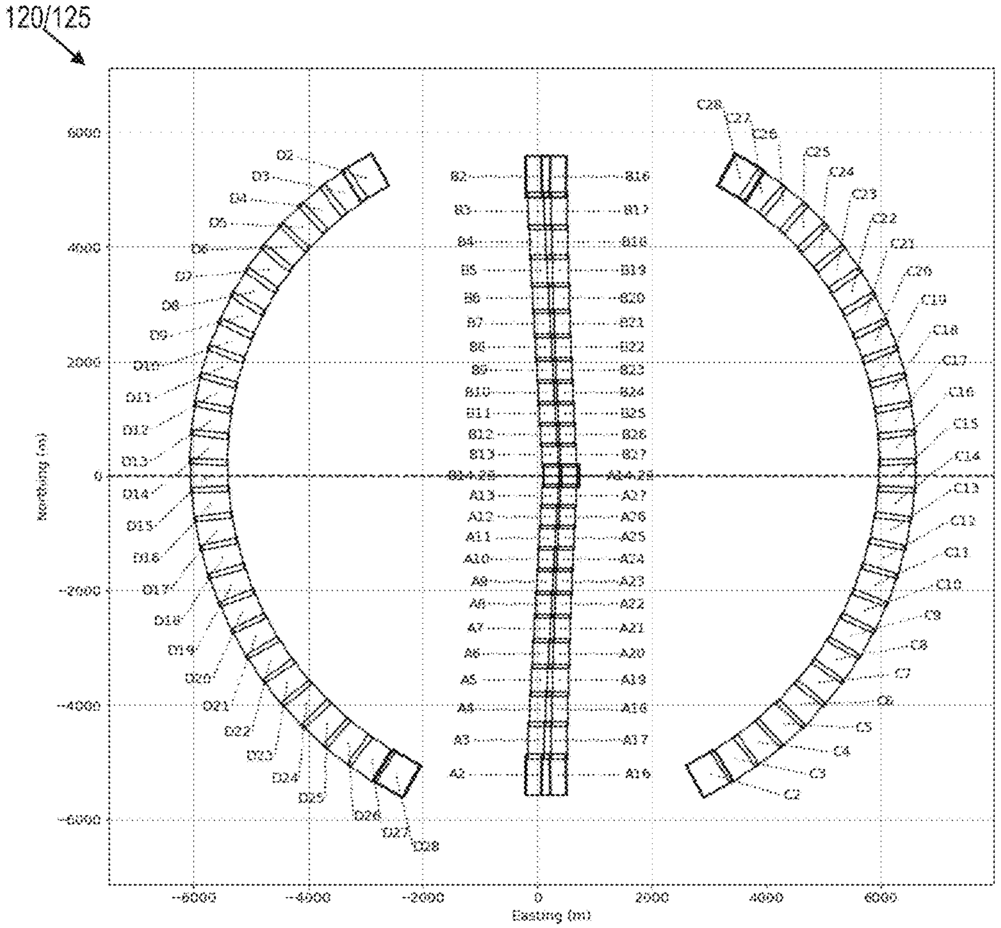
FIG. 1*d* is another ground projection of a hypershot according to exemplary aspects of the present disclosure.

It is noted that in FIG. 1*c*, a number of frames are superimposed as the scan pattern was generated assuming that the aerial vehicle is not moving. FIG. 1*d* shows the hypershot frames with the aerial vehicle moving to the east at a speed of 100 m/s and with a time of 200 ms between frame captures. The system may also operate with a variable time between frames to allow for different magnitudes of mirror movements. It can be beneficial to capture groups of frames of the scan patterns at a rate that is faster than the average hypershot time budget per frame as will be discussed in more detail with respect to FIG. 11 below.

Figure 1E:
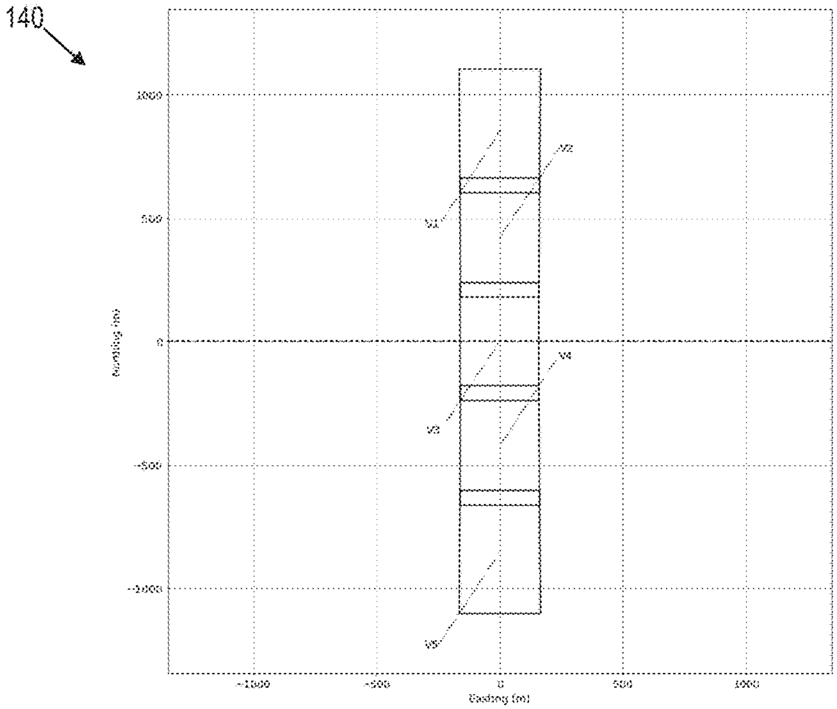
FIG. 1*e* is an alternative scan pattern for a fixed camera system according to exemplary aspects of the present disclosure.

FIG. 1*e* shows the scan pattern for an alternative camera system 140 with 5 fixed cameras suitable for capturing vertical images mounted on an aerial vehicle at altitude of 4000 m above ground level. The cameras V1 to V5 are oriented between −12 and +12 degrees relative to nadir. The system may use an autofocus mechanism, a fixed focus or may use a focus algorithm.

Figure 1F:
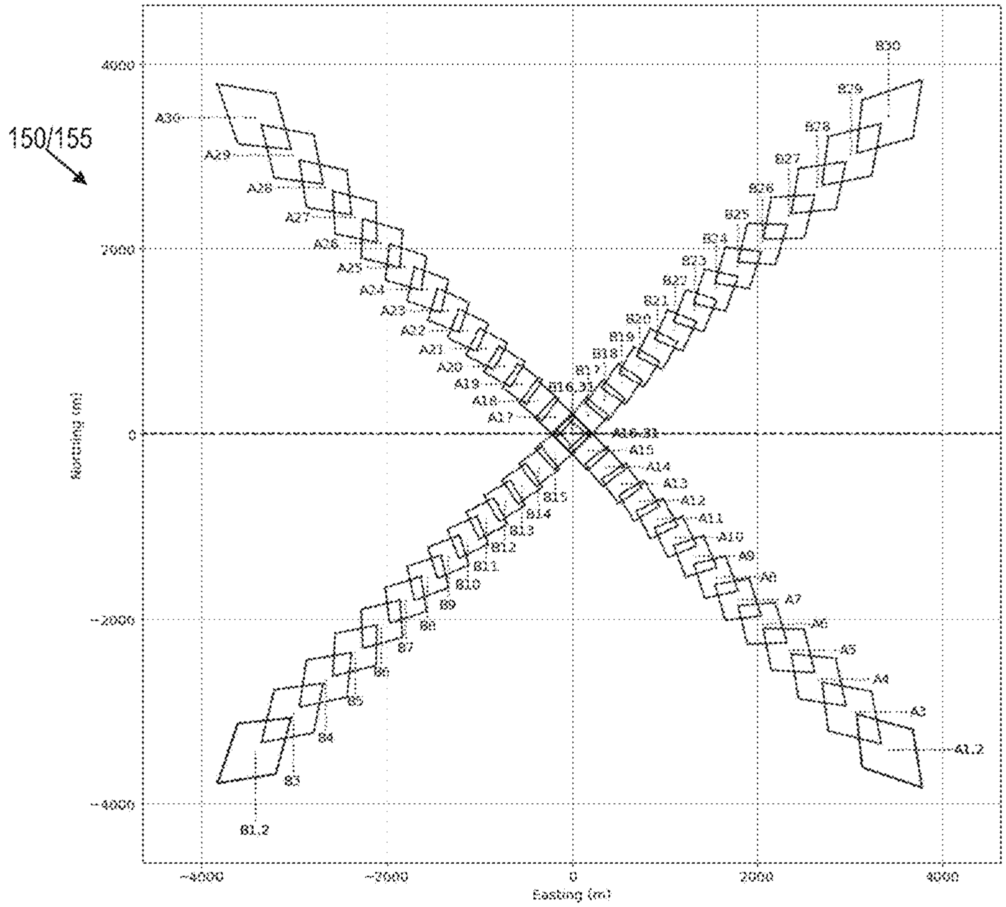
FIG. 1*f* is another alternative scan pattern for a camera system including both fixed and scanning cameras according to exemplary aspects of the present disclosure.

FIG. 1*f* shows the scan pattern for an alternative camera system with two scanning cameras and one fixed camera suitable for capture of vertical and oblique imagery mounted on an aerial vehicle at altitude of 4000 m above ground level. Tables 6 and 7 give the hypershot configurations 155 of the first 411 and second 412 scan drive units respectively. The projection geometry for the fixed cameras is not shown in FIG. 1*f*, but may be of square or rectangular geometry depending on the choice of sensor.

TABLE 5

| Hypershot configuration 155 for camera of scan drive unit 151 of camera system 150 | | | |
|---|---|---|---|
| Frames | Azimuth (°) | Obliqueness (°) | Comment |
| A1 | 315 | 51.3 | Exposure |
| A2-A16 | 315 | 51.3 to 0 | Publishable (incl. vertical & photomaps) |
| A17-A28 | 135 | 3.6 to 51.3 | Publishable (incl. vertical & photomaps) |
| A29-A30 | 135 | 0 | Focus |

TABLE 6

| Hypershot configuration 155 for camera of scan drive unit 152 of camera system 150 | | | |
|---|---|---|---|
| Frames | Azimuth (°) | Obliqueness (°) | Comment |
| B1 | 225 | 51.3 | Exposure |
| B2-B16 | 225 | 51.3 to 0 | Publishable (incl. vertical & photomaps) |
| B17-B28 | 45 | 3.6 to 51.3 | Publishable (incl. vertical & photomaps) |
| B29-B30 | 45 | 0 | Focus |

Figure 1G:
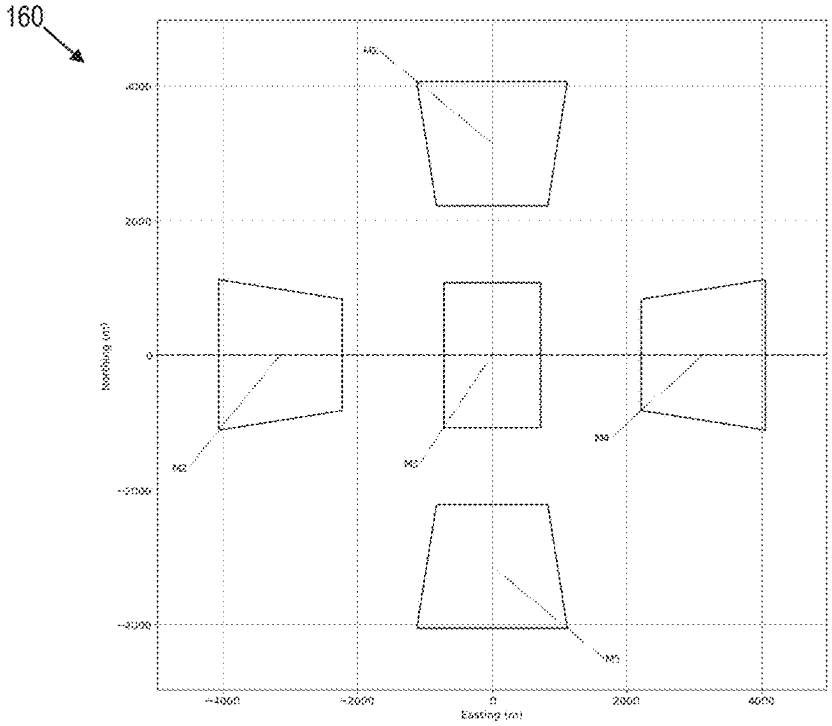
FIG. 1*g* is a further scan pattern for another camera system according to exemplary aspects of the present disclosure.

FIG. 1*g* shows the scan pattern for an alternative camera system 160 with 5 fixed cameras suitable for capturing vertical images mounted on an aerial vehicle at altitude of 3000 m above ground level. Camera M3 is oriented to capture nadir images, while M1, M2, M4 and M5 are oriented at 45 degrees obliqueness to capture oblique images at 90 degree intervals around the camera system. The system may use an autofocus mechanism, a fixed focus or may use a focus algorithm as one of ordinary skill would recognize.

Figure 2A:
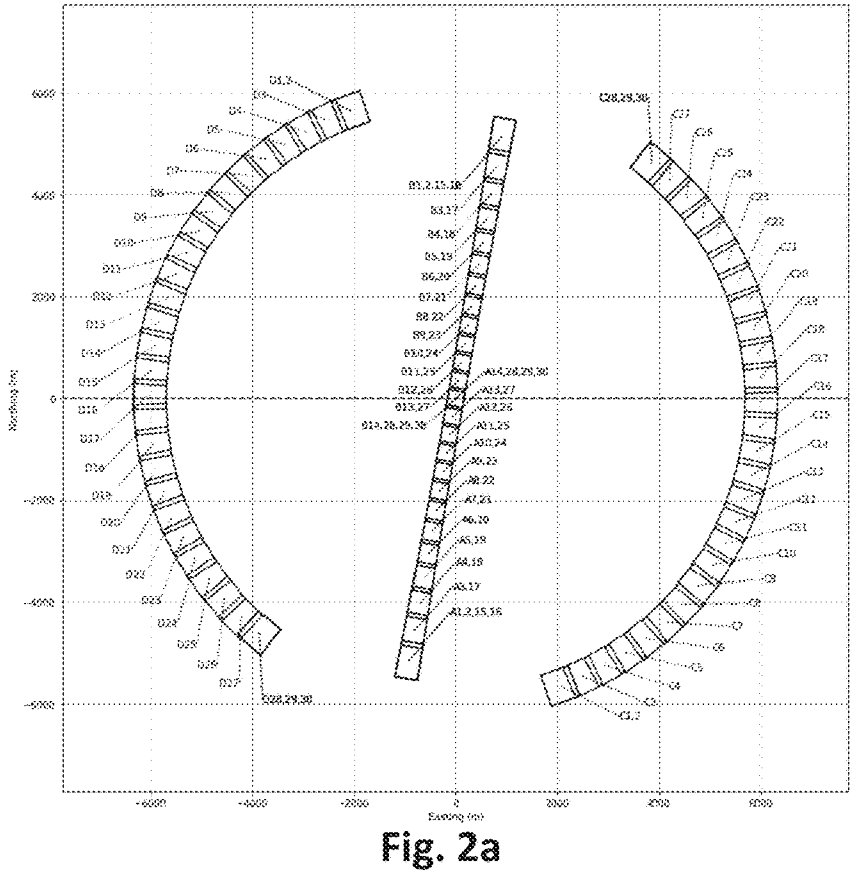
FIG. 2*a* is another scan pattern according to exemplary aspects of the present disclosure.

The camera system 160 may be mounted on a gimbal. The gimbal may be controlled to correct for rotation of the aerial vehicle on one or more axes, where typically the axes correspond to roll, pitch and/or yaw of the aerial vehicle and the gimbal platform is held horizontally. Yaw may be defined relative to the flight segment being flown, or relative to the direction of motion of the aerial vehicle. For example, a 3-axis gimbal may correct for roll, pitch and yaw of an aerial vehicle carrying for example the camera system corresponding to the scan pattern of FIG. 1*e* or FIG. 1*g*. For example, a 2-axis gimbal may correct for roll and pitch of an aerial vehicle carrying for example the camera system corresponding to the scan pattern of FIG. 1*c*. FIG. 2*a* illustrates the scan pattern on the ground for such an aerial vehicle located at position (0, 0) flying along a west to cast flight segment shown by the dashed line on the x-axis and with a yaw of 10 degrees to the right. Due to the scan drive geometry, the system may be configured to correct the effect of yaw on captures from the cameras of scan drive 101 resulting in a scan pattern shown in FIG. 2*b*. This is achieved by offsetting the mirror angles corresponding to the capture frames by an angle given by half of the angular difference between the yaw angle of the camera system and its intended yaw angle. The projection of images C1-30 and D1-30 match those of FIG. 1*c* while those of frames A1-30 and B1-30 are rotated by 10 degrees due to the yaw. This may advantageously improve the oblique coverage for the aerial survey.

In an alternative embodiment, the target gimbal pose, that is the orientation the gimbal dynamically aligns to, may be directed away from the horizontal. For example, the target roll of the gimbal may be altered so that a line of sight normal to the gimbal plane intersects with the current flight segment being captured. This rotation can improve the survey capture performance by centering the capture on the desired ground location while only slightly changing the azimuth and elevation of the captured images. FIG. 2*c* illustrates the scan patterns on the ground for such an aerial vehicle located at position (0, 0) flying along a west to cast flight segment shown by the dashed line 500*m* above the x-axis. The target roll of the gimbal has been modified so that frames A14, 28 and 29, B14, 28 and 29, C15 and D15 sit on the flight line rather than the x-axis. The curved components of the scan pattern are no longer arcs of circles as they have been somewhat distorted due to the projection geometry. This may be referred to as gimbal steering, and may be applied on roll, pitch and/or yaw axes. FIG. 2*d* illustrates the same gimbal steering of FIG. 2*c* but with yaw correction applied on the shared mirror scan drive unit. Alternatively, the target pitch of the gimbal may be altered in order to repeat image captures in the case of an image being found to be not acceptable as will be described in further detail below. An image found to be not acceptable may be referred to as "defective". Alternatively, both pitch and/or roll may be altered in order to partially compensate for the effect excessive and/or variable aircraft yaw on the survey capture performance, for example by improving the coverage for derived image products such as photomaps.

In general, the timing constraints of scanning camera systems are more restrictive than those of fixed camera systems. However, scanning camera systems may allow an increased flight line spacing for a given number of cameras resulting in a more efficient camera system overall. They also make more efficient use of the limited space in which they may be mounted in a commercially available aerial vehicle (either internally, such as in a survey hole, or externally, such as in a pod).

The flight lines flown by an aerial vehicle that includes one of these camera systems may be a serpentine path and may take any azimuthal orientation. It may be preferable to align the flight lines (x-axis in FIG. 1*a* to 1*g*) with either a North Easterly or North Westerly direction. In this configuration the scanning camera systems 100, 120, and 140 of FIG. 1 have advantageous properties for the capture of oblique imagery aligned with the cardinal directions (North, South, East and West) in that the scan patterns include two sweeps of images captured at or close to 45 degrees obliqueness from which the camera system captures a swath of oblique images aligned close to each of the four cardinal when flown along flight lines directed at 45 degrees to the cardinal directions.

Figure 3B:
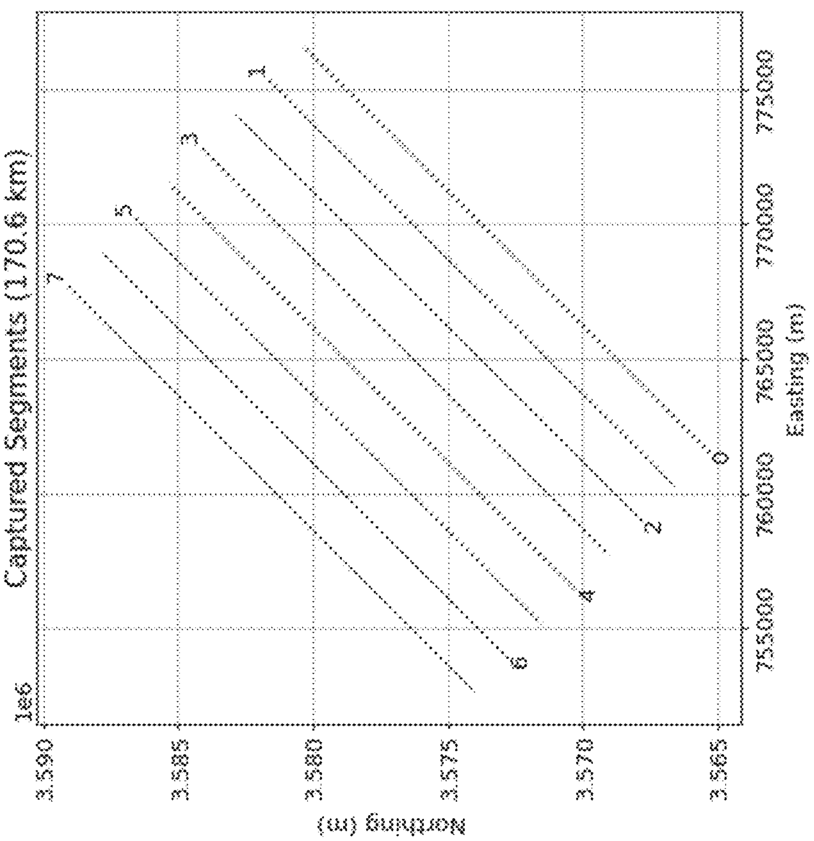
FIG. 3*b* is a set of captured segments according to exemplary aspects of the present disclosure.
Figure 3A:
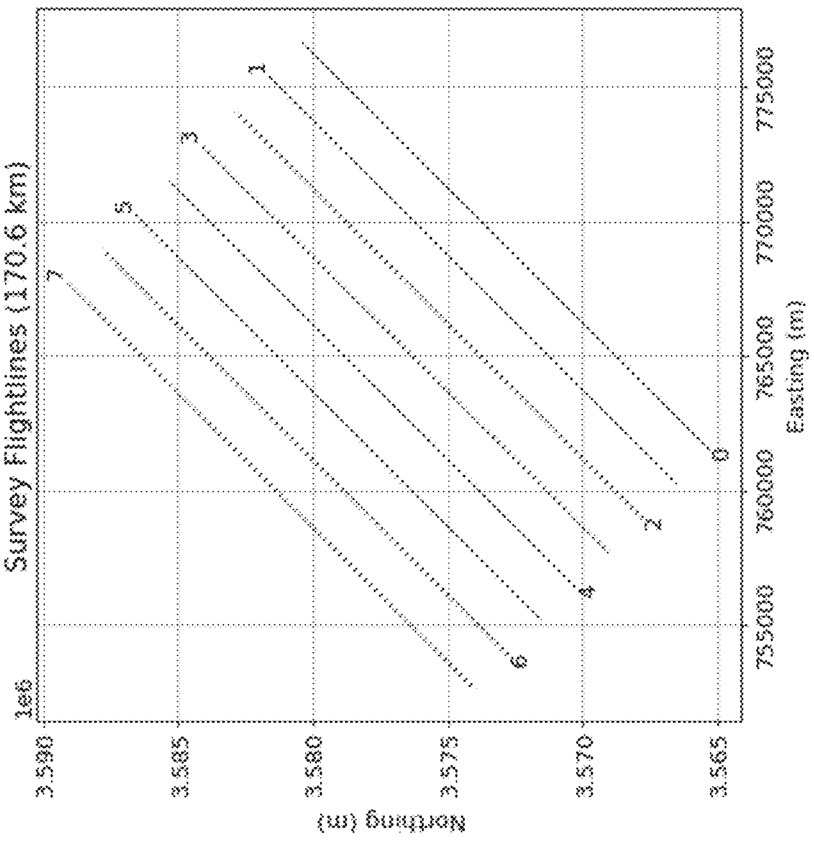
FIG. 3*a* are survey flight lines according to exemplary aspects of the present disclosure.
Figure 3C:
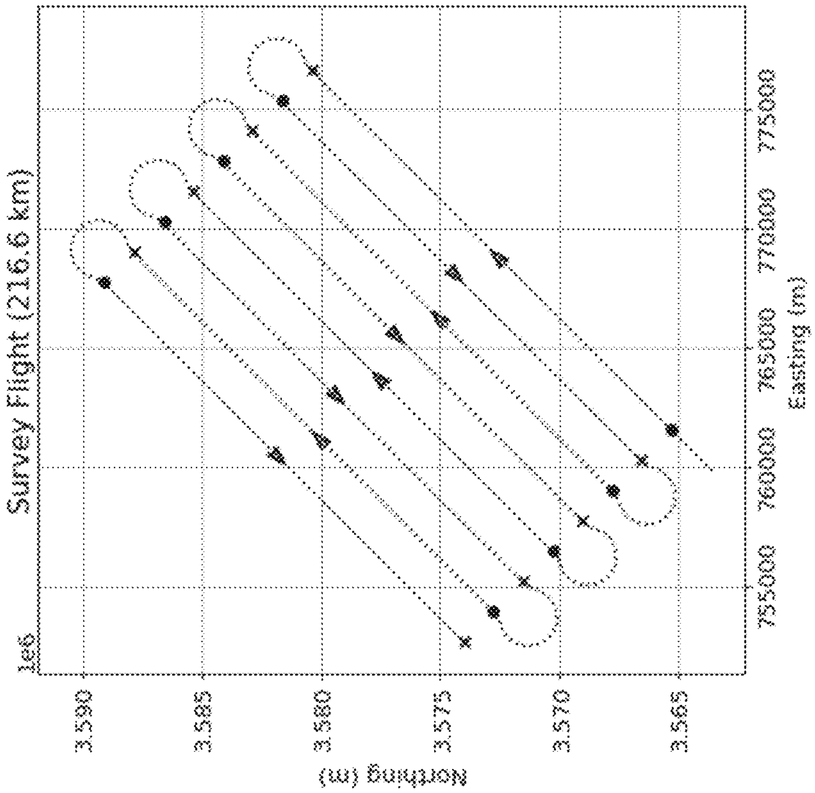
FIG. 3*c* is a survey flight according to exemplary aspects of the present disclosure.

FIG. 3*a* a set of flight lines of a flight map for a survey along which a camera system such as 120, 140 or 150 mounted on an aerial vehicle may be flown. There are 8 flight lines, numbered at an intended capture start location with the numbers 0 to 7. FIG. 3*b* shows a set of captured segments under ideal flight conditions. Under these ideal conditions, the aerial vehicle travels exactly along the full extent of each flight line capturing high quality imagery through a sequence of hypershots that starts at the indicated start point (numbered) and ends at the other end of each flight line. There are no reliability issues and, in the absence of any sidewinds or turbulence the aircraft points perfectly along the flight line throughout. To capture this ideal survey, the aerial vehicle may follow the survey flight illustrated in FIG. 3*c* in the direction indicated by the arrows, where the path of the aerial vehicle may take appropriate corners based on an acceptable turn radius. The camera system operates through capture of a sequence of hypershots between the starts of flight lines (dots) to the ends (crosses). During the turns, the camera system is not operational, and measures may be taken to protect the camera system from forces (for example by fixing or locking the gimbal rather than operating to maintain a preferred orientation).

Figure 3D:
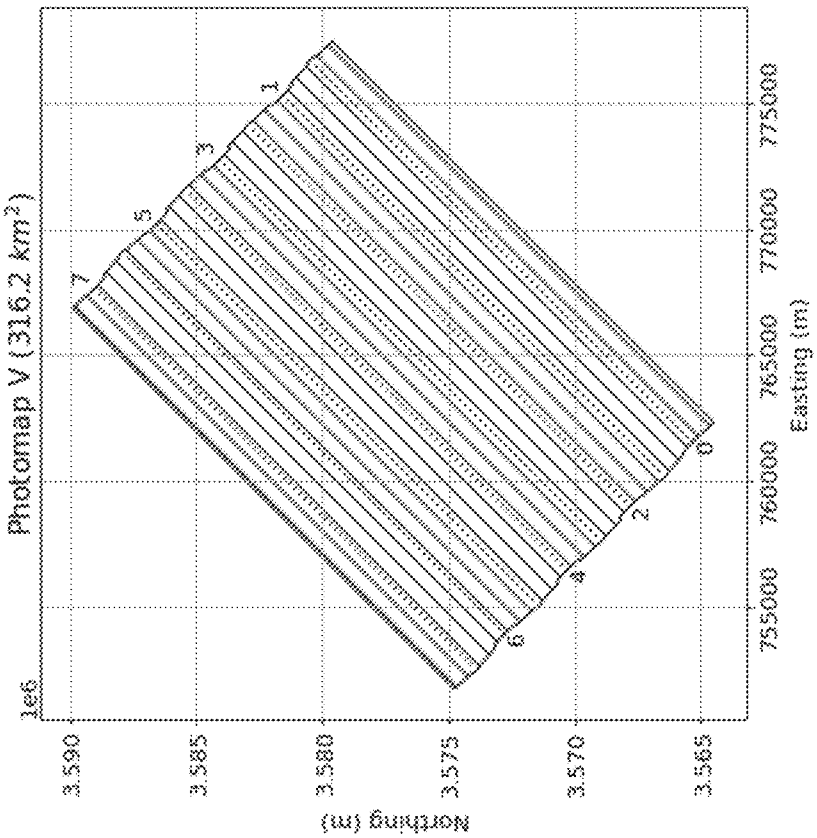
FIG. 3*d* is an illustration of the part of the ground covered by vertical imagery of a vertical photomap according to exemplary aspects of the present disclosure.
Figure 3F:
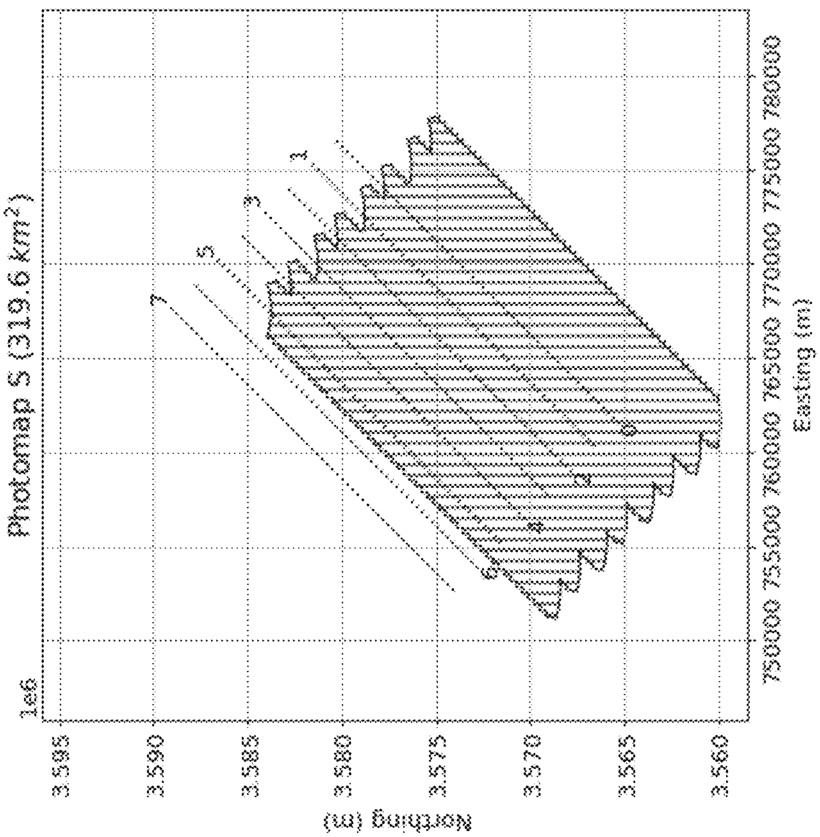
FIG. 3*f* is an illustration of the part of the ground covered by a south directed oblique photomap according to exemplary aspects of the present disclosure.
Figure 3E:
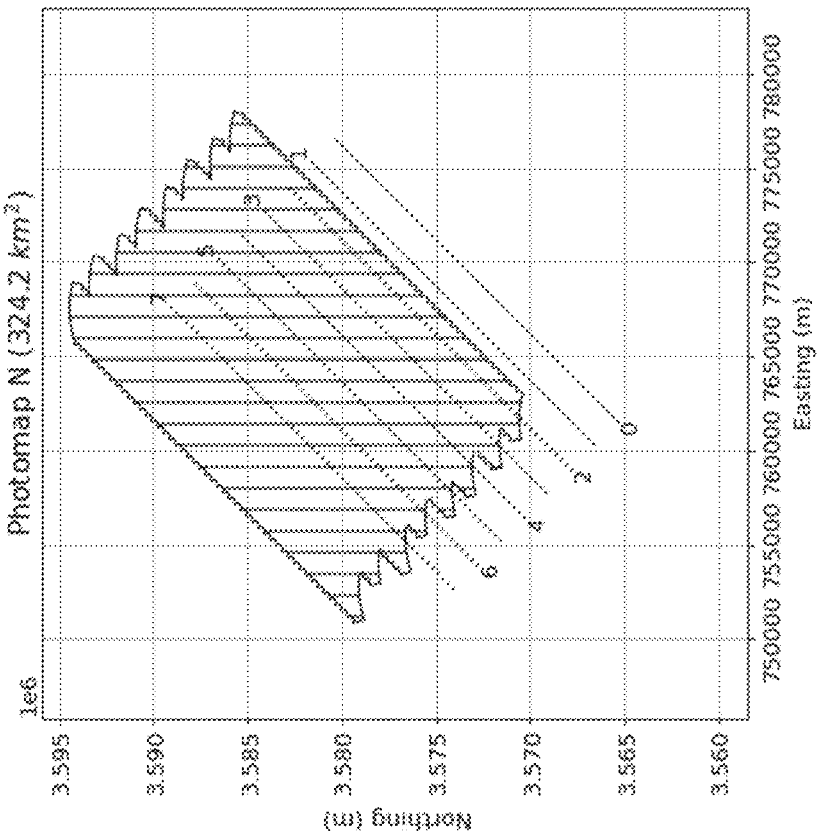
FIG. 3*e* is an illustration of the part of the ground covered by a north directed oblique photomap according to exemplary aspects of the present disclosure.
Figure 3H:
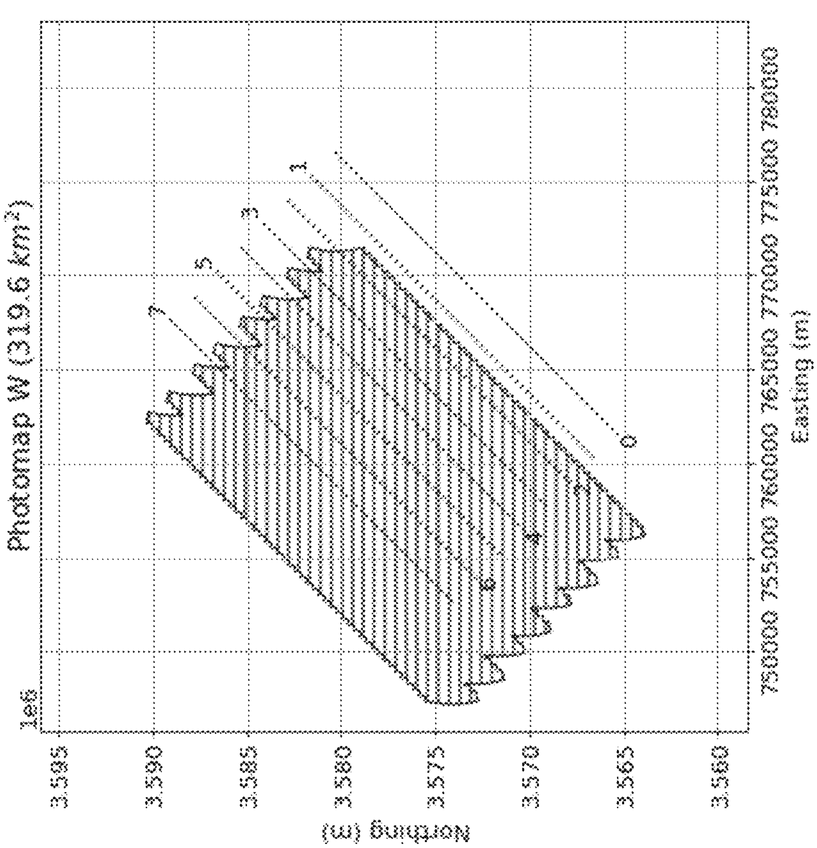
FIG. 3*h* is an illustration of the part of the ground covered by a west directed oblique photomap according to exemplary aspects of the present disclosure.
Figure 3G:
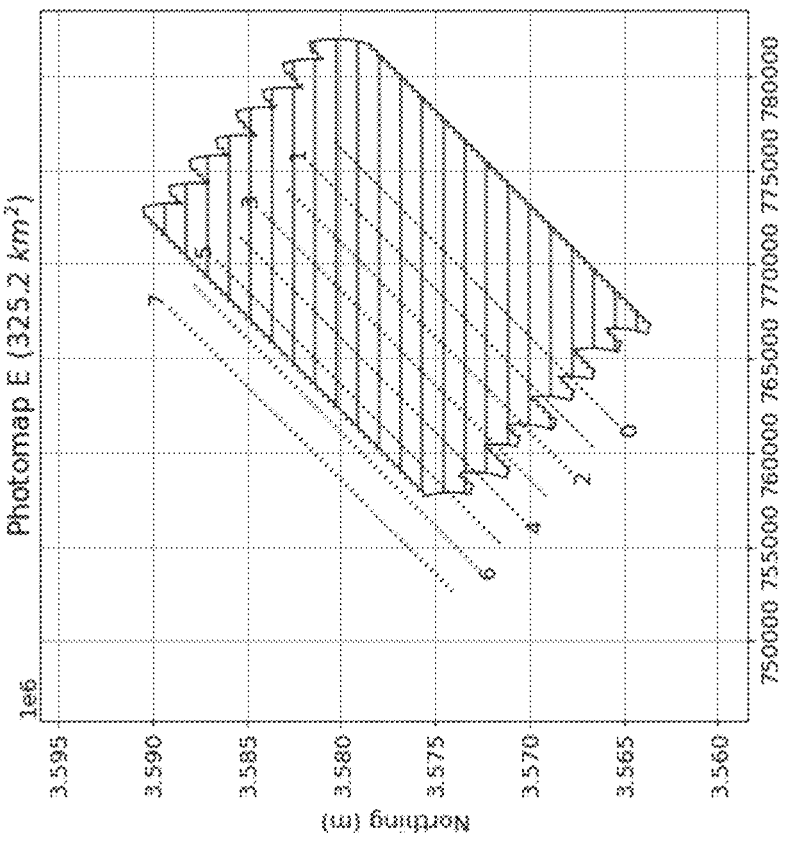
FIG. 3*g* is an illustration of the part of the ground covered by an east directed oblique photomap according to exemplary aspects of the present disclosure.

FIG. 3*d*, labelled "Photomap V," illustrates the part of the ground covered by "vertical imagery" captured based on the survey illustrated by the first three plots and for camera system 120 flown at an altitude of 6000 m above the ground. Vertical imagery in this example is the captured images from the survey below a suitable threshold obliqueness threshold (for example, 12 degrees) that can be considered suitable for the generation of a vertical photomap. The shape of the coverage region (the region marked by diagonal hatching) is determined by the set of captured segments, the trajectory of the aircraft and timing of the captures during the set of hypershots.

One exemplary way to calculate a specific coverage region is to use a union operation on a set of polygons defined by the ground projection geometries of the subset of acceptable captured images that meet the requirement for that coverage regions (in the case of FIG. 3*d*, the obliqueness is below a threshold, for example 12 degrees). An alternative suitable method is to:

- initialize an array that defines a map of coverage with a suitable ground resolution that may be lower than the image capture resolution but higher than the spacing of projections in the scan pattern (each values of the array is initially set to indicate that the corresponding location is not covered).
- step through the set of acceptable captured images, updating each element of the coverage map (array) as covered where the projected geometry of the image covers the region on the ground corresponding to the element.

Each of these methods may be adapted to maintain a coverage map as new acceptable capture images become available, so that the coverage can be a live representation of the status of an aerial survey. Further, the quality of the coverage may also be maintained as a metric based on the best image at each location on the ground (e.g. in this case the lowest obliqueness). The quality may be further measured in terms of the continuity of image line of sight (LOS) across the survey region. For example, a survey with higher average obliqueness may be considered of higher quality if the LOS varies smoothly over the survey region without large discontinuities that may result in building lean in a derived photomap.

FIGS. 3*e*, 3*f*, 3*g* and 3*h* illustrate the part of the ground covered by "oblique imagery" along each of four cardinal directions North (N), South(S), East (E) and West (W) respectively. Oblique imagery in this example is the captured images from the survey within a suitable threshold of 45 degree obliqueness (for example, 33 to 57 degrees) and within a suitable azimuthal threshold to the cardinal direction (for example, +/−15 degrees) that can be considered suitable for the generation of an oblique photomap along the cardinal direction. As illustrated in FIG. 3*d*, the coverage regions are offset relative to each other and relative to the vertical coverage plot.

Coverage data for other image derived products may be generated in a similar manner, by compiling together the projection geometries set of acceptable images as a function of location in the survey region. For example the quality of coverage for generation of a 3D product may be based on the distribution of image LOS at each point on the ground that may depend on the spacing of LOS of capture images around locations in the survey region where a higher quality may correspond to a smaller spacing and a smaller spacing may correspond to an average, maximum or other statistic of the spacing of LOS.

Alternatively, a 3D coverage estimate may be formed from a set of coverage data for photomaps. For example, if coverage data for a set of photomaps are known, a 3D coverage estimate may define the 3D coverage as the intersection of the set of coverage data for the photomaps, that is the set of points which include views from all directions corresponding to the photomaps. A suitable set of photomaps for such a method might be vertical plus a set of evenly spaced oblique photomaps (e.g. N, S, E and W). In this case a larger set of photomaps may give a better estimate of 3D coverage, for example the set of photomaps may include oblique N, S, E, W photomaps and a set of directions between these such as NE, SE, SW and NW. For example, the set of photomaps may include a second set of oblique photomaps based around a lower obliqueness (e.g., 25 degrees). Alternatively, the 3D coverage may be estimated based on other ways of combining the coverage data for the photomaps such as sums or weighted sums of the photomap set coverage at each point in the survey region, or based on geometric factors that might estimate the largest azimuthal or elevation step between LOS of images directed to each point on the ground based on the coverage data of the photomaps. Thus, the specific method used to estimate the 3D coverage is not limiting upon the present disclosure.

Coverage data for a discrete set of properties may be generated by combining the coverage data of one or multiple photomaps and/or 3D data at a set of regions around the locations of the properties. The coverage data may be expressed as simple Boolean data for each property (covered or not covered), for example based solely on the vertical coverage map or alternatively based on the vertical coverage map plus one or more oblique coverage maps and/or a 3D coverage map. Property coverage is discussed further below with respect to FIG. 27.

The operation of aerial surveys may be based on a complex set of priorities. In some cases, specific properties may take the highest priority, in particular when a survey has been requested by an operator with a particular interest in those properties, such as an insurance provider. In other cases, vertical image coverage and quality may be the highest priority, or 3D image based products, or oblique coverage. The timing of capture of particular parts of the survey region may also be a priority, and a set of complex limitations may apply to the capture, for example the window available for capture with acceptable sun angle and weather conditions, etc. For example, the minimum sun angle for an acceptable survey may be 30 degrees.

FIG. 20 illustrates an alternative survey from FIG. 3 for which the survey conditions were not ideal. Specifically, strong side winds from the west impacted both the accuracy of the aerial vehicle in tracking the flight lines, and also altered the pose of the aerial vehicle in flight. Specifically, the vehicle orientation varied from the flight line orientation by substantial amounts of beyond +/−15 degrees depending on the direction in which each flight line is flown. Although the survey flight lines of FIG. 20*a* are the same as FIG. 3*a*, the captured segments and survey flight of FIGS. 20*b* and 20*c* are seen to deviate from FIGS. 3*b* and 3*d* due to the survey conditions. Consequently, the area of the coverage data of the vertical photomap in FIG. 20*d* is slightly reduced relative to FIG. 3*d*, while those of the oblique photomaps of FIGS. 20*e* to 20*h* are substantially reduced relative to FIGS. 3*e* to 3*h*.

Figure 2B:
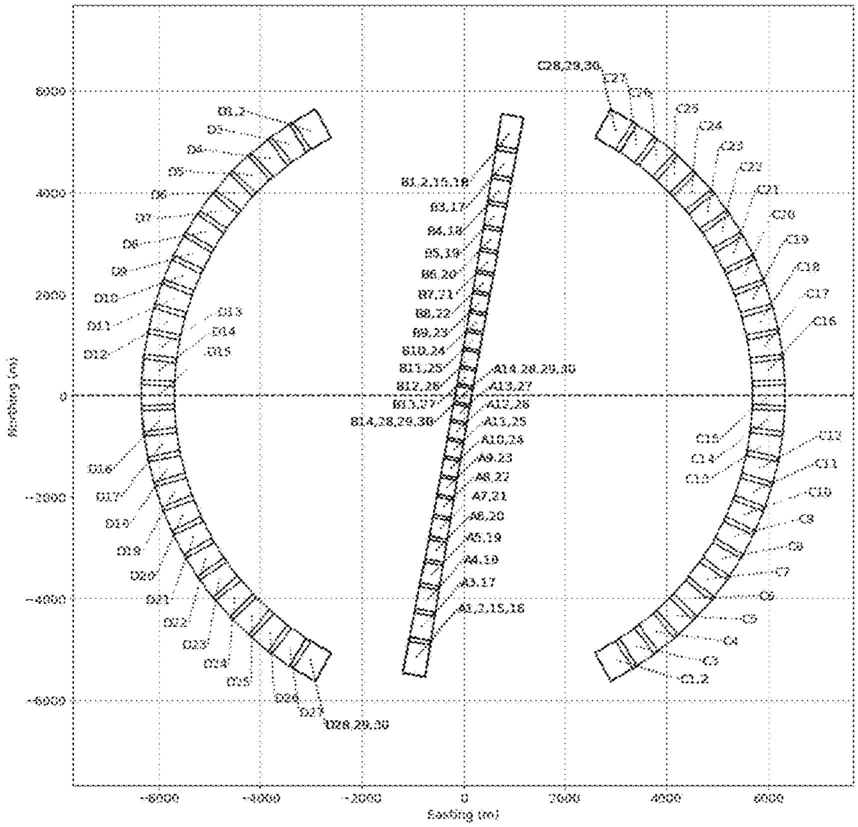
FIG. 2*b* is a further scan pattern according to exemplary aspects of the present disclosure.
Figure 2C:
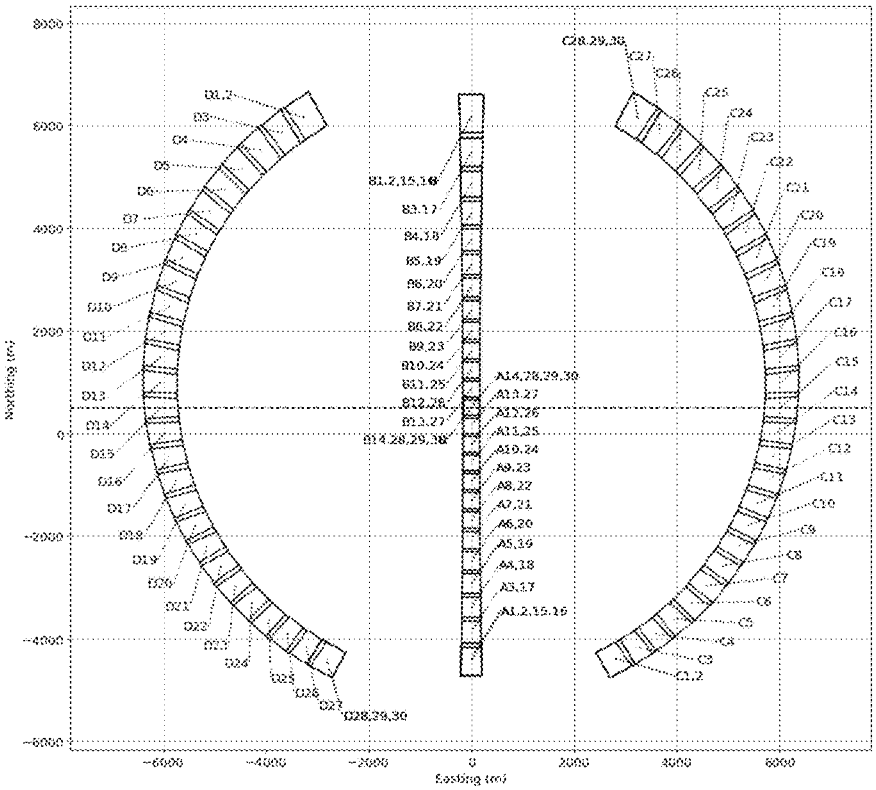
FIG. 2*c* is a still further scan pattern according to exemplary aspects of the present disclosure.
Figure 2D:
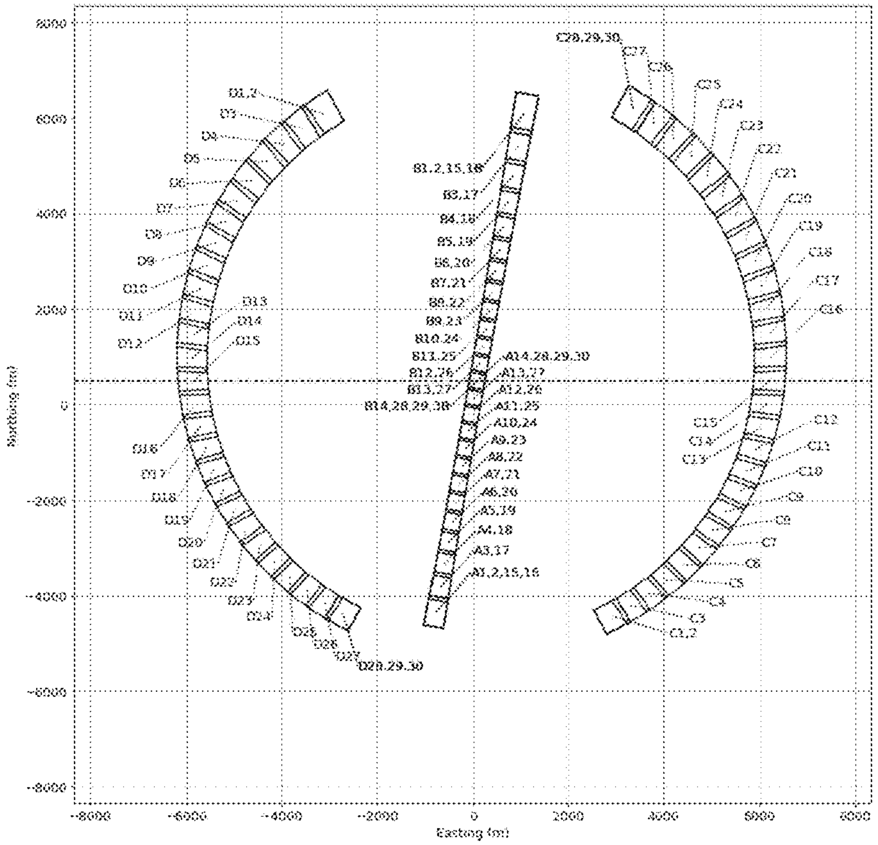
FIG. 2*d* is another scan pattern according to exemplary aspects of the present disclosure.

FIGS. 21*a* to 21*d* show oblique photomap coverage for an alternative survey outcome from FIGS. 20*e* to 20*h* in which yaw correction, as discussed with respect to FIG. 2*b* above is applied to reduce the impact of yaw on the oblique photomaps. It can be seen that the oblique photomap coverage is greatly improved in this case with areas much closer to the ideal survey conditions shown in FIGS. 3*e* to 3*h* above.

FIGS. 22*a* to 22*d* shows alternative survey outcomes from FIGS. 20*a* to 20*h* in which yaw correction, as discussed with respect to FIGS. 2*b* and 2*d* above, and gimbal steering, as discussed with respect to FIGS. 2*c* and 2*d* above, are both applied to reduce the impact of yaw and inaccurate flight line tracking, on the oblique photomaps. It can be seen that the oblique photomap coverage in FIGS. 22*a* to 22*d* is further improved beyond the case of yaw correction only (FIGS. 21*a* to 21*d* above) in that the coverage of the four photomaps is more balanced and the edges track the ideal survey flight lines more accurately.

FIG. 23 illustrates an alternative survey outcome based on the scenario of FIG. 22 but with some captured images deemed not acceptable. This may occur due to extreme flight conditions, system errors, or other issues. In this case about 2% of frames were determined to be not acceptable, leaving small gaps in the coverage of vertical and oblique photomaps that would result in dropped coverage of 3D and properties locally. In this configuration, the vertical photomap coverage of FIG. 23*d* is seen to be more strongly affected than the oblique photomap coverage of FIGS. 23*c* to 23*h*. The coverage of the photomaps may be partially or entirely recovered based methods described in further detail below based on adaptive survey techniques such as hypershot queue updates (655 described with respect to FIG. 11), improved exposure models (745 described with respect to FIG. 19). The coverage may also be improved through the use of comprehensive flight condition models (550 described with respect to FIG. 18), and flight map updates (555 described with respect to FIG. 12).

FIGS. 24*a* to 24*h* illustrate an alternative survey outcomes based on the scenario of FIG. 22 but with occluded frames due to clouds 2400 at low altitude within the survey region, resulting in gaps in the coverage of vertical and oblique photomaps shown in FIGS. 24*d* to 24*h*. Each photomap coverage is missing a different part of the ground due to the geometry of the occlusion and the LOS of frames included in the photomap. The coverage of the photomaps may be partially or entirely recovered based methods described in further detail below based on adaptive survey techniques such as updating the flight map (step 555 described with respect to FIG. 12). For example, the flight map may be updated to include additional flight line segments.

Figure 25B:
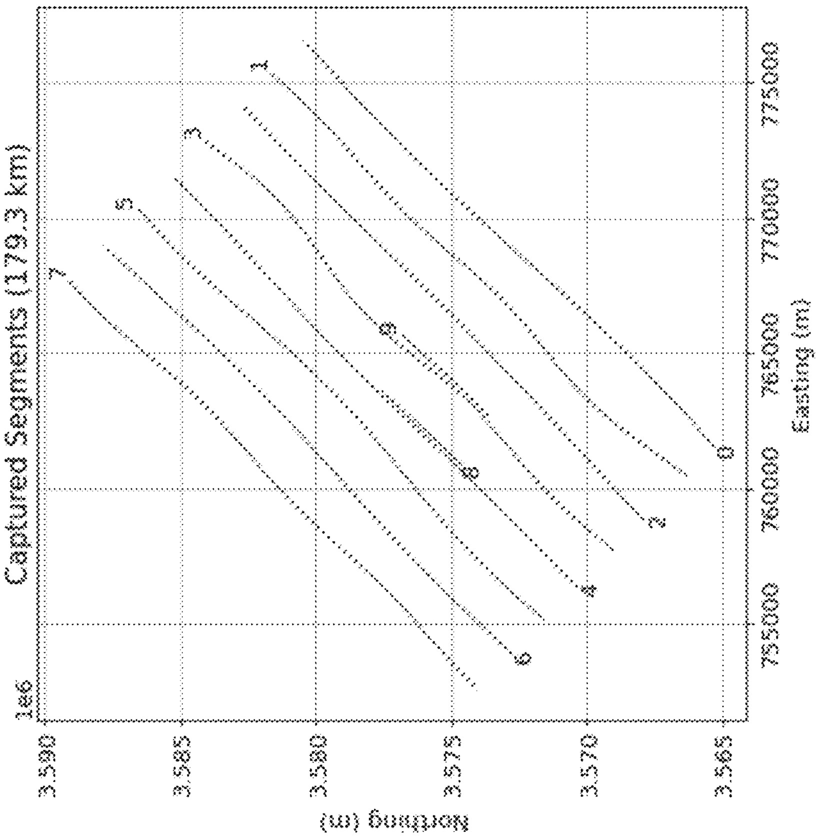
FIG. 25*b* is a set of captured segments according to exemplary aspects of the present disclosure.
Figure 25A:
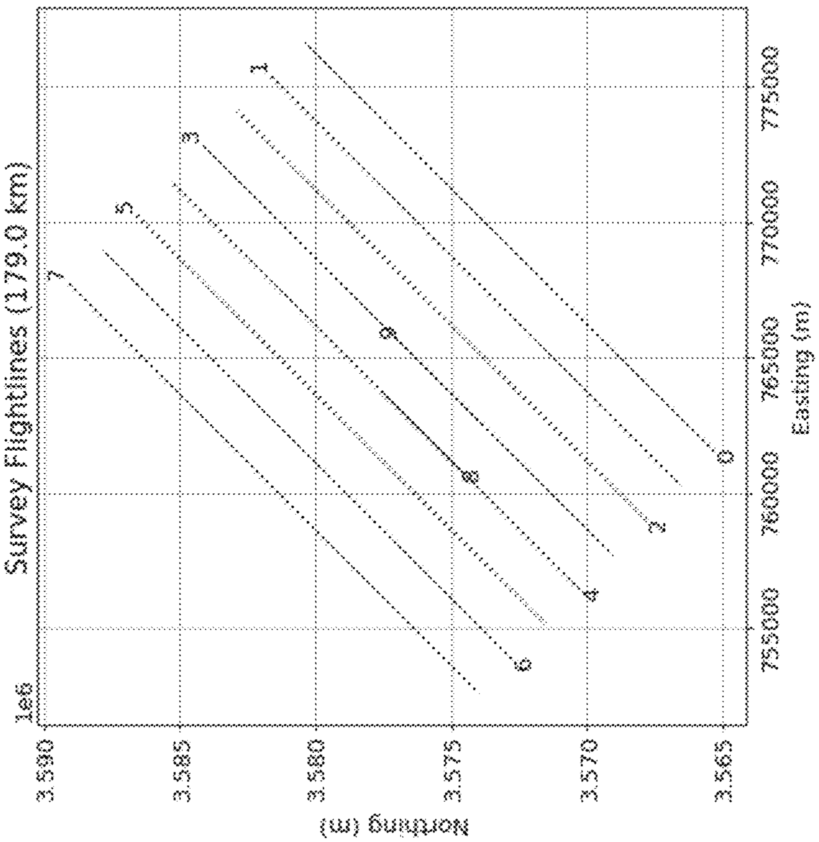
FIG. 25*a* are survey flight lines according to exemplary aspects of the present disclosure.
Figure 25C:
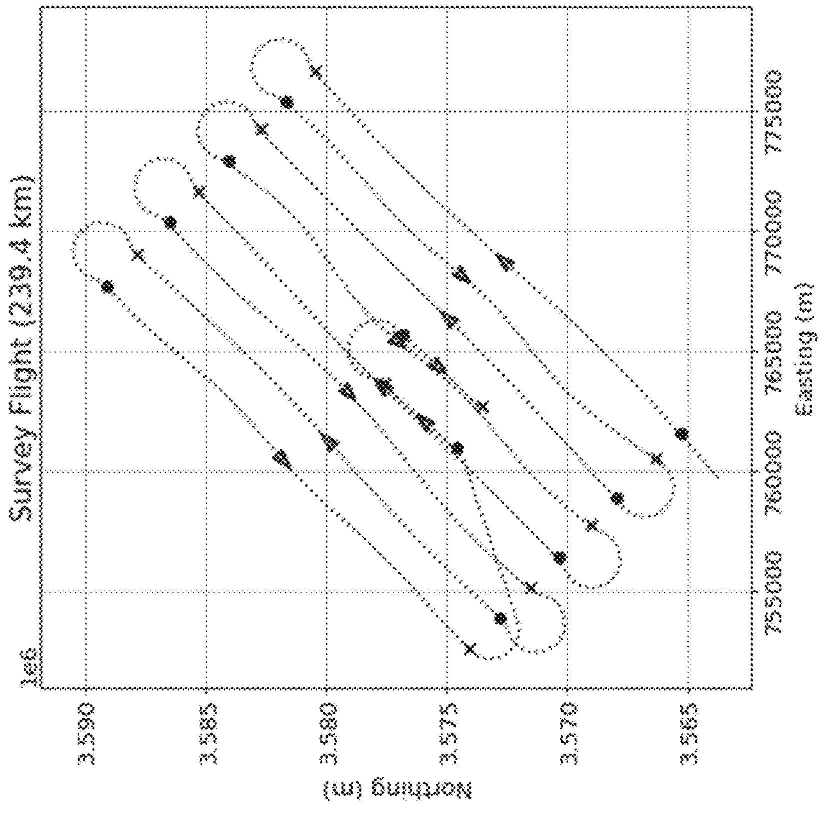
FIG. 25*c* is a survey flight according to exemplary aspects of the present disclosure.
Figure 25D:
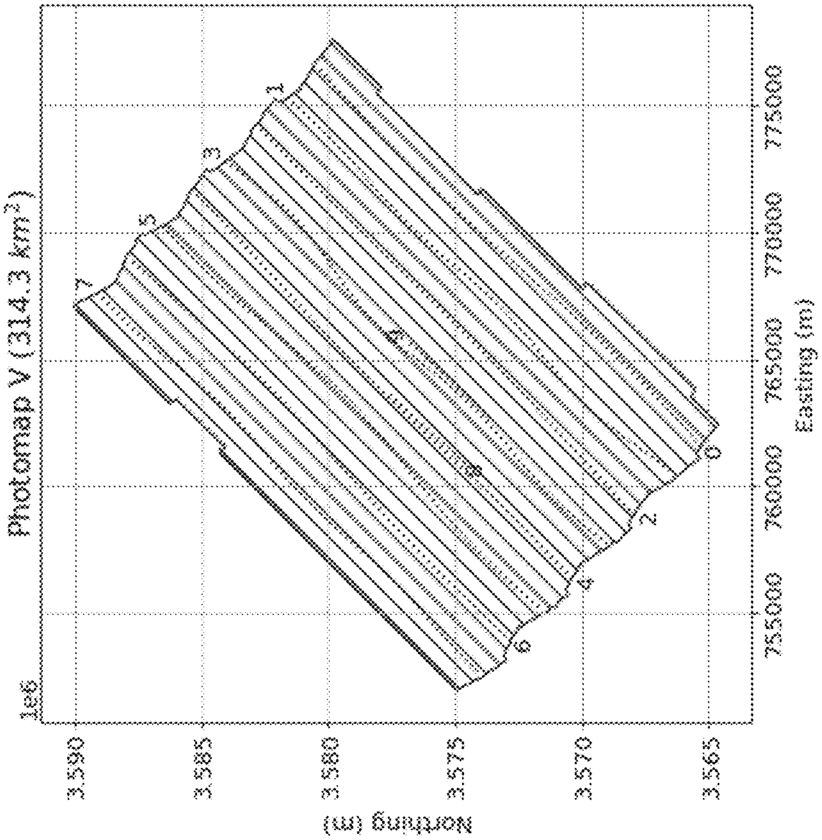
FIG. 25*d* is an illustration of the part of the ground covered by vertical imagery of a vertical photomap according to exemplary aspects of the present disclosure.
Figure 25F:
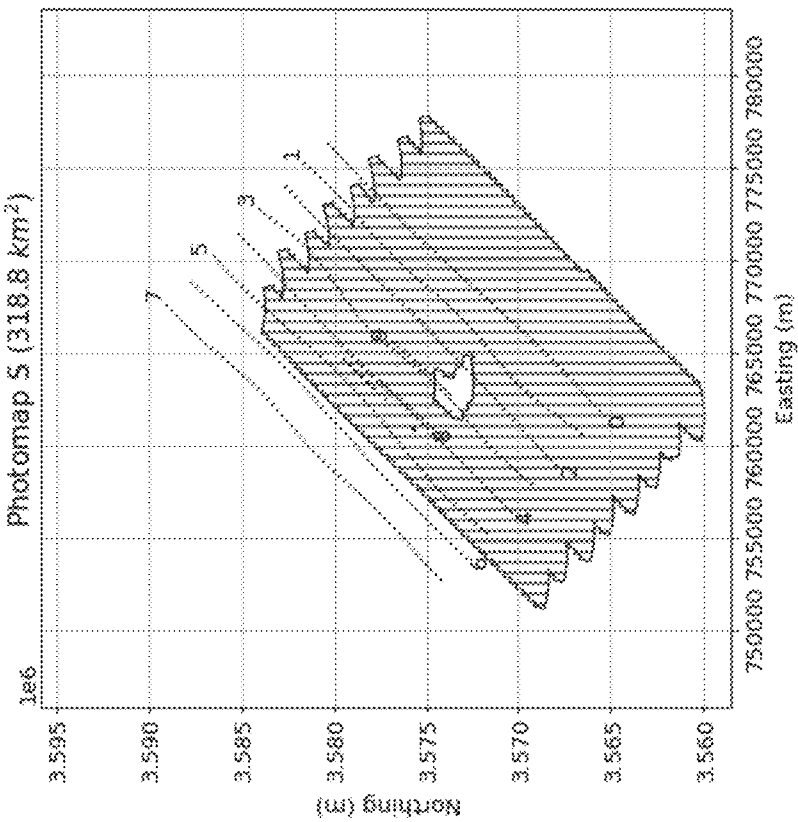
FIG. 25*f* is an illustration of the part of the ground covered by a south directed oblique photomap according to exemplary aspects of the present disclosure.
Figure 25E:
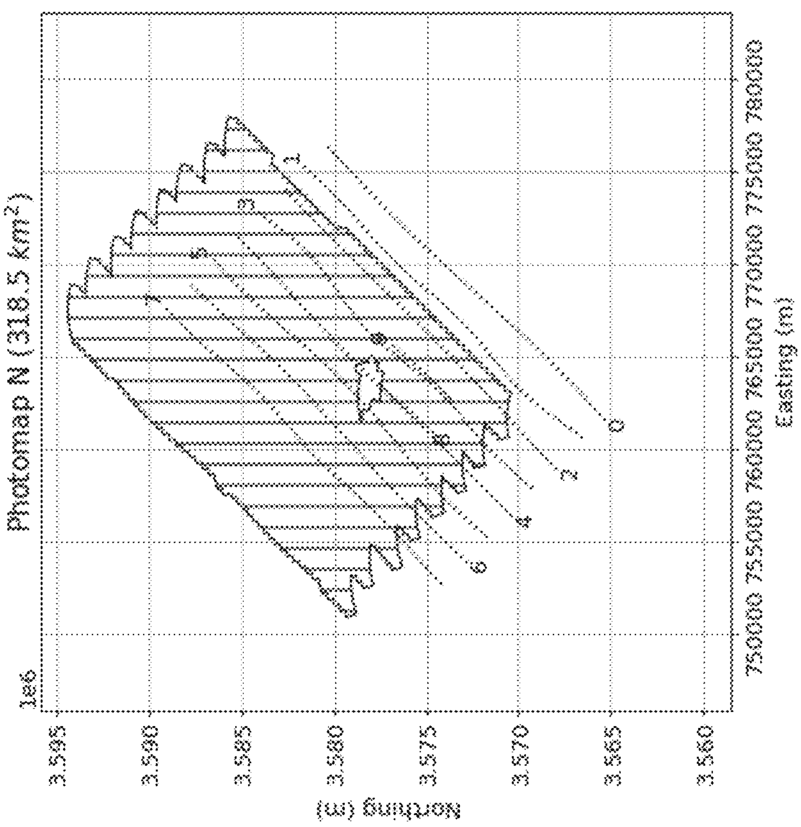
FIG. 25*e* is an illustration of the part of the ground covered by a north directed oblique photomap according to exemplary aspects of the present disclosure.
Figure 25G:
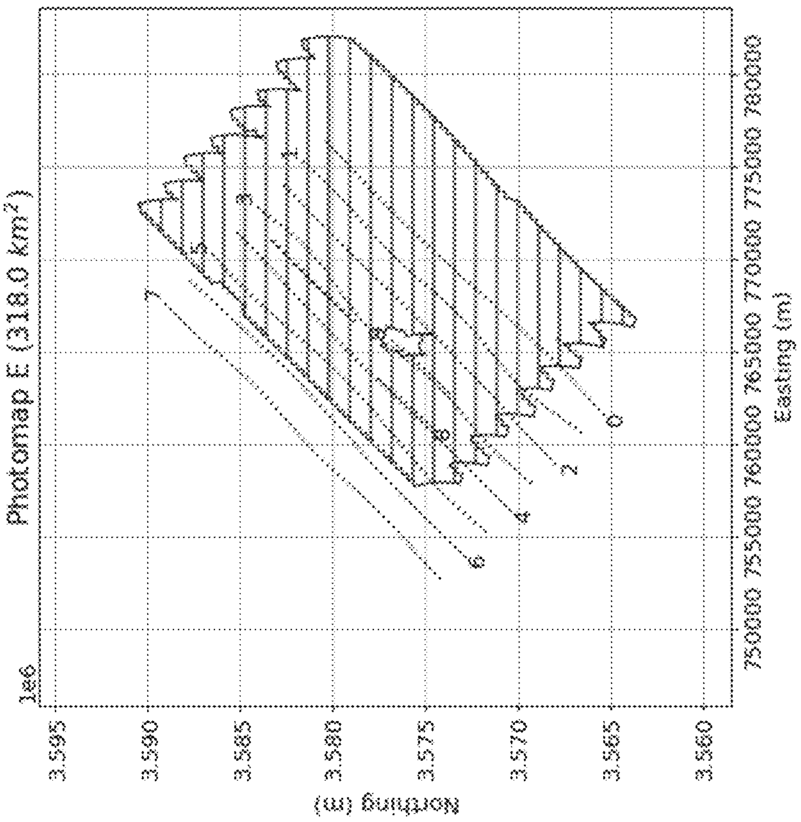
FIG. 25*g* is an illustration of the part of the ground covered by an east directed oblique photomap according to exemplary aspects of the present disclosure.
Figure 25H:
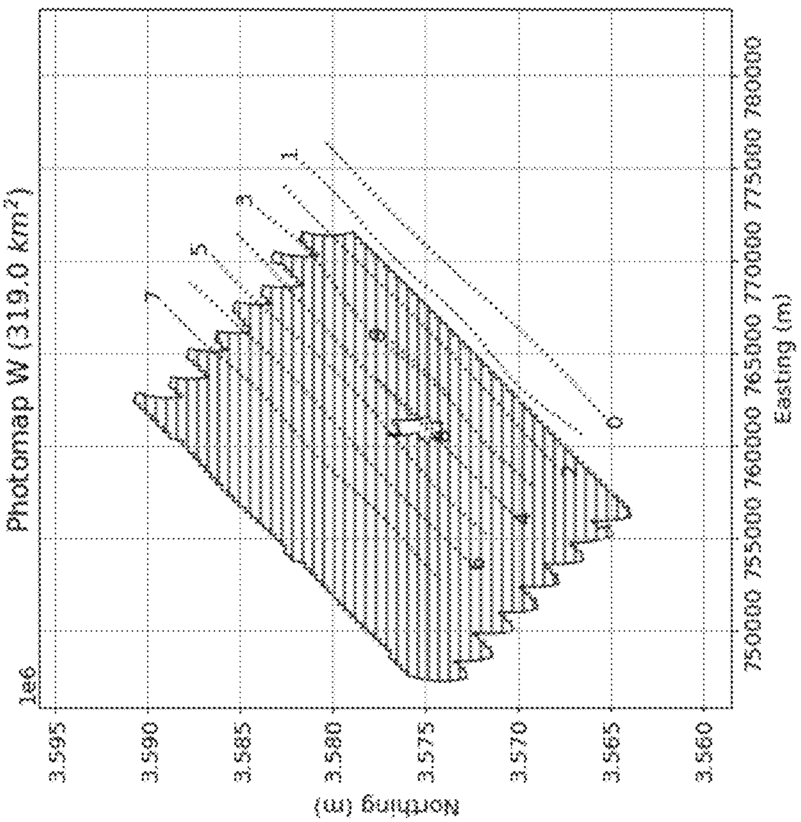
FIG. 25*h* is an illustration of the part of the ground covered by a west directed oblique photomap according to exemplary aspects of the present disclosure.

FIGS. 25*a* to 25*h* illustrate alternative survey outcomes based on the scenario of FIGS. 24*a*-24*h* but with two additional flight line segments (numbered 8 and 9 in the figure) flown in order to recover the lost vertical coverage due to occlusion from clouds. It is assumed that the clouds have moved or cleared when the additional flight line segments 8 and 9 were flown. FIG. 25*d* illustrates the improved vertical coverage relative to FIG. 24*d* giving full coverage over the center of the survey region. FIGS. 25*e* to 25*h* show improved oblique coverage relative to FIGS. 24*c* to 24*f*, though the oblique coverage does still have gaps. Further flight line might be required in order to fully recover the oblique coverage lost due to the clouds as might be achieved using the adaptive survey techniques described herein.

Figure 26A:
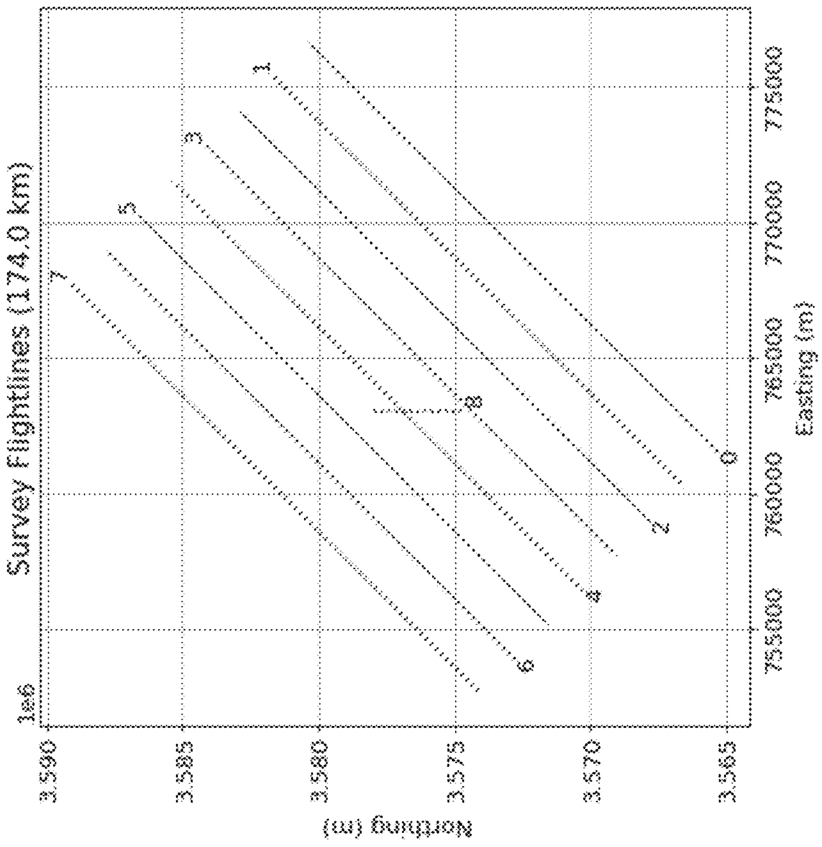
FIG. 26*a* are survey flight lines according to exemplary aspects of the present disclosure.
Figure 26B:
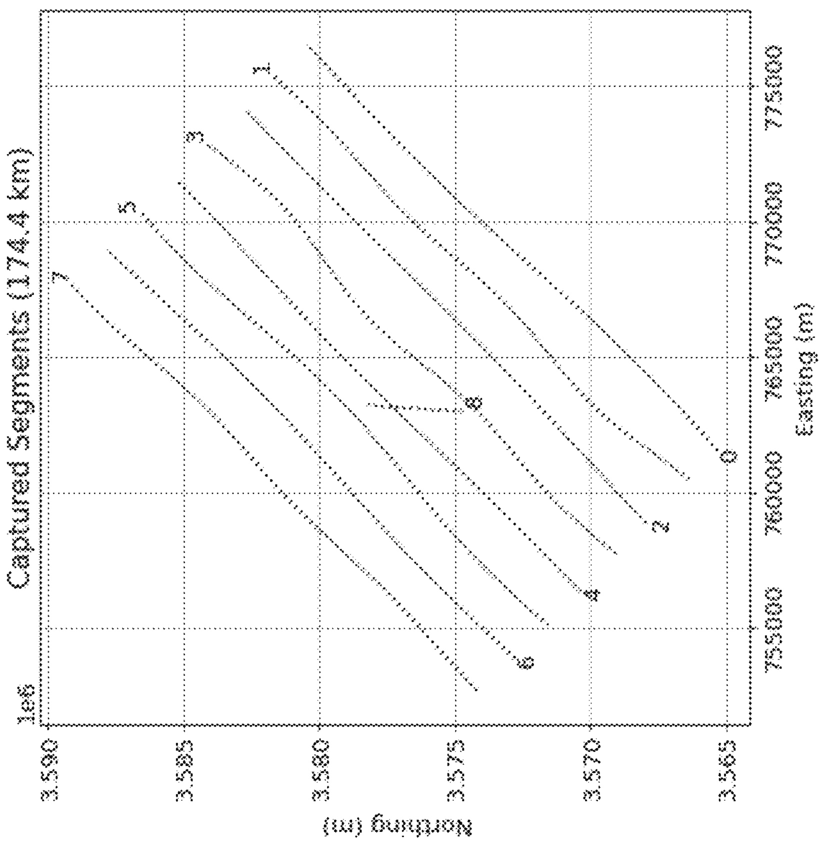
FIG. 26*b* is a set of captured segments according to exemplary aspects of the present disclosure.
Figure 26C:
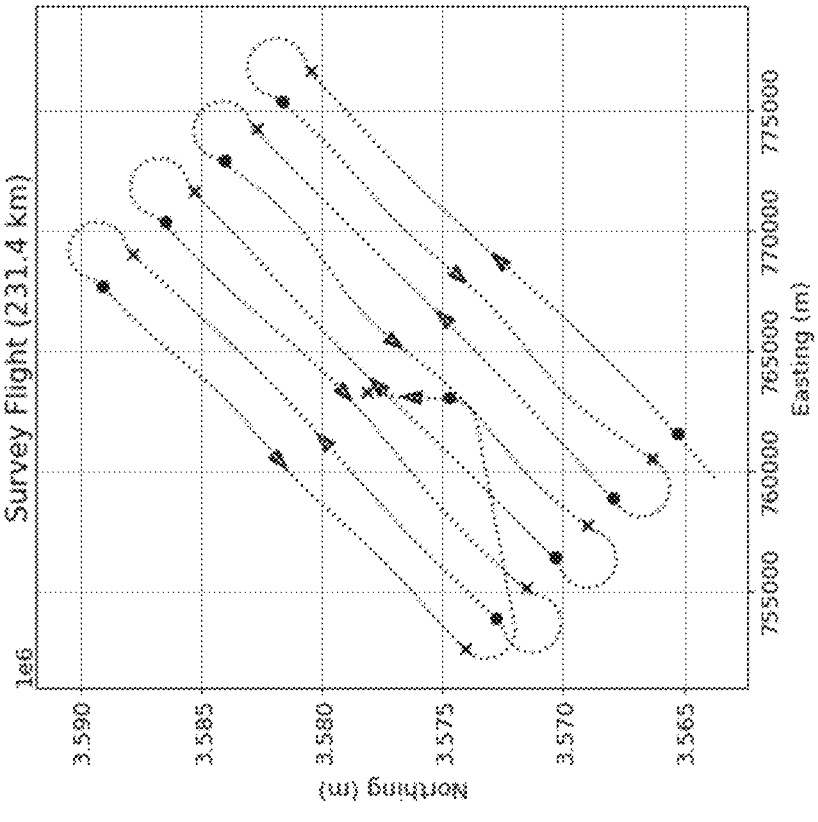
FIG. 26*c* is a survey flight according to exemplary aspects of the present disclosure.
Figure 26D:
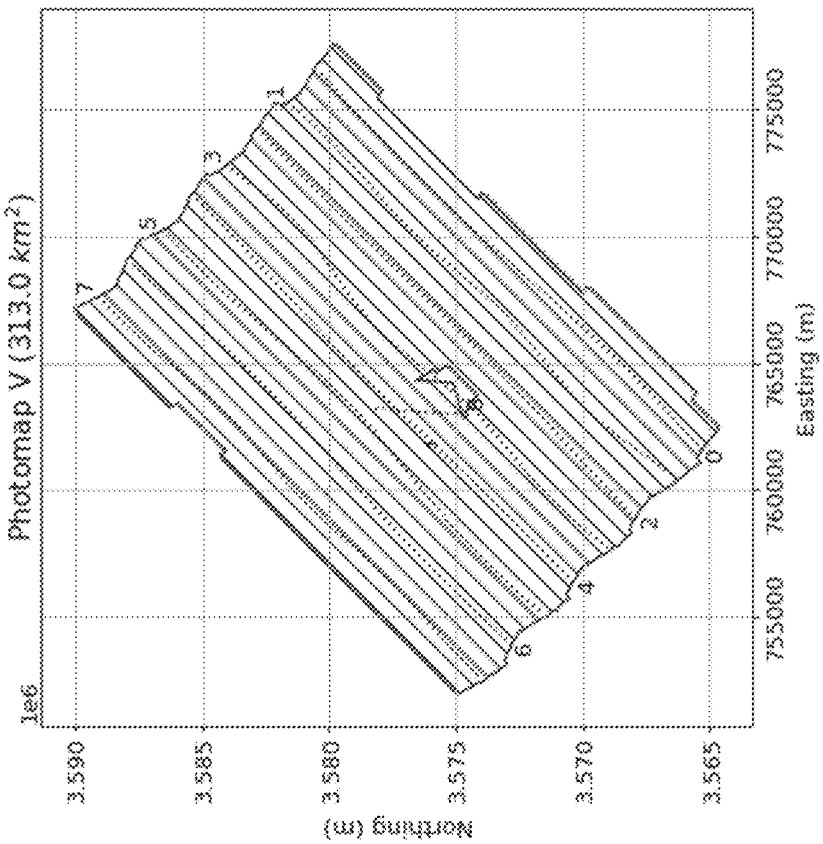
FIG. 26*d* is an illustration of the part of the ground covered by vertical imagery of a vertical photomap according to exemplary aspects of the present disclosure.
Figure 26E:
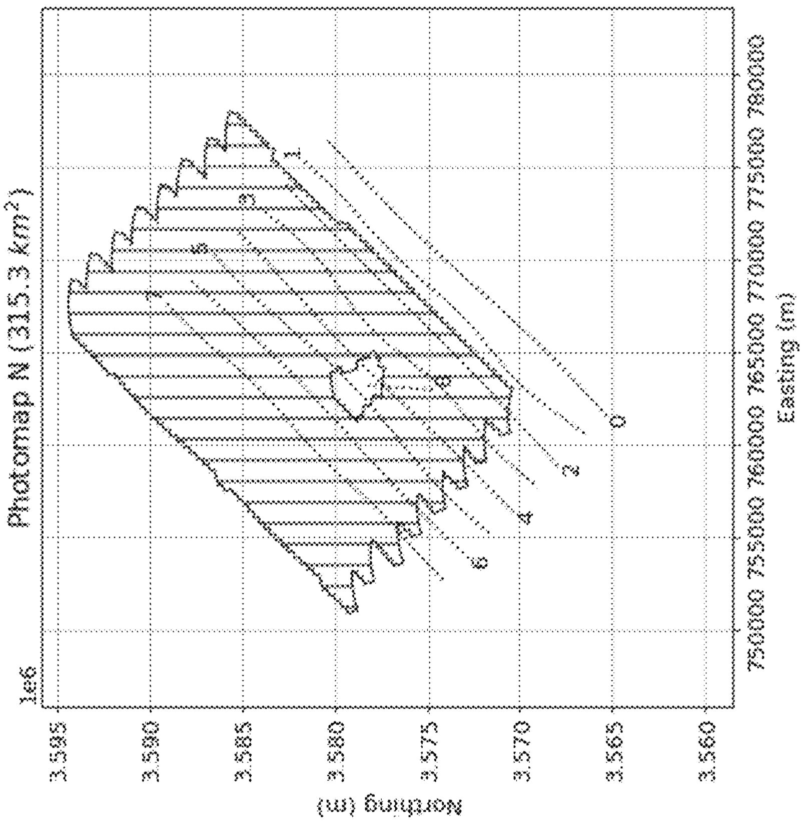
FIG. 26*e* is an illustration of the part of the ground covered by a north directed oblique photomap according to exemplary aspects of the present disclosure.
Figure 26F:
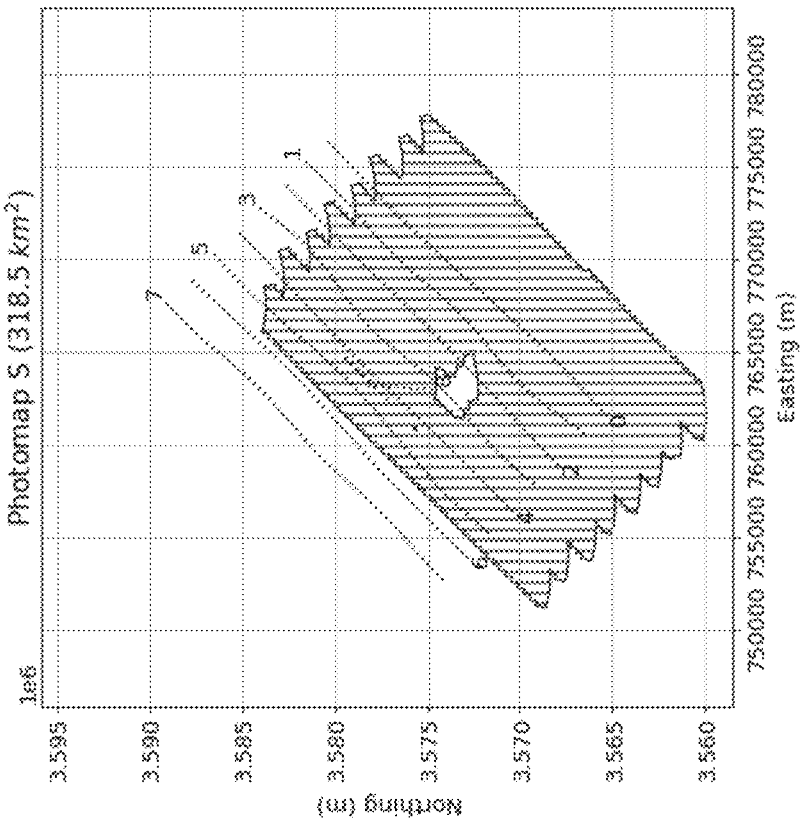
FIG. 26*f* is an illustration of the part of the ground covered by a south directed oblique photomap according to exemplary aspects of the present disclosure.
Figure 26H:
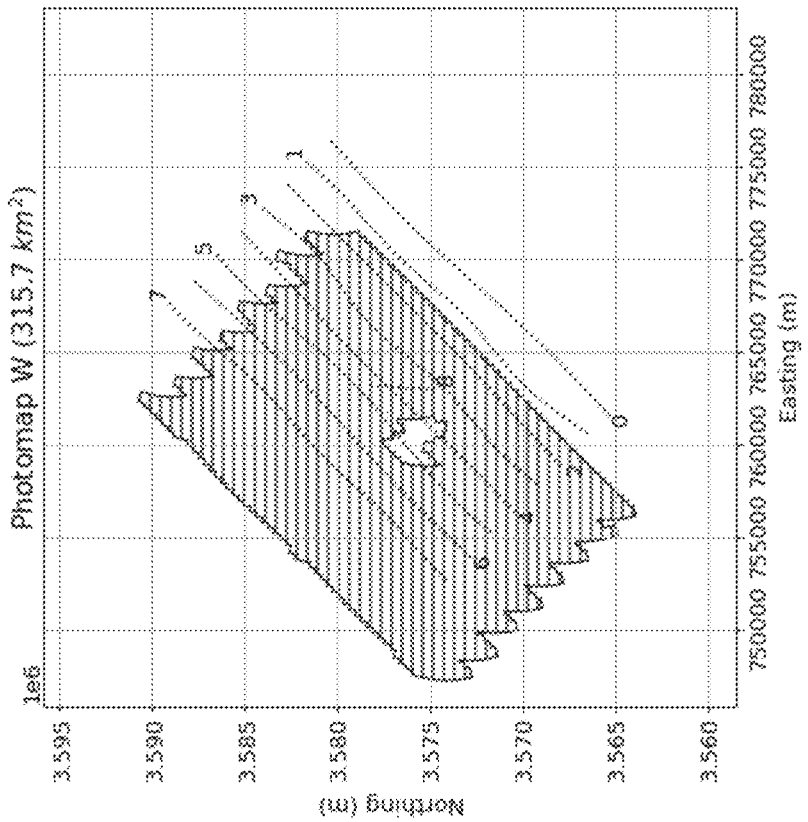
FIG. 26*h* is an illustration of the part of the ground covered by a west directed oblique photomap according to exemplary aspects of the present disclosure.
Figure 26G:
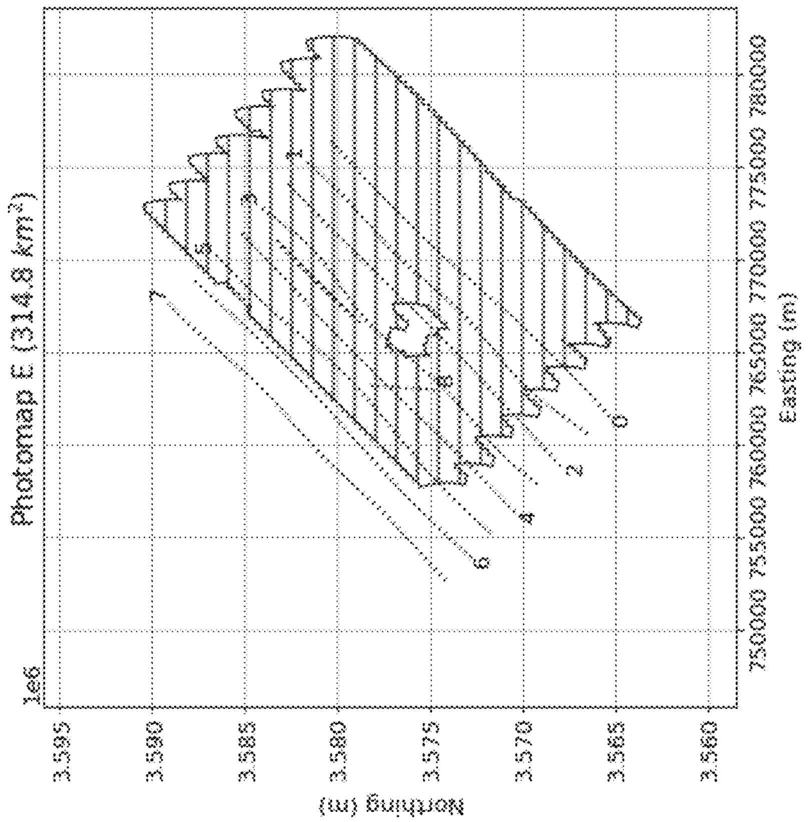
FIG. 26*g* is an illustration of the part of the ground covered by an east directed oblique photomap according to exemplary aspects of the present disclosure.

FIGS. 26*a* to 26*d* illustrate an alternative survey outcome based on the scenario of FIGS. 24*a*-24*h* but with a single off-flight line segment (numbered 8) added to the flight map of FIG. 26*a* and flown as illustrated in FIG. 26*b* and FIG. 26*c* in order to partially recover the lost vertical coverage due to cloud occlusion. It is assumed that the clouds have moved or cleared when the additional flight line segments were flown. FIG. 26*d* illustrates the improved vertical coverage relative to FIG. 24*d*, though some gaps in coverage may remain. FIGS. 25*e* to 25*h* show improved oblique coverage relative to FIGS. 24*c* to 24*f*, though the oblique coverage does also still have gaps. Further updates to the flight map including additional flight line segments might be required in order to fully recover the vertical and/or oblique coverage lost due to the clouds as might be achieved using the adaptive survey techniques described herein.

Figure 27B:
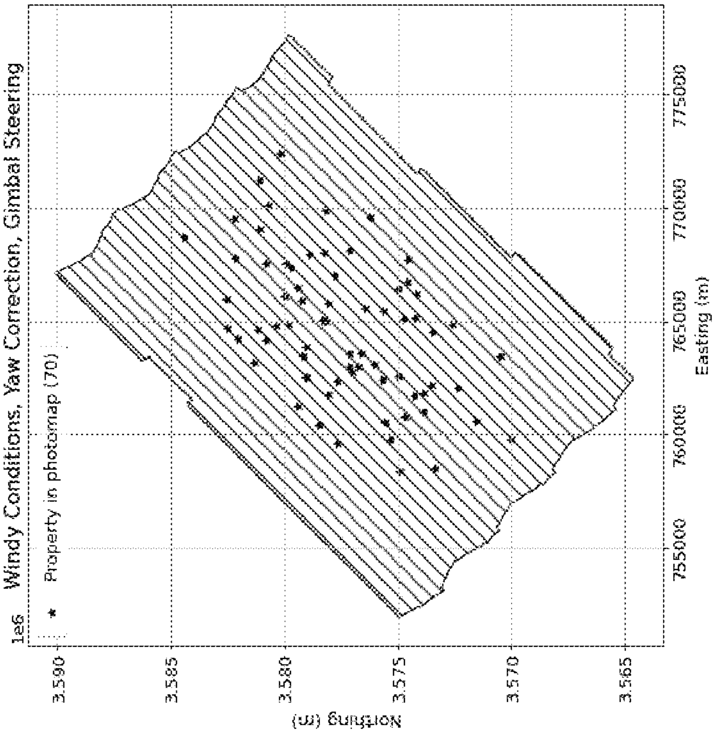
FIG. 27*b* is an illustration of property coverage for a survey operating in a second scenario for the case that the property coverage is determined based on the vertical coverage photomap according to exemplary aspects of the present disclosure.
Figure 27A:
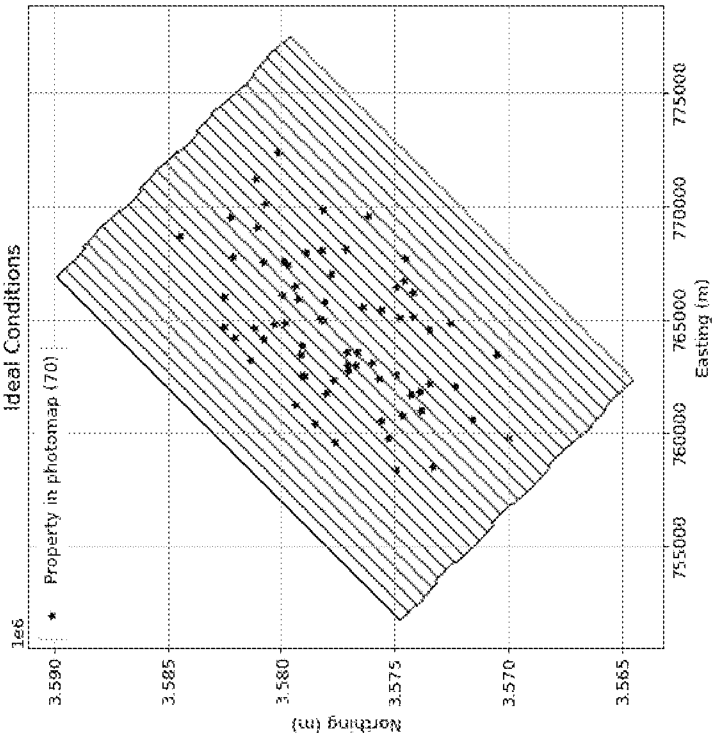
FIG. 27*a* is an illustration of property coverage for a survey operating in a first scenario for the case that the property coverage is determined based on the vertical coverage photomap according to exemplary aspects of the present disclosure.
Figure 27C:
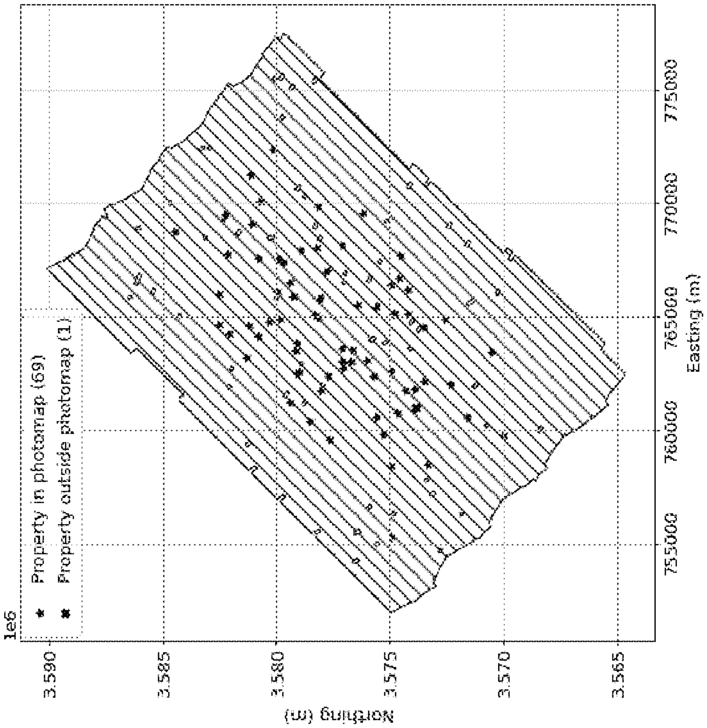
FIG. 27*c* is an illustration of property coverage for a survey operating in a third scenario for the case that the property coverage is determined based on the vertical coverage photomap according to exemplary aspects of the present disclosure.
Figure 27D:
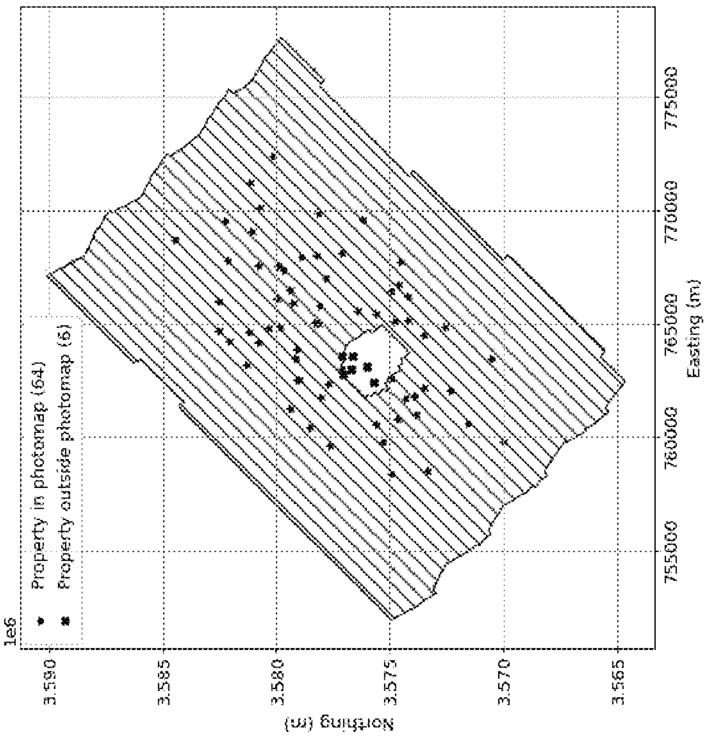
FIG. 27*d* is an illustration of property coverage for a survey operating in a fourth scenario for the case that the property coverage is determined based on the vertical coverage photomap according to exemplary aspects of the present disclosure.
Figure 27F:
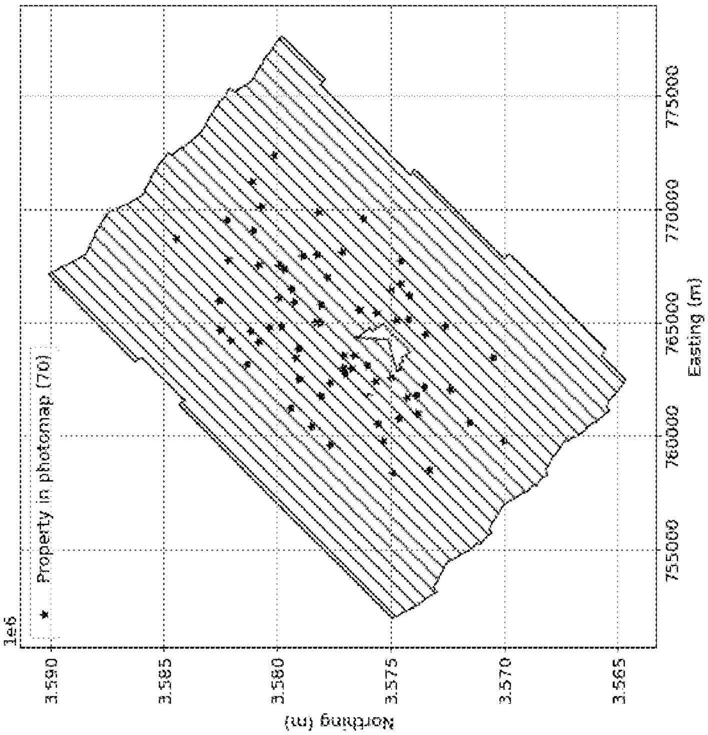
FIG. 27*f* is an illustration of property coverage for a survey operating in a sixth scenario for the case that the property coverage is determined based on the vertical coverage photomap according to exemplary aspects of the present disclosure.
Figure 27E:
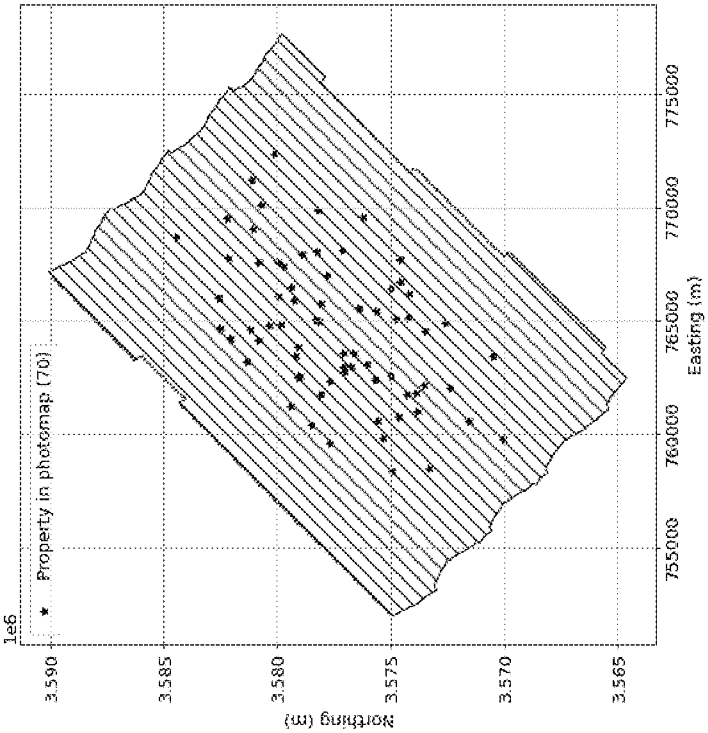
FIG. 27*e* is an illustration of property coverage for a survey operating in a fifth scenario for the case that the property coverage is determined based on the vertical coverage photomap according to exemplary aspects of the present disclosure.
Figure 28B:
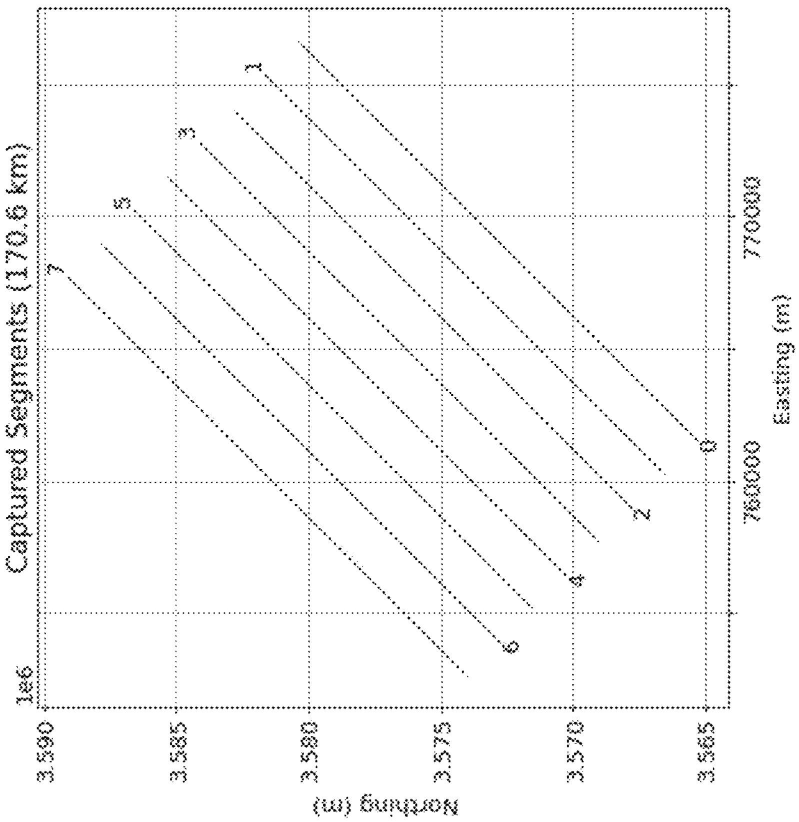
FIG. 28*b* is a set of captured segments according to exemplary aspects of the present disclosure.
Figure 28A:
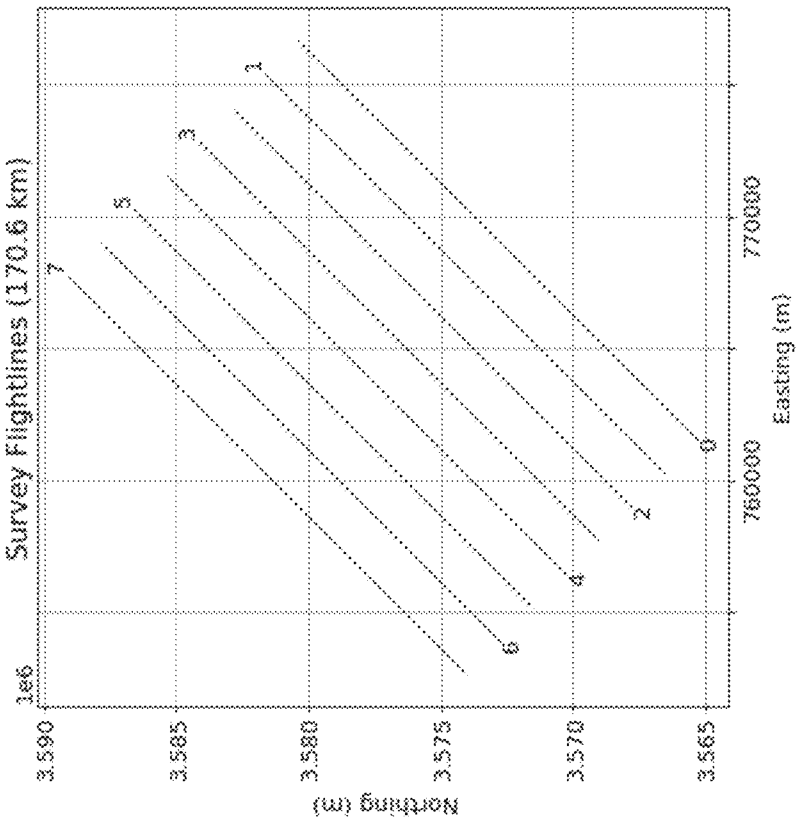
FIG. 28*a* are survey flight lines according to exemplary aspects of the present disclosure.
Figure 28C:
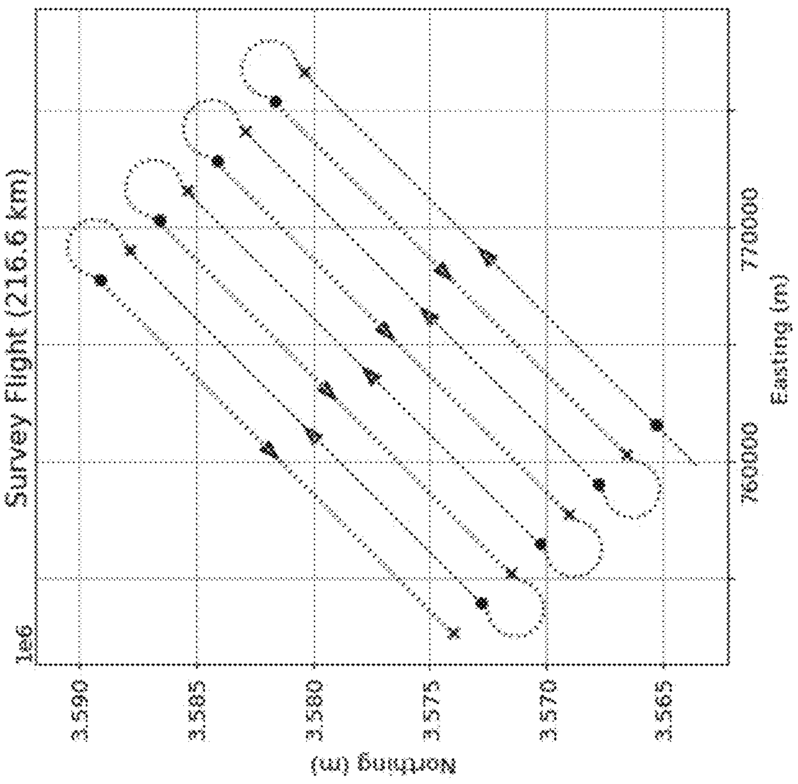
FIG. 28*c* is a survey flight according to exemplary aspects of the present disclosure.
Figure 28D:
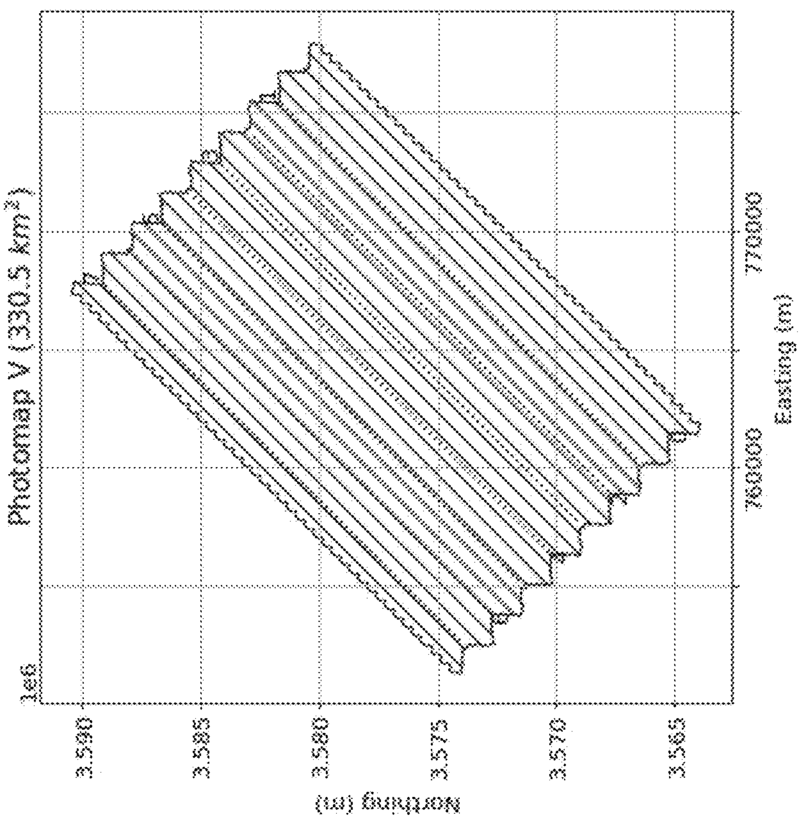
FIG. 28*d* is an illustration of the part of the ground covered by vertical imagery of a vertical photomap according to exemplary aspects of the present disclosure.
Figure 28E:
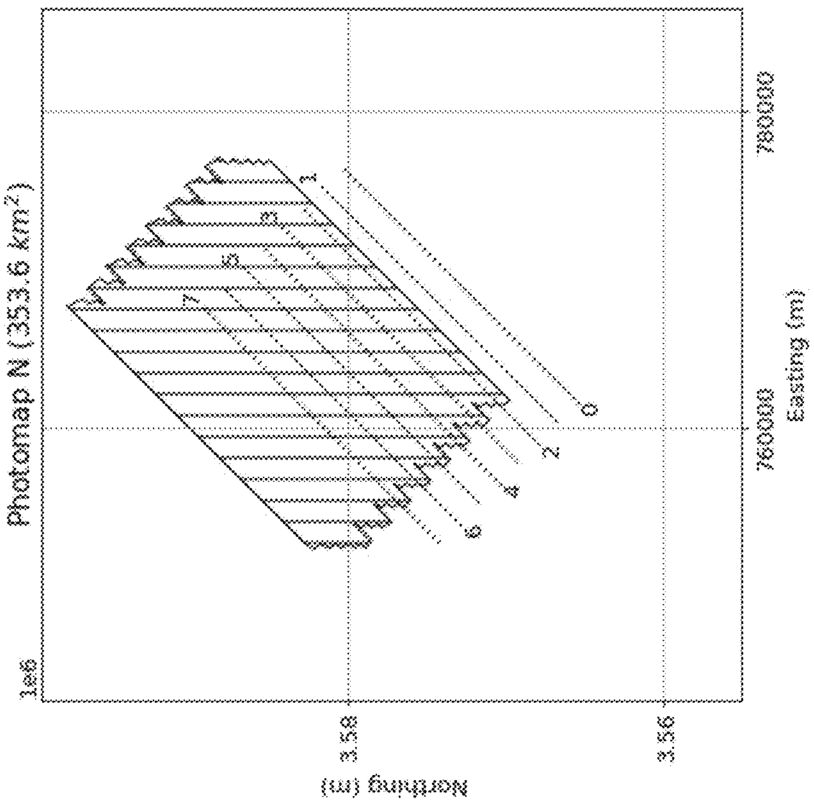
FIG. 28*e* is an illustration of the part of the ground covered by a north directed oblique photomap according to exemplary aspects of the present disclosure.
Figure 28F:
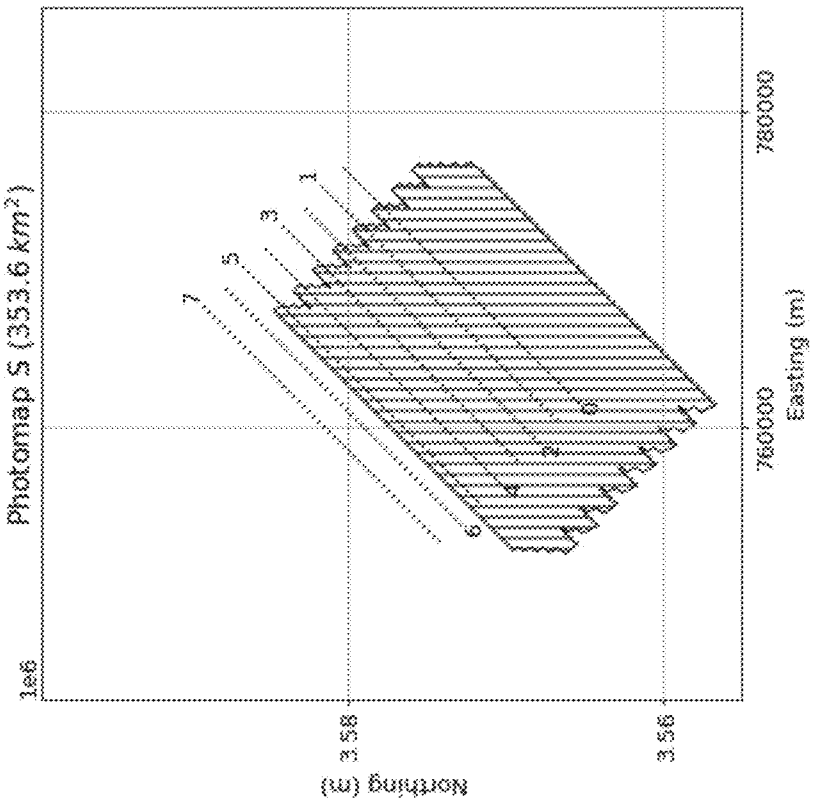
FIG. 28*f* is an illustration of the part of the ground covered by a south directed oblique photomap according to exemplary aspects of the present disclosure.
Figure 28H:
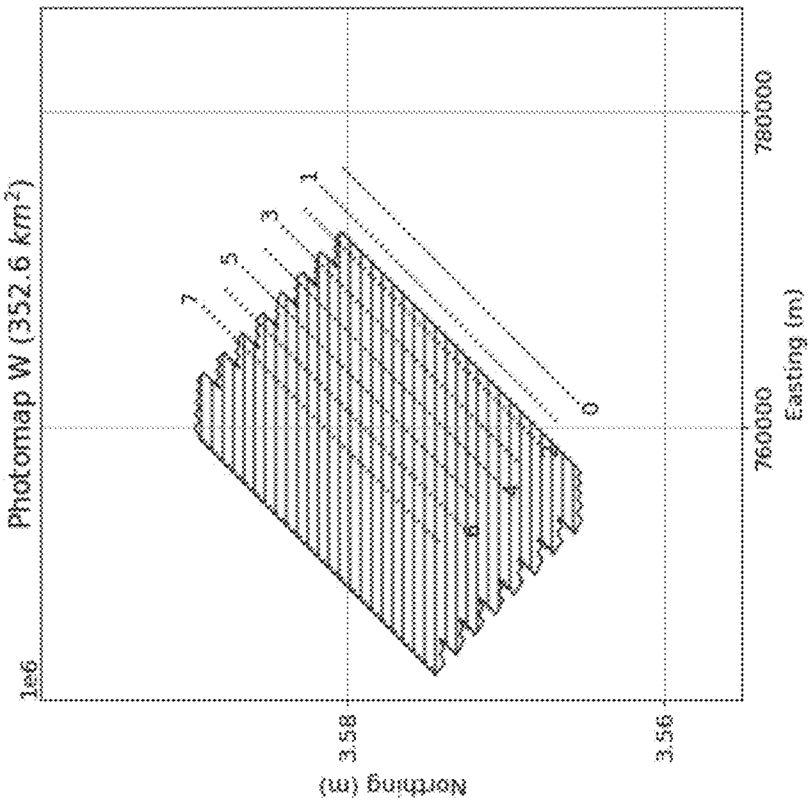
FIG. 28*h* is an illustration of the part of the ground covered by a west directed oblique photomap according to exemplary aspects of the present disclosure.
Figure 28G:
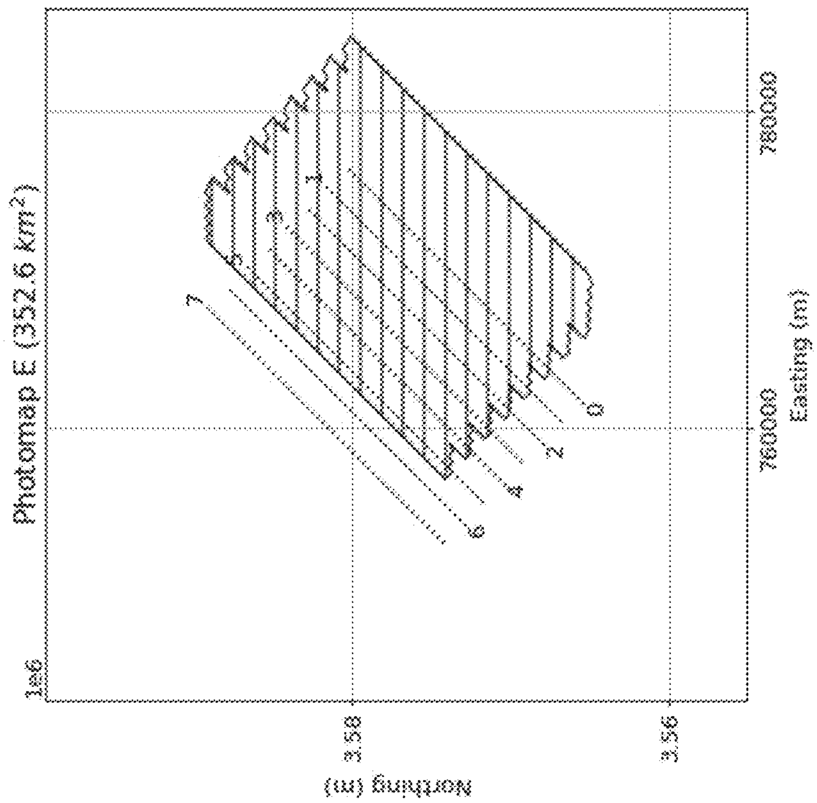
FIG. 28*g* is an illustration of the part of the ground covered by an east directed oblique photomap according to exemplary aspects of the present disclosure.

FIGS. 27*a* to 27*f* illustrate property coverage for the survey operating in multiple scenarios for the case that the property coverage is determined based on the vertical coverage photomap. FIG. 27*a* corresponds to ideal condition (as discussed with respect to FIG. 3 above) and in this case the vertical photomap coverage includes all 70 properties. FIG. 27*b* corresponds to windy conditions with yaw correction and gimbal steering (as discussed with respect to FIG. 22 above) and in this case the vertical photomap coverage includes all 70 properties. FIG. 27*c* corresponds to windy conditions with yaw correction and gimbal steering and 2% lost frames (as discussed with respect to FIG. 23 above) and in this case the vertical photomap coverage includes 69 of 70 properties. FIG. 27*d* corresponds to windy conditions with yaw correction and gimbal steering and cloud occlusion (as discussed with respect to FIG. 24 above) and in this case the vertical photomap coverage includes 64 of 70 properties. FIG. 27*e* corresponds to windy conditions with yaw correction and gimbal steering and cloud occlusion and two additional on-flight line segments (as discussed with respect to FIG. 25 above) and in this case the vertical photomap coverage includes all 70 properties. FIG. 27*f* corresponds to windy conditions with yaw correction and gimbal steering and cloud occlusion and one additional off-flight line segment (as discussed with respect to FIG. 26 above) and in this case the vertical photomap coverage includes all 70 properties.

FIGS. 28*a* to 28*h* illustrate ideal survey outcomes for the same flight map as FIGS. 3*a* and 3*b* above, but captured with an alternative scanning camera system 150 corresponding to the scan pattern of FIG. 1*f* above. This system may operate at a lower resolution relative to the scanning camera system 120, and may operate without motion compensation. The photomap coverage data has a more jagged outline due to the scan geometry. The vertical photomap of this geometry may be more robust due to the double coverage over low obliqueness frames from the two scanning cameras. The system may require a gimbal with a yaw axis in order to successfully capture obliques along preferred cardinal directions in the presence of side winds and yaw of the aerial vehicle. The geometry of additional flight line may be restricted to flight line directions along the original flight line directions due to the narrow azimuthal LOS coverage of the system.

FIGS. 29*a* to 29*h* show the survey outcome for the camera system 150 for the same flight map and scenario (high cross winds) and cloud occlusion as discussed with respect to FIGS. 24*a*-24*h* above and camera system 120. The outcomes for this scenario share many features for both camera systems 150 and 120. For example, there is a significant hole in the vertical photomap coverage of FIG. 29*d* resulting from cloud occlusion that is equivalent to the hole in the vertical photomap coverage of FIG. 22*d*. Likewise, the holes in photomap coverage data illustrated in FIGS. 29*c* to 29*h* are equivalent to those in the holes illustrated in FIGS. 22*e* to 22*h*, though are slightly smaller for the configuration of camera system 150.

Figure 29B:
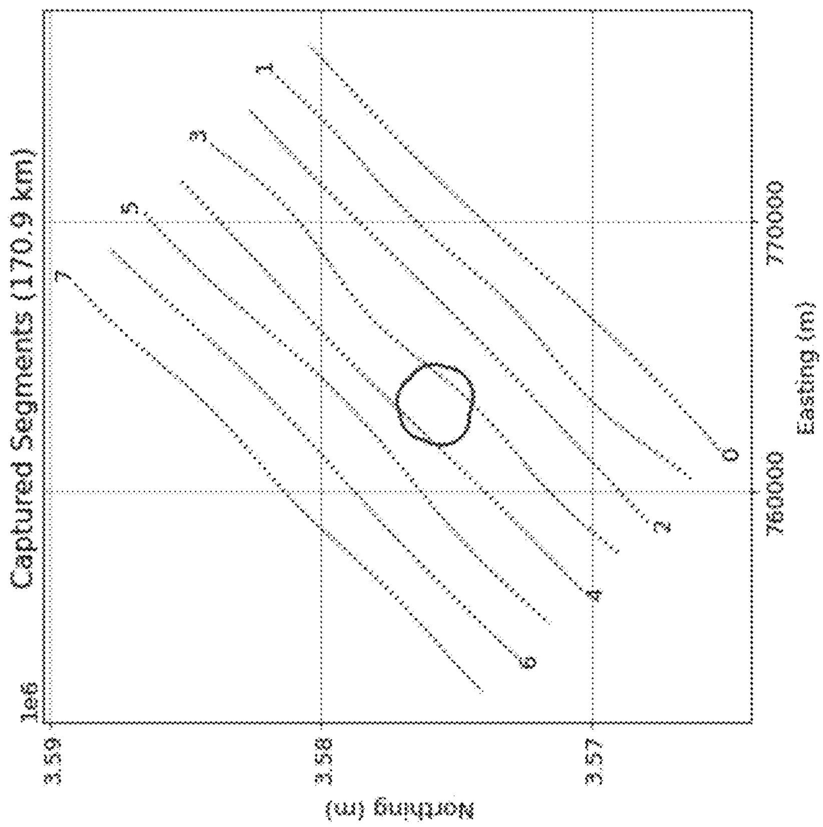
FIG. 29*b* is a set of captured segments according to exemplary aspects of the present disclosure.
Figure 29A:
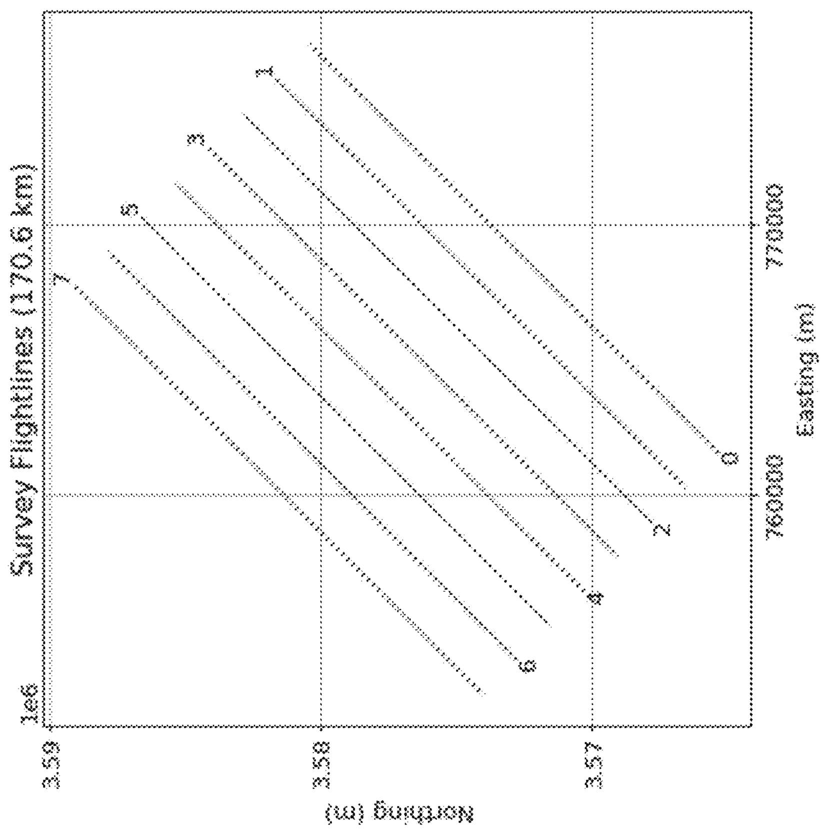
FIG. 29*a* are survey flight lines according to exemplary aspects of the present disclosure.
Figure 29C:
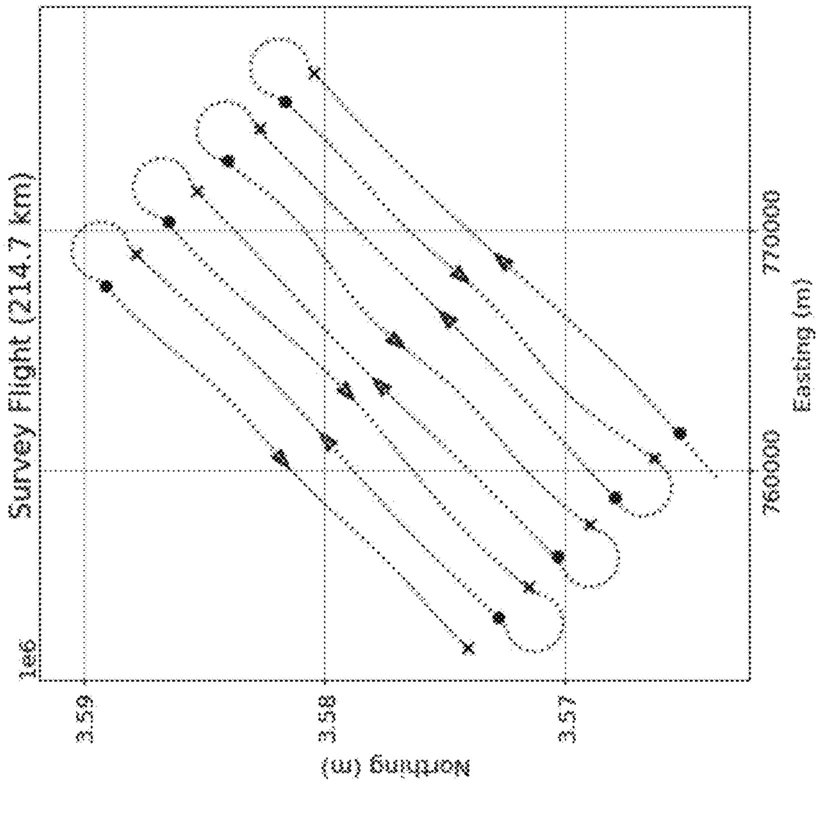
FIG. 29*c* is a survey flight according to exemplary aspects of the present disclosure.
Figure 29D:
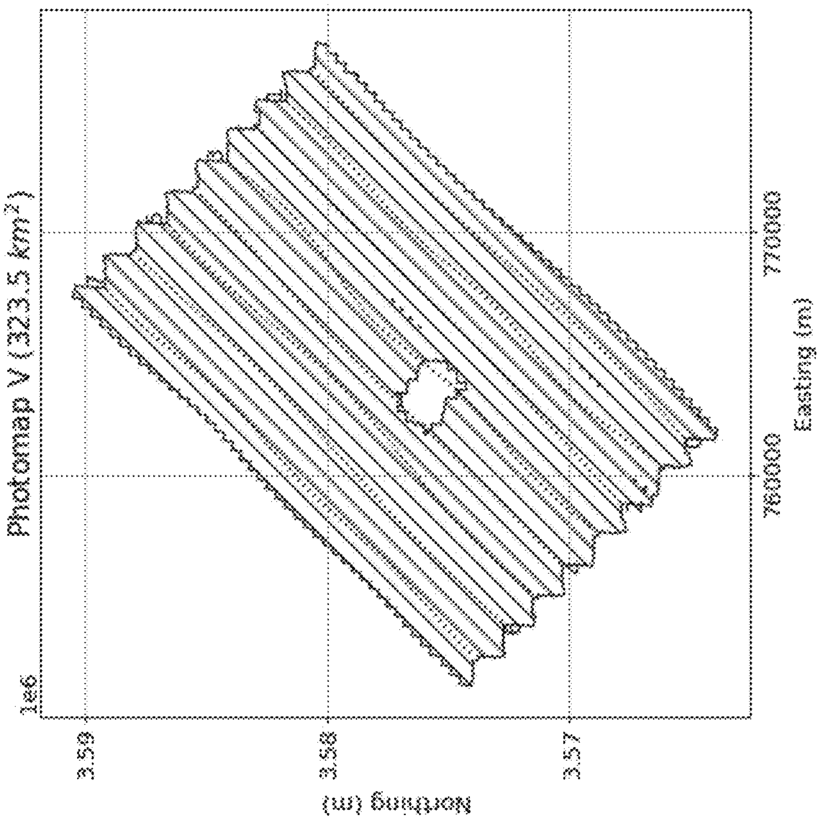
FIG. 29*d* is an illustration of the part of the ground covered by vertical imagery of a vertical photomap according to exemplary aspects of the present disclosure.
Figure 29E:
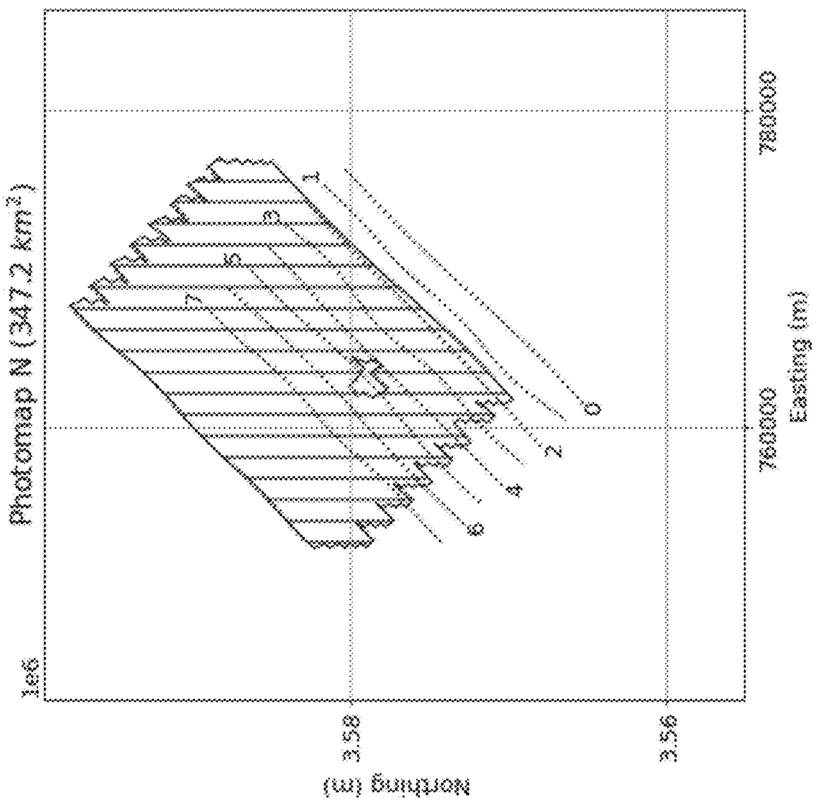
FIG. 29*e* is an illustration of the part of the ground covered by a north directed oblique photomap according to exemplary aspects of the present disclosure.
Figure 29F:
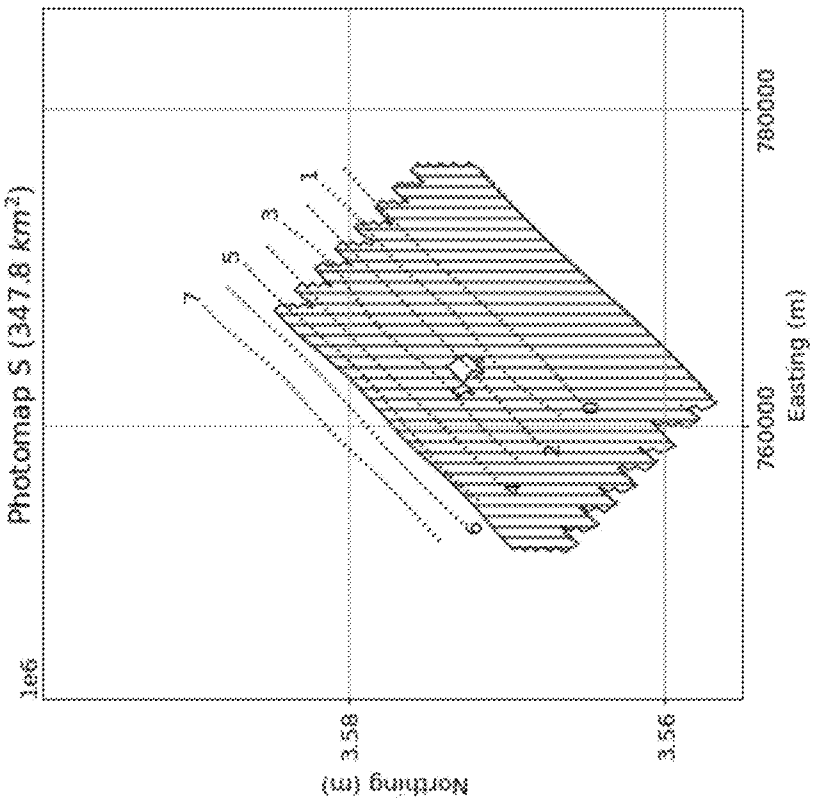
FIG. 29*f* is an illustration of the part of the ground covered by a south directed oblique photomap according to exemplary aspects of the present disclosure.
Figure 29H:
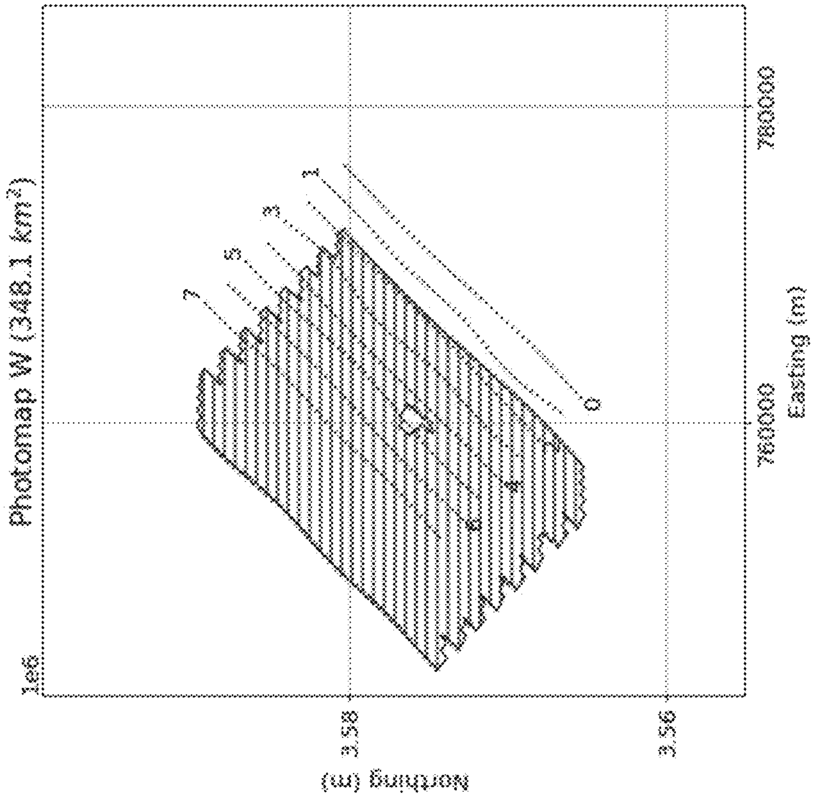
FIG. 29*h* is an illustration of the part of the ground covered by a west directed oblique photomap according to exemplary aspects of the present disclosure.
Figure 29G:
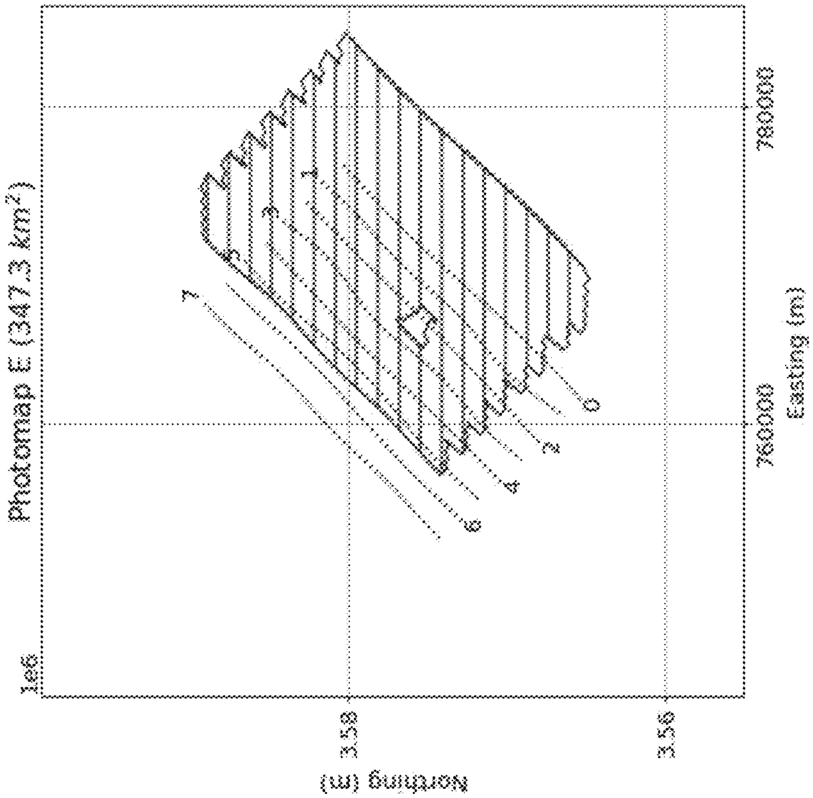
FIG. 29*g* is an illustration of the part of the ground covered by an cast directed oblique photomap according to exemplary aspects of the present disclosure.
Figure 30B:
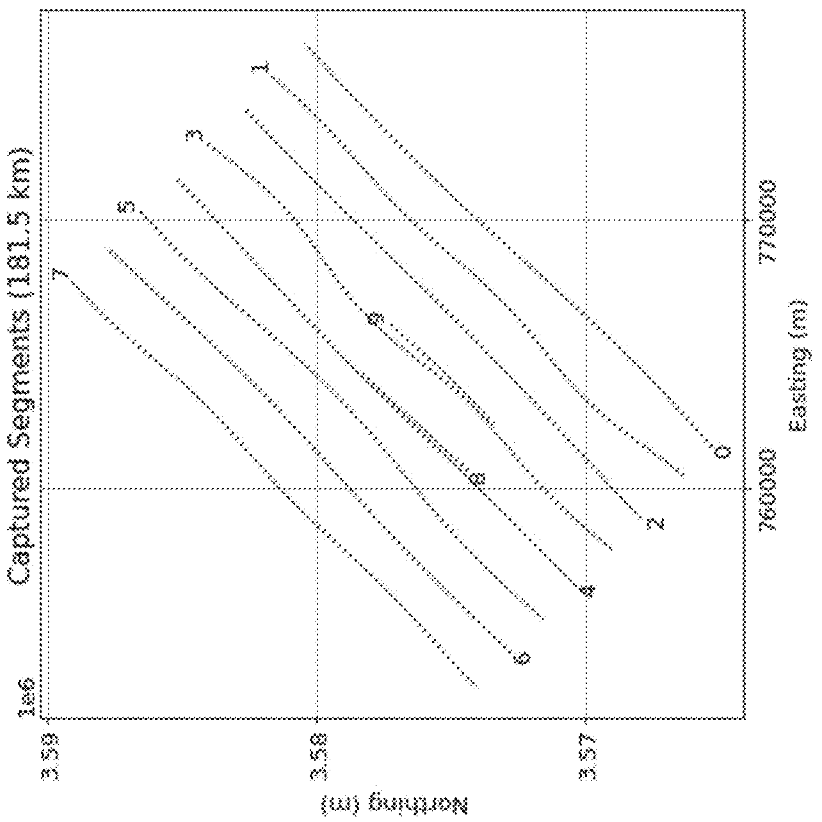
FIG. 30*b* is a set of captured segments according to exemplary aspects of the present disclosure.
Figure 30A:
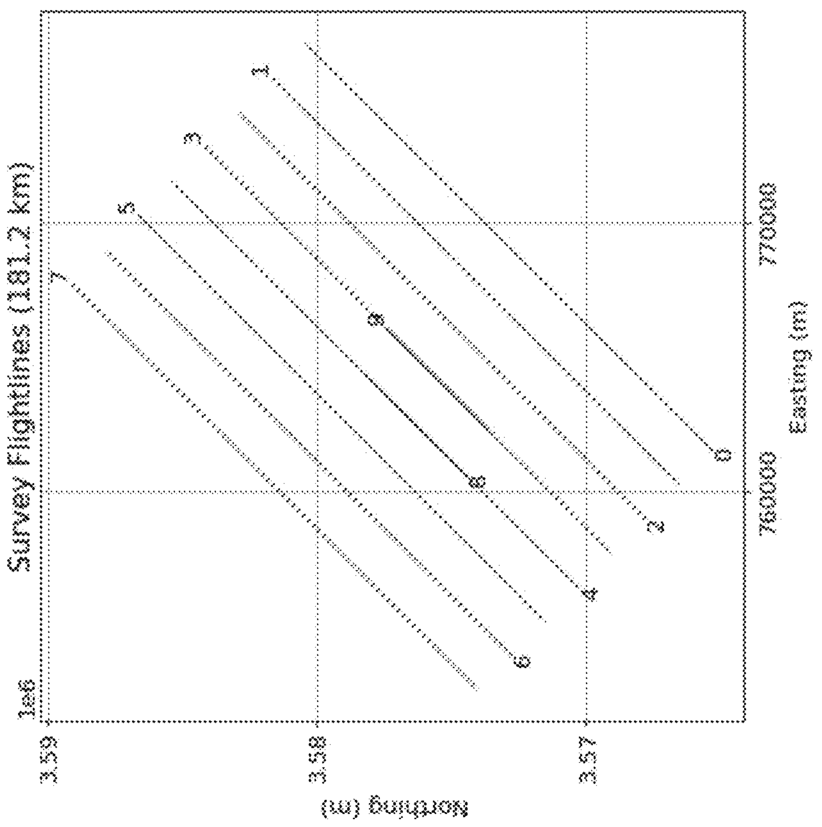
FIG. 30*a* are survey flight lines according to exemplary aspects of the present disclosure.
Figure 30C:
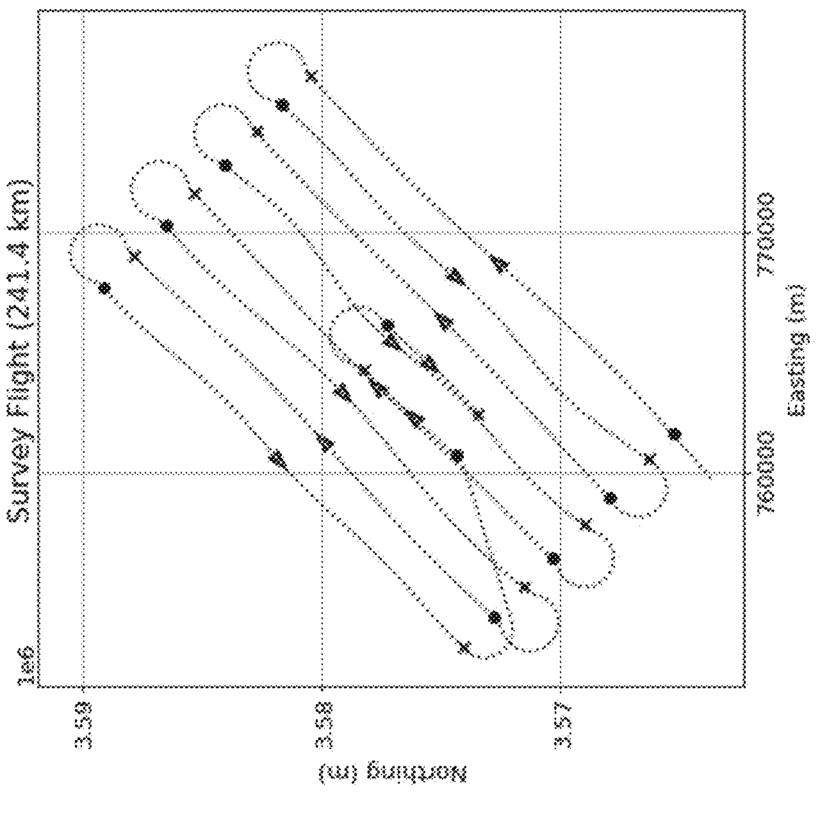
FIG. 30*c* is a survey flight according to exemplary aspects of the present disclosure.
Figure 30D:
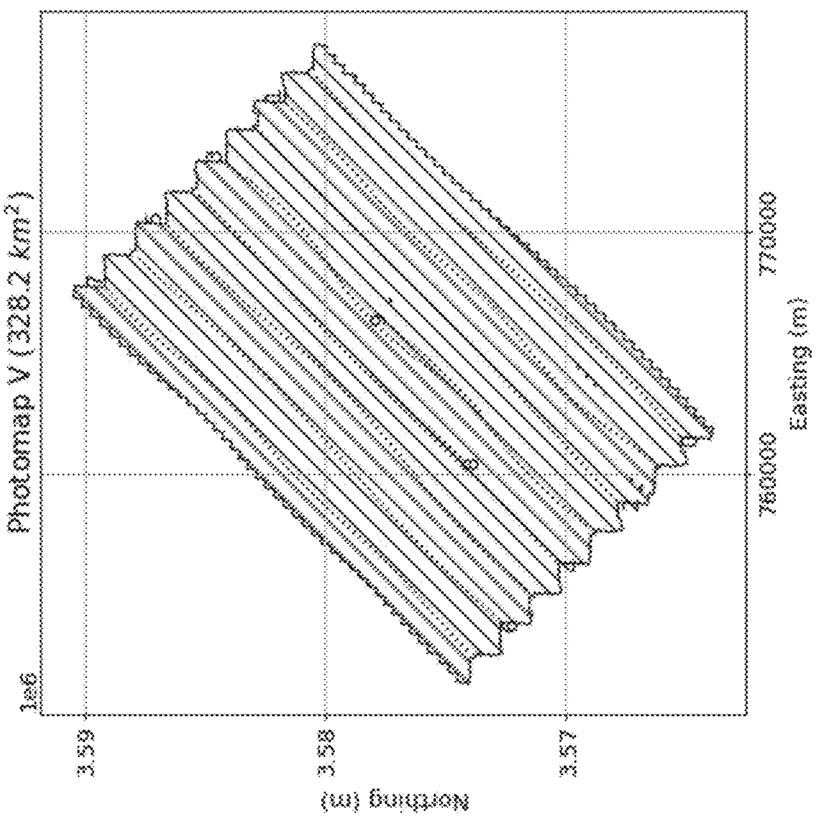
FIG. 30*d* is an illustration of the part of the ground covered by vertical imagery of a vertical photomap according to exemplary aspects of the present disclosure.
Figure 31A:
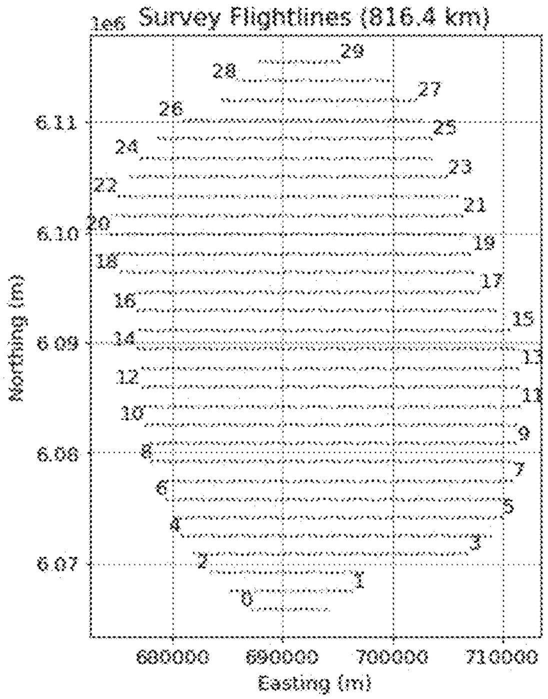
FIG. 31*a* are survey flight lines according to exemplary aspects of the present disclosure.
Figure 31B:
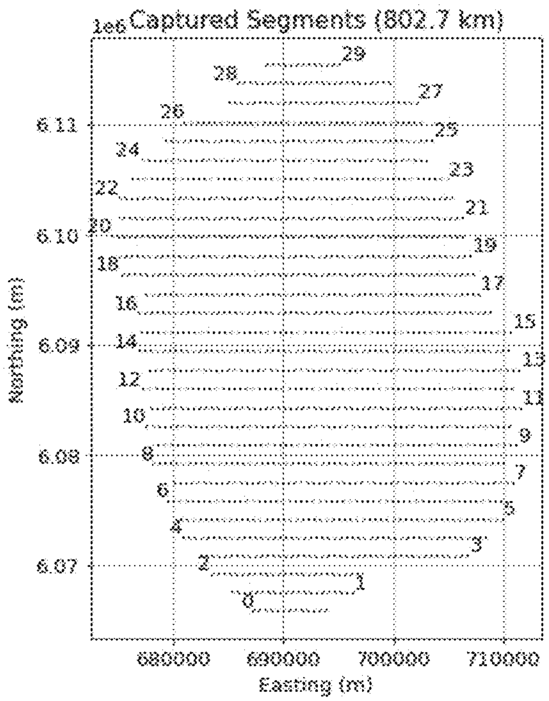
FIG. 31*b* is a set of captured segments according to exemplary aspects of the present disclosure.
Figure 31C:
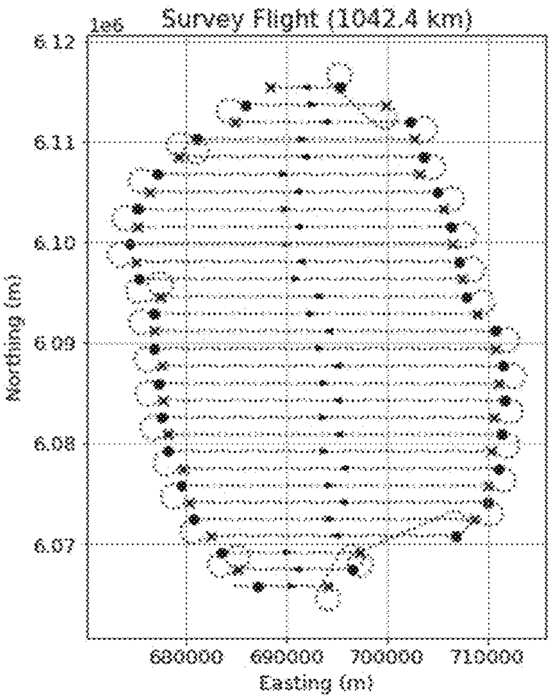
FIG. 31*c* is a survey flight according to exemplary aspects of the present disclosure.
Figure 31D:
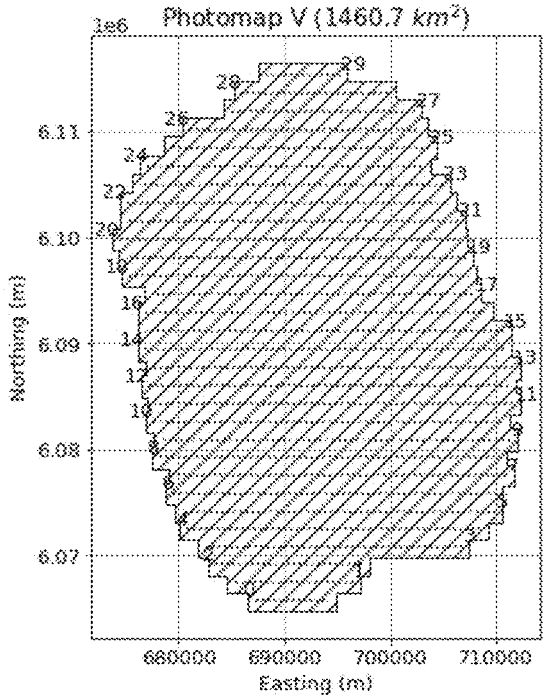
FIG. 31*d* is an illustration of the part of the ground covered by vertical imagery of a vertical photomap according to exemplary aspects of the present disclosure.
Figure 31E:
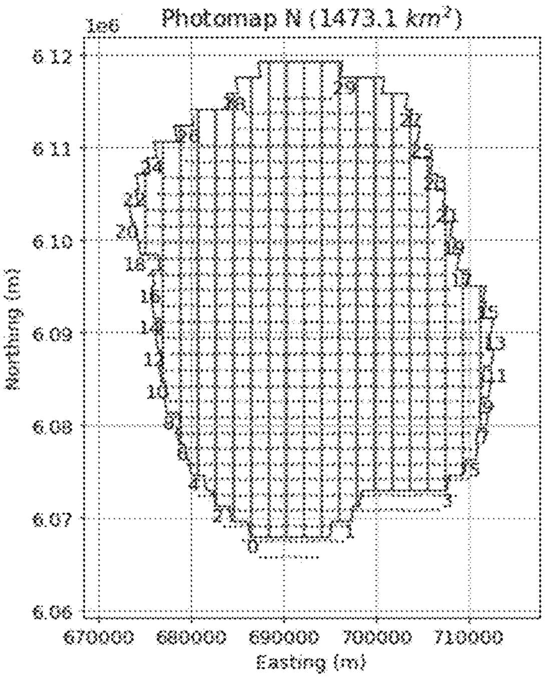
FIG. 31*e* is an illustration of the part of the ground covered by a north directed oblique photomap according to exemplary aspects of the present disclosure.
Figure 31F:
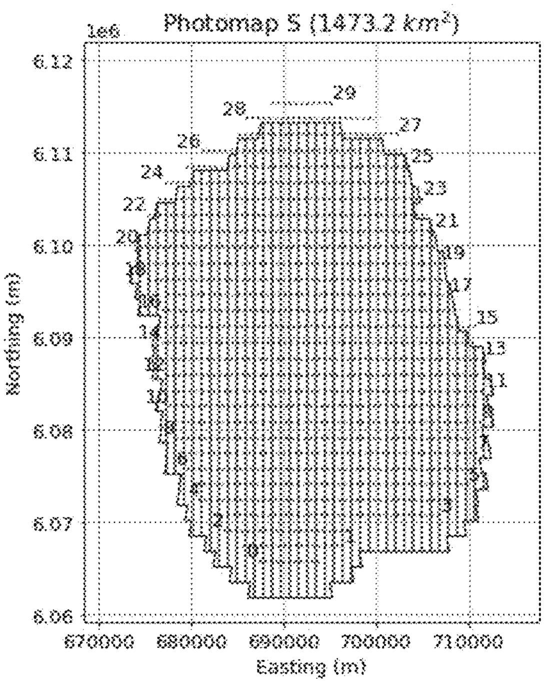
FIG. 31*f* is an illustration of the part of the ground covered by a south directed oblique photomap according to exemplary aspects of the present disclosure.
Figure 31G:
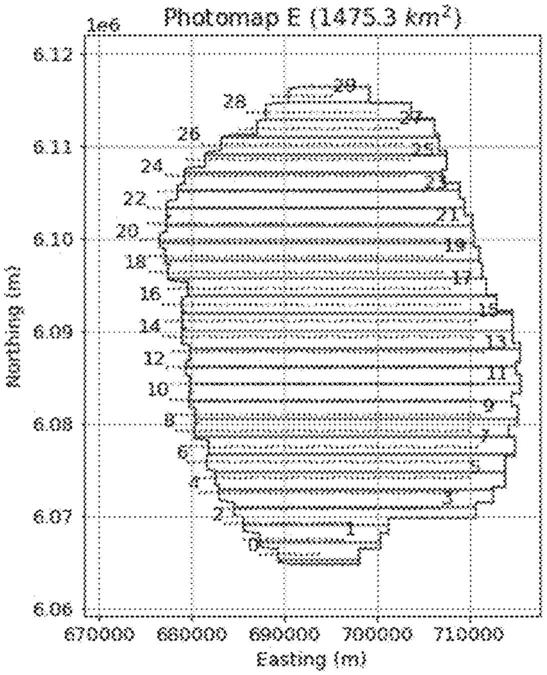
FIG. 31*g* is an illustration of the part of the ground covered by an east directed oblique photomap according to exemplary aspects of the present disclosure.
Figure 31H:
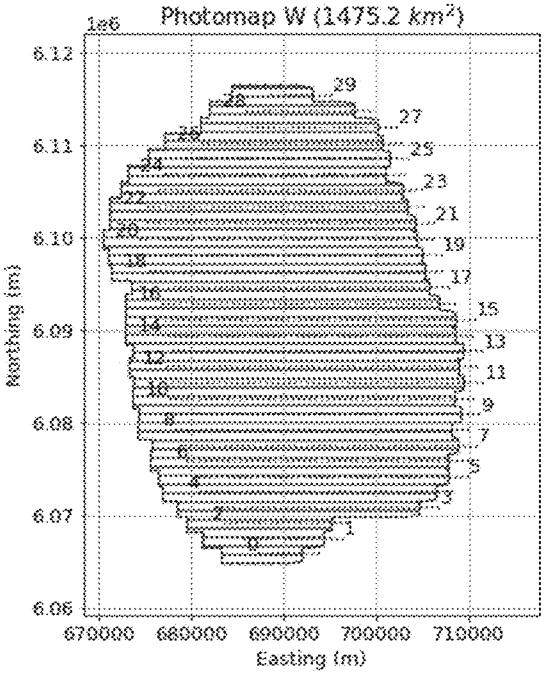
FIG. 31*h* is an illustration of the part of the ground covered by a west directed oblique photomap according to exemplary aspects of the present disclosure.

FIGS. 30*a* to 30*d* illustrate the same scenario as FIGS. 29*a*-29*d* but with two additional flight line segments flown to recover the vertical coverage and some of the oblique coverage. The additional flight lines 8 and 9, and the improved outcome for the vertical photomap coverage of FIG. 30*d* are equivalent to those seen in FIG. 24 for camera system 120. There are, however, differences in the selection of the additional flight lines given that the geometry of the hole in the vertical photomap coverage of FIG. 29*d* is slightly different from that of FIG. 24*d* and the scan pattern geometry and operation of camera system 150 are slightly different from those of camera system 120. The methods described below with respect to FIGS. 5 to 19 take into account the different scan patterns of different camera systems, build models of photomap coverage for sets of completed flight segments (in this case flight lines 0 to 7) including coverage from previously captured and predicted captures, and generated candidate flight maps such as that illustrated in FIG. 30*a* with the additional flight lines (8 and 9) designed to fill gaps in the coverage based on a predicted outcome. One or more candidate flight maps may be accepted and the updated flight lines flown as illustrated in FIGS. 30*b* and 30*c* in order to achieve an improved outcome as illustrated in FIG. 30*d*. Similarly, other techniques for improving the outcome including gimbal steering, hypershot queue updates, improved exposure models, etc., may be used with camera system 150 as for camera system 120 or indeed for other camera systems.

The camera system 160 discussed with respect to FIG. 1*g* should be flown along flight lines aligned with a cardinal direction in order to generate cardinal direction photomaps. FIGS. 31*a* to 31*h* show the flight lines, flight and photomap coverage generated when operating this camera system along East-West oriented flight lines. It is understood that the expected outcomes in the presence of environmental conditions, not acceptable frame capture, and other issues may be predicted based on the techniques described herein and the geometry and operation of the camera system. It is further understood that the techniques described below with respect to FIGS. 5 to 19 including updates to flight maps, gimbal steering, hypershot queue updates, exposure models, etc. may be applied to camera system 160.

The capture efficiency of aerial imaging is typically characterized by the area captured per unit time (e.g., square km per hour). For a serpentine flight path with long flight lines, a good rule of thumb is that this is proportional to the speed of the aircraft and the flight line spacing, or swathe width of the survey. A more accurate estimate would account for the time spent maneuvering between flight lines. Flying at increased altitude can increase the efficiency as the flight line spacing is proportional to the altitude and the speed can also increase with altitude, however, it would also reduce the resolution of the imagery unless the optical elements are modified to compensate (e.g., by increasing the focal length or decreasing the sensor pixel pitch).

The data efficiency of a scanning camera system may be characterized by the amount of data captured during a survey per area (e.g., gigabyte (GB) per square kilometer (km)). The data efficiency increases as the overlap of images decreases and as the number of views of each point on the ground decreases. The data efficiency determines the amount of data storage required in a scanning camera system for a given survey and will also have an impact on data processing costs. Data efficiency is generally a less important factor in the economic assessment of running a survey than the capture efficiency as the cost of data storage and processing is generally lower than the cost of deploying an aerial vehicle with a scanning camera system.

The maximum flight line spacing of a given scanning camera system may be determined by analyzing the combined projection geometries of the captured images on the ground (scan patterns) along with the elevation and azimuth of those captures, and any overlap requirements of the images such as requirements for photogrammetry methods used to generate image products. In order to generate high quality imaging products, it may be desirable to: (1) image every point on the ground with a diversity of capture elevation and azimuth, and (2) ensure some required level of overlap of images on the object area (e.g., for the purpose of photogrammetry or photomosaic formation). The quality of an image set captured by a given scanning camera system operating with a defined flight line spacing may also depend on various factors including image resolution and image sharpness as one of ordinary skill would recognize.

The image resolution, or level of detail captured by each camera, is typically characterized by the ground sampling distance (GSD), i.e., the distance between adjacent pixel centers when projected onto the object area (ground) within the camera's field of view. The calculation of the GSD for a given camera system is well understood and it may be determined in terms of the focal length of the camera lens, the distance to the object area along the line of sight, and the pixel pitch of the image sensor. The distance to the object area is a function of the altitude of the aerial camera relative to the ground and the obliqueness of the line of sight.

The sharpness of the image is determined by several factors including: the lens/sensor modular transfer function (MTF); the focus of the image on the sensor plane; the surface quality (e.g. surface irregularities and flatness) of any reflective surfaces (mirrors); the stability of the camera system optical elements; the performance of any stabilization of the camera system or its components; the motion of the camera system relative to the ground; and the performance of any motion compensation units.

The combined effect of various dynamic influences on an image capture may be determined by tracking the shift of the image on the sensor during the exposure time. This combined motion generates a blur in the image that reduces sharpness. The blur may be expressed in terms of a drop in MTF. Two important contributions to the shift of the image are the linear motion of the scanning camera system relative to the object area (sometimes referred to as forward motion) and the rate of rotation of the scanning camera system (i.e., the roll, pitch and yaw rates). The rotation rates of the scanning camera system may not be the same as the rotation rates of the aerial vehicle if the scanning camera system is mounted on a stabilization system or gimbal.

In addition to the resolution and sharpness, the quality of the captured images for use to generate these products may depend on other factors including: the overlap of projected images; the distribution of views (elevations and azimuths) over ground points captured by the camera system during the survey; and differences in appearance of the scene due to time and view differences at image capture (moving objects, changed lighting conditions, changed atmospheric conditions, etc.).

The overlap of projected images is a critical parameter when generating photomosaics. It is known that the use of a low-resolution overview camera may increase the efficiency of a system by reducing the required overlap between high resolution images required for accurate photogrammetry. This in turn improves the data efficiency and increases the time budgets for image capture.

The quality of the image set for vertical imagery depends on the statistics of the obliqueness of capture images over ground points. Any deviation from the zero obliqueness results in vertical walls of buildings being imaged, resulting in a leaning appearance of the buildings in the vertical images. The maximum obliqueness is the maximum deviation from vertical in an image and is a key metric of the quality of the vertical imagery. The maximum obliqueness may vary between 10 degrees for a higher quality survey up to 25 degrees for a lower quality survey. The maximum obliqueness is a function of the flight line spacing and the object area projective geometry of captured images (or the scan patterns) of scan drive units.

An orthomosaic (vertical photomap) blends image pixels from captured images in such a way as to minimize the obliqueness of pixels used while also minimizing artefacts where pixel values from different original capture images are adjacent. The maximum obliqueness parameter discussed above is therefore a key parameter for orthomosaic generation, with larger maximum obliqueness resulting in a leaning appearance of the buildings. The quality of an orthomosaic also depends on the overlap of adjacent images captured in the survey. A larger overlap allows the seam between pixels taken from adjacent images to be placed judiciously where there is little texture, or where the 3D geometry of the image is suitable for blending the imagery with minimal visual artefact. Furthermore, differences in appearance of the scene between composited image pixels result in increased artefacts at the seams also impacting the quality of the generated orthomosaic.

The quality of imagery for oblique image products can be understood along similar lines to that of vertical imagery and orthomosaics. Some oblique imagery products are based on a particular viewpoint, such as a 45-degree elevation image with azimuth aligned with a specific direction (e.g. the four cardinal directions North, South, East or West). The captured imagery may differ from the desired viewpoint both in elevation and azimuth. Depending on the image product, the loss of quality due to errors in elevation or azimuth will differ. Blended or stitched image oblique products (sometimes referred to as panoramas or oblique photomaps) may also be generated. The quality of the imagery for such products will depend on the angular errors in views and also on the overlap between image views in a similar manner to the discussion of orthomosaic imagery above.

The quality of a set of images for the generation of a 3D model is primarily dependent on the distribution of views (elevation and azimuth) over ground points. In general, it has been observed that decreasing the spacing between views and increasing the number of views will both improve the expected quality of the 3D model. Heuristics of expected 3D quality may be generated based on such observations and used to guide the design of a scanning camera system.

The flight path is generally designed to achieve a desired coverage for one or more region on the ground. The required coverage per region is determined by the set of products and outputs to be generated e.g., photomaps, 3D models, and other image derived products such as AI features. The regions may be large scale, such as entire cities or towns, or may be smaller scale such as particular property parcels, pieces of infrastructure, or aggregations thereof. For example each region may require high quality imagery close to one or more specific desired LOS (e.g. nadir LOS for a vertical photomap, or an LOS of 45 degree elevation pointing north for a north oblique photomap, etc.) or it may require a minimum distribution of LOSs (e.g., sufficient views to generate a high quality 3D product), or it may require imagery that shows the entirety of structure without any occlusions from e.g. pre-known vegetation such as trees (e.g., for an AI metric such as a score related to the condition of a roof).

In general, the flight path is fixed and the flight line spacing is fixed and constant. However, the flight line spacing may be non-uniform for a number of reasons. For example:

- to compensate for variations in the vertical distance between the aerial vehicle and the ground (e.g. the ground coverage may be reduced when imaging objects at high vertical elevations, for example on hills, or tall buildings due to the projection geometry).
- to compensate for known occluding objects such as trees, buildings, etc.
- to give an increased density of capture (and hence higher quality derived products) over specific regions of interest, such as locations of specific properties of interest (e.g., properties covered by an insurance company), locations with higher population density, or locations with large numbers of occluding objects (e.g. a region with many tall buildings such as a central business district of a large town or city).
- to take into account prevailing weather conditions that may make it difficult for the pilot to stay on a desired flight path such that there is an increased expected error in the actual relative to planned flight (this may happen for example when there are strong and unstable side winds affecting the aerial vehicle). In this case narrowing the flight line spacing may be used to maintain the coverage (i.e., the desired distribution of aerial imagery to generate high quality products).
- to compensate for errors in the flight path taken on previous flight lines that would result in a below acceptable coverage.
- to take into account predicted changes in survey conditions, for example if a weather front is approaching that would prevent the capture of acceptable imagery. In these circumstances it may be desirable to increase the spacing such that the full survey, or at least the most valuable parts of the survey can be completed before the survey is terminated, albeit at a slightly lower sample density (in terms of distribution of LOS angles captured at ground locations) and therefore with a reduced quality of some image derived products.
- to account for forced changes to the flight path requested by other aerial vehicles or authorities such as air traffic control (ATC).

The flight path may be updated beyond changes to the flight line spacings and forward spacings in order to adapt to feedback from on-board sensors, weather conditions, in-flight quality and coverage assessment data that may be generated using the system control 405 and/or auto-pilot. For example, in-flight quality assessment processing on the system control 405 may detect poor quality images that are not fit for purpose for reasons including:

- uncompensated motion blur due to unexpected motion of the vehicle (excessive motion, rotation beyond gimbal limits), instabilities in parts of the camera system, or events.
- focus errors (image focus incorrectly set during exposure).
- image exposure issues (over/under exposure).
- detected occlusions within the flight path (e.g., cloud, smoke, vegetation, aerial vehicles such as aircraft, ballons, helicopters, etc.).
- turbulence distortion or blur due to variations in the optical path between the ground and the image capturing device.
- exhaust fumes from aerial vehicles.
- low dynamic range (e.g. due to particulates in the atmosphere such as haze or fog).

Poor quality images may need to be rejected, resulting in a loss of coverage of the survey for specific regions and lines of sight (LOS). In this case the system control 405 may update the flight map such that images may be captured to achieve the desired coverage.

The forward spacing of captures may also be modified in keeping with changes to the flight path or flight line spacing. For example, if the local vertical distance is smaller as discussed above, then the forward spacing may be reduced to compensate. This may be done linearly in proportion to the coverage of the scan pattern on the ground, or non-linearly to account for other factors such as the stability of the flight. Note that the vertical distance to the ground may need to be considered for all projected ground locations for all frames of a current hypershot, which may require the ground height at many locations along many LOS to be considered.

The scan pattern may also be updated dynamically rather than being a fixed pattern. This may be beneficial in order to re-capture specific frames from the scan pattern that may be of a lower image quality without the need to change the flight path. Poor quality images due to uncompensated motion blur, focus errors and exposure issues, occlusions, turbulence or low dynamic range as discussed above may be re-captured in this way.

The system is configured to capture scan patterns with a forward spacing calculated to give sufficient coverage on the ground. Depending on the flight parameters including altitude and aircraft ground speed and optionally the ground DEM and aircraft location and pose, there may be time to capture additional frames within the current scan pattern time budget. The required time for additional frames may take into account the time to set mirror angles, gimbal target pose, operate motion compensation and/or capture and store image pixel data, for example through a framegrabber. The required time for additional frames should be lower than the available time budget, in which case the current hypershot scan pattern may be modified by an additional repeat frame of the detected low quality image frame. One or more additional frames may be captured on one or multiple scan drive units within a given hypershot. Image frame capture on all scan drives may be synchronized in order to avoid mechanical disturbances due to mirror motions or other motions (e.g., due to motion compensation elements or the gimbal) between frames.

Alternatively, rather than capturing additional frames during a hypershot, the system may re-capture the frame detected to have a low image quality, but then skip a subsequent frame to compensate. Preferably, the system may skip a frame considered to be of lower value. For example, some frames may not be required for generation of image products (photomaps, AI, etc.), or may not include known high value targets (e.g., specific properties or infrastructure of interest).

In one example, the cameras of 100 or 120 may utilize the Gpixel GMAX3265 sensor (9344 by 7000 pixels of pixel pitch 3.2 microns). The camera lenses may have a focal length of 420 mm and aperture of 120 mm (corresponding to F3.5) and may capture red-green-blue (RGB) images. Alternatively, or in addition to, cameras may capture different spectral bands such as near infra-red (NIR) or other infra-red bands, or they may be hyperspectral capturing a range of spectral bands. Other cameras and sensory types, for example synthetic aperture radio (SAR) and depth sensors such as Light Detection and Ranging (LIDAR) may be used without limitation as one of ordinary skill would recognize.

A fixed camera may be used as an overview camera, and the capture rate of the fixed camera may be set in order to achieve a desired forwared overlap between captured images, such as 60%. The flight line spacing of the survey may be limited such that the sideways overlap of overview camera images achieves a second desired goal, such as 40%. The overview camera may be directed vertically downward and may be rotated about the vertical axis such that the projected geometry on the object area is not aligned with the orientation of the aerial vehicle. There may be multiple fixed cameras, for example additional fixed cameras may capture different spectral bands such as near infra-red (NIR) or other infra-red bands.

One of ordinary skill will recognize that the scanning camera system 120 geometry may be modified in a number of ways without changing the essential functionality of each of the scan drive units 101, 102, 103. For example, the scan drive and mirror locations and thicknesses may be altered, the distances between elements may be changed, and the mirror geometries may change. In general, it is preferable to keep the mirrors as close together and as close to the lens as is feasible without resulting in mechanical obstructions that prevent the operationally desired scan angle ranges or optical obstructions that result in loss of image quality.

Furthermore, changes may be made to the focal distances of the individual lenses or the sensor types and geometries. In addition to corresponding geometric changes to the mirror geometries and locations, these changes may result in changes to the appropriate flight line distances, steps between scan angles, range of scan angles, and frame timing budgets for the system as one of ordinary skill would recognize.

Figure 4:
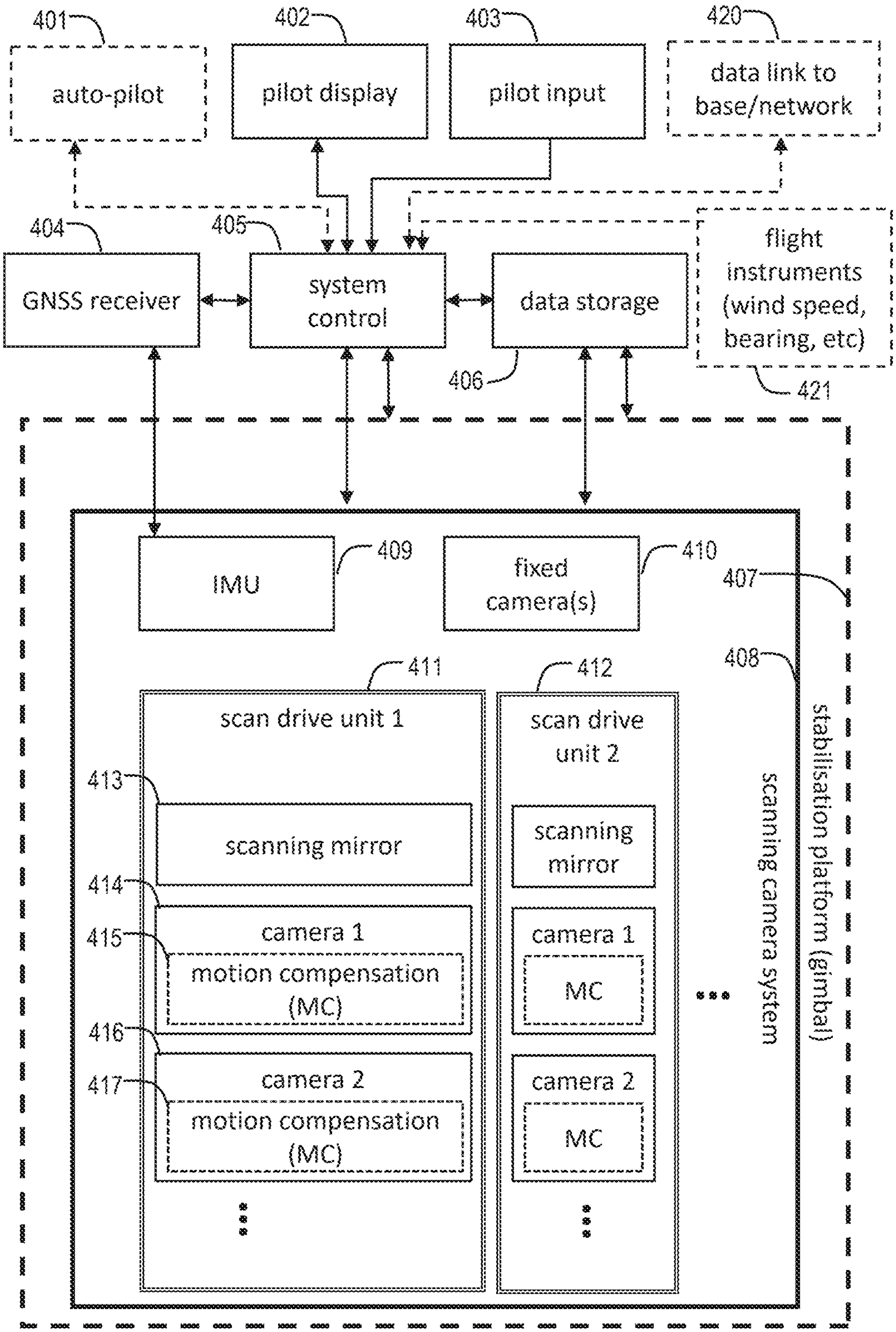
FIG. 4 is a block diagram of a control system for a camera system according to exemplary aspects of the present disclosure.

A scanning camera system may be operated during a survey by a system control 405. A high-level representation of a suitable system control 405 is shown in FIG. 4. Components enclosed in dashed boxes (e.g., auto-pilot 401, motion compensation (MC) unit 415) represent units that may be omitted in other exemplary embodiments. The system control 405 may have interfaces with the scanning camera system 408, stabilization platform 407, data storage 406, GNSS receiver 404, auto-pilot 401, pilot display 402 and pilot input 403. The system control 405 may comprise one or more computing devices that may be distributed, such as computers, laptop computers, micro controllers, ASICS or FPGAs, or other circuitry, to control the scan drive units and fixed cameras of the camera system during operation. The system control 405 can also assist the pilot or auto-pilot of the aerial vehicle to follow a suitable flight path over a ground region of interest, such as the serpentine flight path discussed with respect to FIG. 3*c*. The system control 405 may be centrally localized or distributed around the components of the scanning camera system 408. The system control 405 may use Ethernet, serial, CoaxPress (CXP), CAN Bus, $i^2C$, SPI, GPIO, custom internal interfaces or other interfaces as appropriate to achieve the required data rates and latencies of the system. As can be appreciated, the exact hardware and communication protocols used by the system control 405 are not limiting and numerous variations and alterations may be made without departing from the scope of the present disclosure.

The system control 405 may also include one or more interfaces to the data storage 406, which can store data related to survey flight path, scan drive geometry, scan drive unit parameters (e.g., scan angles), Digital Elevation Model (DEM), Global Navigation Satellite System (GNSS) measurements, inertial measurement unit (IMU) measurements, stabilization platform measurements, other sensor data (e.g., thermal, pressure), motion compensation data, mirror control data, focus data, captured image data and timing/synchronization data. The data storage 406 may also include multiple direct interfaces to individual sensors, control units and components of the scanning camera system 408 as one of ordinary skill would recognize.

The system control 405 may also have interfaces with one or more communications links 420 to one or more remote systems, for example base stations, data storage repositories, or other vehicles used for survey or related activities. This includes other aerial vehicles equipped with aerial camera systems that may be actively flying to survey locations or performing image capture. The data link allows for a coordinated aerial survey to be performed that makes the best use of the resources available, the current and predicted survey conditions, based on the priorities of the survey as will be described in further detail below. The data link allows for updates to data storage 406 discussed above to be uploaded to the aerial vehicle. Suitable data links include satellite data communication links, ground-based communication links, and may be based on optical, radio or other suitable wireless communications technologies as one of ordinary skill would recognize. Uploads may send data to various destinations that may include cloud storage such as Amazon Web Service™, Microsoft Azure™, or Google Cloud Platform™.

The system control 405 may further include interfaces with one or more additional flight instruments such as altimeters, compasses, and anemometers which may be used to measure aspects of the aerial vehicles flight including altitude, bearing and air speed and/or velocity (i.e. directional air speed). Other sensors and instrumentation are also possible without departing from the scope of the present disclosure.

The scanning camera system 408 may comprise one or more scan drive units 411, 412, an IMU 409 and fixed camera(s) 410. The IMU 409 may comprise one or more individual units with different performance metrics such as range, resolution, accuracy, bandwidth, noise, and sample rate. For example, the IMU 409 may comprise a KVH 1775 IMU that supports a sample rate of up to 5 kHz. The IMU data from the individual units may be used individually or fused for use elsewhere in the system. In one embodiment, the fixed camera(s) 410 may comprise a Phase One iXM100, Phase One iXMRS100M, Phase One iXMRS150 M, AMS Cmosis CMV50000, Gpixel GMAX3265, or IO Industries Flare 48 M30-CX and may use a suitable camera lens with focal length between 50 mm and 200 mm.

The system control 405 may use data from one or more GNSS receivers 404 to monitor the position and speed of the aerial vehicle 110 in real time. The one or more GNSS receivers 404 may be compatible with a variety of space-based satellite navigation systems, including the Global Positioning System (GPS), GLONASS, Galileo and Bei-Dou.

The scanning camera system 408 may be installed on a stabilization platform 407 that may be used to isolate the scanning camera system 408 from disturbances that affect the aerial vehicle 110 such as attitude (roll, pitch, and/or yaw) and attitude rate (roll rate, pitch rate, and yaw rate). It may use active and/or passive stabilization methods to achieve this. Ideally, the scanning camera system 408 is designed to be as well balanced as possible within the stabilization platform 407. In one embodiment the stabilization platform 407 includes a roll ring and a pitch ring so that scanning camera system 408 is isolated from roll, pitch, roll rate and pitch rate disturbances. In some embodiments the system control 405 may further control the capture and analysis of images for the purpose of setting the correct focus of lenses of the cameras of the scan drive units 411, 412 and/or fixed camera(s) 410. The system control 405 may set the focus on multiple cameras based on images from another camera. In other embodiments, the focus may be controlled through thermal stabilization of the lenses or may be set based on known lens properties and an estimated optical path from the camera to the ground. Some cameras of the scanning camera system 408 may be fixed focus. For example, some of the fixed focus cameras used for overview images may be fixed focus.

Each scanning camera system is associated with some number of scan drive units. For example, scanning camera system 408 includes scan drive unit 411, 412, though more can be included. Each scan drive unit 411, 412 shown in FIG. 9 may comprise a scanning mirror 413 and one or more cameras 414, 416.

Figure 9:
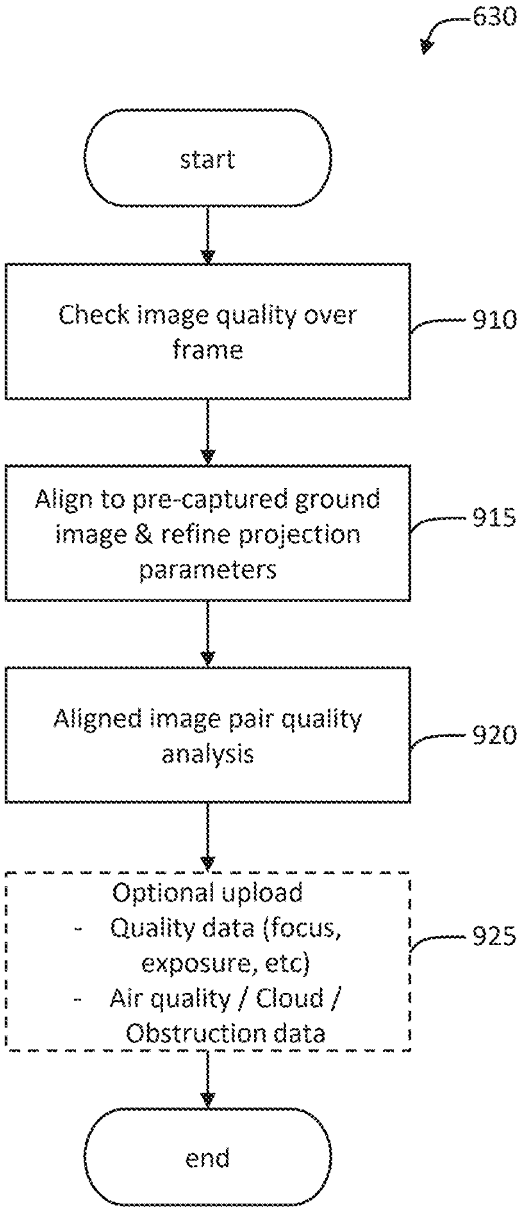
FIG. 9 is another flow chart of frame analysis according to exemplary aspects of the present disclosure.

Each camera 414, 416 of FIG. 9 may comprise a lens, a sensor, and optionally a motion compensation unit 415, 417. The lens and sensor of the cameras 414, 416 can be matched so that the field of view of the lens is able to expose the required area of the sensor with some acceptable level of uniformity.

Each lens may incorporate a focus mechanism and sensors to monitor its environment and performance. It may be thermally stabilized and may comprise a number of high-quality lens elements with anti-reflective coating to achieve sharp imaging without ghost images from internal reflections. The system control 405 may perform focus operations based on focus data between image captures. This may use known techniques for auto-focus based on sensor inputs such as images (e.g., image texture), LIDAR, Digital Elevation Model (DEM), thermal data or other inputs.

Figure 5:
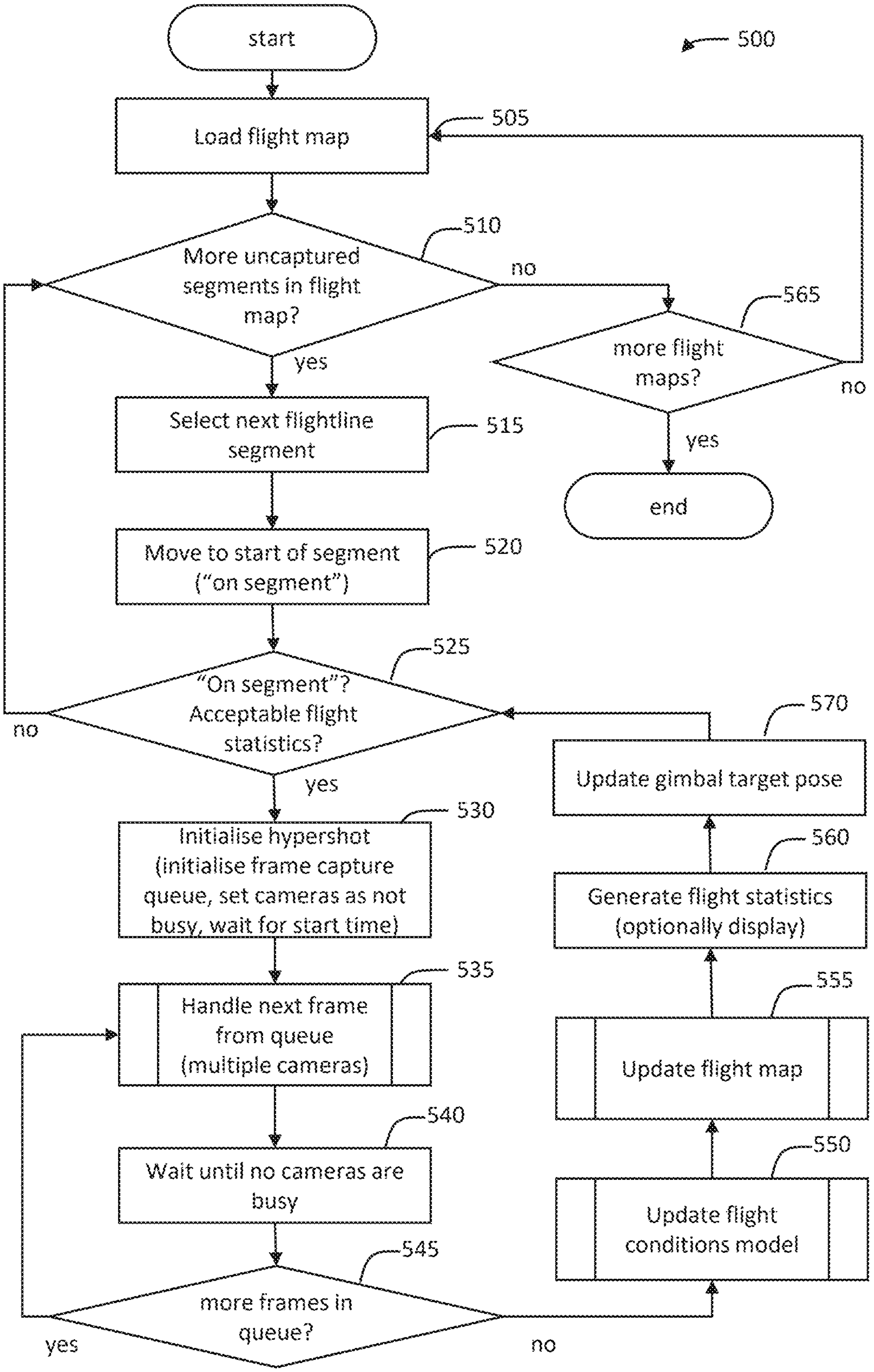
FIG. 5 is a flow chart of a flight control process according to exemplary aspects of the present disclosure.

FIG. 5 is a flow chart that illustrates the flight control process 500 operating on board an aerial vehicle that manages the capture of an aerial survey for an exemplary embodiment of the disclosure. The flight control process 500 may operate in an autonomous vehicle, providing direct control of the flight of the aerial vehicle. Alternatively, the flight control process may operate in a piloted aircraft, in which case it provides instructions to a pilot on how to navigate the aerial vehicle in order to perform the aerial survey. The instructions may be provided through a visual interface such as one or more screens, and/or through other methods including, but not limited to, audio, haptic, etc.

Process 500 starts at step 505 which loads a flight map into memory. The flight map may be loaded from local memory onboard the aerial vehicle, or it may be loaded from a remote server using a suitable communications link 420. If there are multiple surveys to select from, the selection may be made according to a ranking, by the pilot, by a remote operator, or other suitable method. The selection may be made based partly or entirely by instructions, approvals or other input from air traffic control (ATC) either directly to a pilot, to an operator communicating with ATC from a control center or other remote location, or via another appropriate communication channel. The flight map may include one or more flight lines which are paths along which the vehicle navigates while the camera system captures imagery of the survey region. The flight lines may be straight or curved, may be at fixed or variable altitude. The flight lines may be adjacent and parallel or distributed in some other manner selected in order to achieve a good coverage of a survey region according to one or more appropriate criteria that may include the ability to generate high quality photomaps, 3D models, or other image derived products such as AI outputs suitable for insurance or other industry. The flight lines may be broken up into one or more segments, which are sub-sections of the flight lines. A simple flight map is illustrated in FIG. 20 (*a*) that includes a set of 8 parallel flight lines, 4 heading north-east and 4 south-west. This flight map is suitable for the generation of photomaps along cardinal directions using a camera system such as the system discussed with respect to FIG. 3.

During process 500 progress on capturing the survey for the current flight map is stored, and the flight map may be adapted based on the prevailing conditions, the performance of the camera system, live data provided from other aerial vehicles performing adjacent or overlapping surveys, input from air traffic control (ATC), or other sources. After loading the flight map, processing continues to step 510 which checks if there are any segments that have not been captured remaining in the current flight map. If there are, then processing continues to step 515 which selects the next flight line segment to capture. The selection of the next segment to capture depends on the remaining segments to be captured, the prevailing conditions, the current location and speed of the aircraft and other factors including instructions or approvals from ATC. Preferably, the segments are maintained in a queue such that the first segment in the queue should be selected, as will be discussed with respect to step 1330 and FIG. 13, and also 1640 of FIG. 16 below.

If at step 510 it is determined that there are no further segments to capture, processing continues to 565 which checks if there are any more flight maps to load, in which case processing returns to 505. Otherwise, process 500 ends. In this situation, the aerial vehicle may return to a suitable landing site, may await further instructions, or may undertake a different task.

Once a flight line segment has been selected at 515, the aerial vehicle follows a trajectory to bring it to the start location of the segment with a velocity that matches the local direction of the segment to within a suitable tolerance in terms of both location and velocity. A suitable threshold may be made based on achieving a particular level of overlap for vertical photomap captured images based on a pessimistic model of the accuracy of the flight. Another suitable location tolerance may be that the smallest angle of obliqueness of an image captured from the aircraft to the current segment is below a threshold, for example 6 degrees. A suitable direction tolerance may be that the angle between the current ground velocity and the direction of the flight line segment at the closest location to the aerial vehicle is below a threshold, for example 15 degrees. When the aerial vehicle meets the appropriate criteria, it is referred to as "on segment". The path taken by the aerial vehicle in order to achieve a status of "on segment" may be selected by a pilot, with or without input from the flight control software, or may be determined automatically based on the aircraft flight tracking, the prevailing conditions, and other inputs such as ATC. Once the aerial vehicle is deemed "on segment" at 520, processing continues through 525 to 530.

Step 530 initializes the next hypershot, a configured set of frames to capture on the cameras of the camera system as was discussed with respect to camera systems 120, 140, 150, 160 above. Initialization of the hypershot generates an ordered queue of frames to be captured to complete the hypershot. Tables 1-6 are illustrative of the hypershot configurations for the cameras of the camera system that can define the ordered queue associated with the cameras of the camera system. Step 530 also initializes a tracker for each camera that is not busy (i.e. ready to process frames). Initializing the next hypershot may also wait for a period of time determined to ensure correct forward overlap between captured images as was discussed above.

In some cases, the initial hypershot queue may be customized at step 530. For example, if specific ground regions of interest have a higher priority, i.e., if they contain a property of interest, the hypershot may include a larger number of frames expected to capture that property. This may be achieved by tracking the progress of the camera system relative to the property to determine when one or more of its cameras may be capable of capturing images of that region for suitable parameters such as scanning mirror angle. Additional frames for which the projection geometry would be expected to include the region of interest are added to give greater redundancy of capture for the region of interest. Depending on the time budget of the hypershot determined based on the aircraft flight parameters (altitude, speed, etc.) it may be possible to add frames, increasing the number of captures in the hypershot. The required extra time to add frames may be computed based on factors such as times to move or initialize mirrors, motion compensation units and/or gimbals and times to capture and save image data, for example through a framegrabber. On the other hand, it may be necessary to sacrifice some captures based on priority of frames, and also based on whether specific frames may be dropped (or omitted) without reducing the coverage of the survey based on estimation methods described herein.

Step 535 handles the next frame in the ordered queue for each camera that has remaining frames in its queue (removing the frame from the queue). It is generally preferable to handle frames simultaneously for multiple cameras for reasons discussed below, however, in alternative embodiments they may be independently processed and/or sequentially processed. Processing of frames includes image capture parameter setting, synchronization and triggering, and various analyses of the status of camera system during exposure, its environment and of the image data itself. Process 535 will be described in further detail below with respect to FIG. 6. Once the frame has been captured and necessary processing is complete on the one or more cameras, processing continues to step 540. The system may operate in a concurrent fashion, in which case processing moves to step 540 without waiting for step 535 to complete. Step 540 waits for until all cameras are marked as not busy (i.e., are ready to start to process the next frame as will be discussed below with respect to step 612 and FIG. 6). Step 540 may additionally wait for the completion of some aspect of processing of the frame data, for example the frame analysis of step 615, the frame image analysis of step 620, or the property image analysis of step 630 (all of which are described with respect to FIG. 6 below). Thus, the exact timing used to return the gimbal to its original pose (or to move it to another pose) is not limiting upon the present disclosure.

Once all cameras have been determined as ready to process the next frame at step 540, processing continues to step 545 which determines if there are more frames in the queue, in which case processing returns to step 535. If at step 545, no more frames are found in the queue then processing continues to step 550 which updates a model of flight conditions as will be described in further detail with respect to FIG. 18 below. Processing then continues to step 555 which updates the flight map as will be described in further detail with respect to FIG. 12 below. Next, at step 560 flight statistics are generated which may optionally be presented to the pilot though an appropriate display device. Flight statistics may include data related to the accuracy with which the current flight segment has been tracked by the aerial vehicle. Next, at step 570, the target gimbal pose may be updated, for example in order to return it from a pose that was set in order to meet a time budget requirement as will be described further with respect to FIG. 11 below. The changes applied to the gimbal may return over a set number of hypershots or a set time frame according to a linear or non-linear functional form. For example, if the gimbal target pose was horizontal, but had its pitch modified by a step, then it may return to horizontal based on a linear function of time over 4 hypershots or 10 seconds or some other suitable period. Thus, the exact timing and/or method used to return the gimbal to its original pose (or to move it to another pose) is not limiting upon the present disclosure.

Processing then continues to step 525 which checks whether the aerial vehicle is still on the flight segment and optionally whether any available flight statistics are acceptable, in which case processing continues to step 530 which initializes the next hypershot. At this step, if instructions from ATC or other have requested the aerial vehicle to leave the current flight line this may set the aerial vehicle as not "on segment" in order to force the vehicle to leave its current path. Otherwise processing returns to step 510.

Processing 500 may be entirely performed on board an aerial vehicle, or it may be partly performed remotely. This may be advantageous in the case that a central flight control center manages a fleet of aerial vehicles to efficiently capture high value survey regions that may include specific target properties. For example, the selection of flight maps and allocation of flight line segments to a particular aerial vehicle may be performed at the remote center but communicated to the aerial vehicle on a suitable communications link 420.

Figure 6:
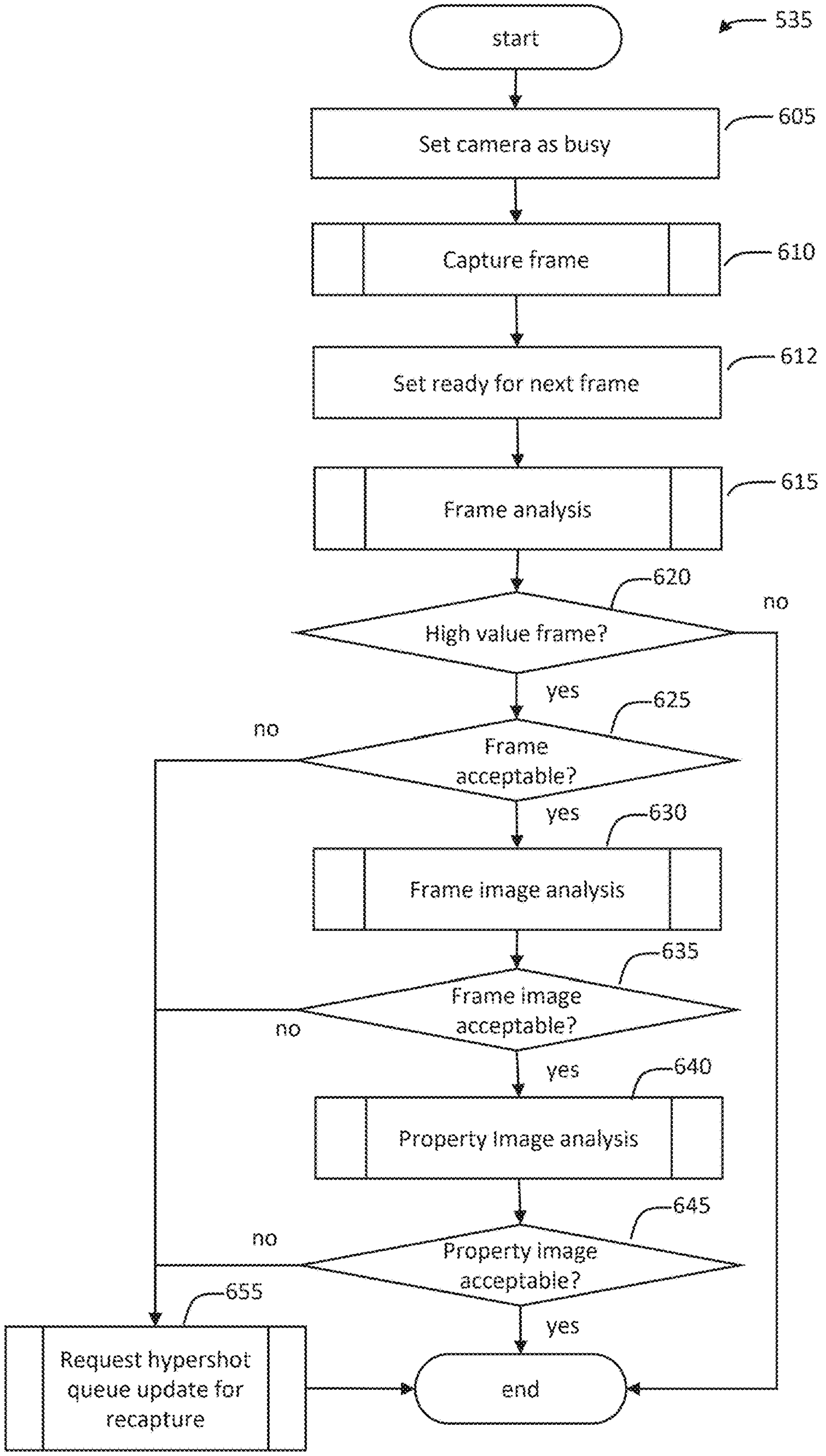
FIG. 6 is a flow chart of frame handling from a queue according to exemplary aspects of the present disclosure.

FIG. 6 is a flow chart that illustrates the handling of the frame from the queue 535. Multiple processes 535 may operate in parallel. For example, each instance of process 535 may operate for each scanning or fixed camera. Alternatively, one or more instances of process 535 may operate for a linked group of cameras. These processes may be interconnected as will be described below to achieve synchronization, improved image capture quality, and/or other goals such as improved data flow.

Each instance of process 535 starts at step 605 which sets the corresponding cameras to a busy status. This status indicates that the camera is preparing for or capturing image data and remains set through step 610 which captures the image frame according to a process that will be described in further detail with respect to FIG. 7 below. Once capture is complete on all cameras, processing continues to step 612 which marks the camera or linked cameras as ready for the next frame capture.

Processing then continues to step 615 which performs a frame analysis of for the captured frame that may consider aspects such as the mechanical stability of the camera system, the pointing accuracy of the capture, focus, exposure and other aspects of the capture as will be discussed in further detail with respect to FIG. 8 below. Step 615 determines whether a frame is acceptable according to this analysis.

Processing then continues to step 620 which determines if the current frame is a high value frame. High value frames may be selected for a number of reasons, for example they may meet at least a subset of the conditions below:

- they may be publishable frames as discussed with respect to Tables 1 to 6 above.
- they may be frames that would be selected for use in generating, or would improve the quality or coverage of an image derived product such as a vertical or oblique photomap as discussed with respect to FIGS. 3*a* and 3*b* above, 3D model or other product.
- they may be images that include specific properties or locations of interest, for example they may be part of an insurance brokers portfolio of properties.

If the frame is considered to be a high value frame, then processing continues to step 625, otherwise processing ends. From step 625, processing continues to step 630 if the frame is considered acceptable according to processing step 615, otherwise it continues to step 655 which requests an update to the hypershot queue for the camera to re-take the current frame according to a method described in more detail with respect to FIG. 11 below then ends.

Step 630 optionally performs a frame image analysis as will be described in further detail with respect to FIG. 9 below. If the frame image is considered acceptable according to step 630 then processing continues to step 640 otherwise it continues to step 655 which requests a hypershot queue update as discussed above and with respect to FIG. 11 below. Step 640 optionally performs a property image analysis as will be described in further detail with respect to FIG. 10 below. If the frame image is considered acceptable at step 645 then processing 535 ends, otherwise it continues to step 655 which requests a hypershot queue update as discussed above and with respect to FIG. 11 below.

Figure 7:
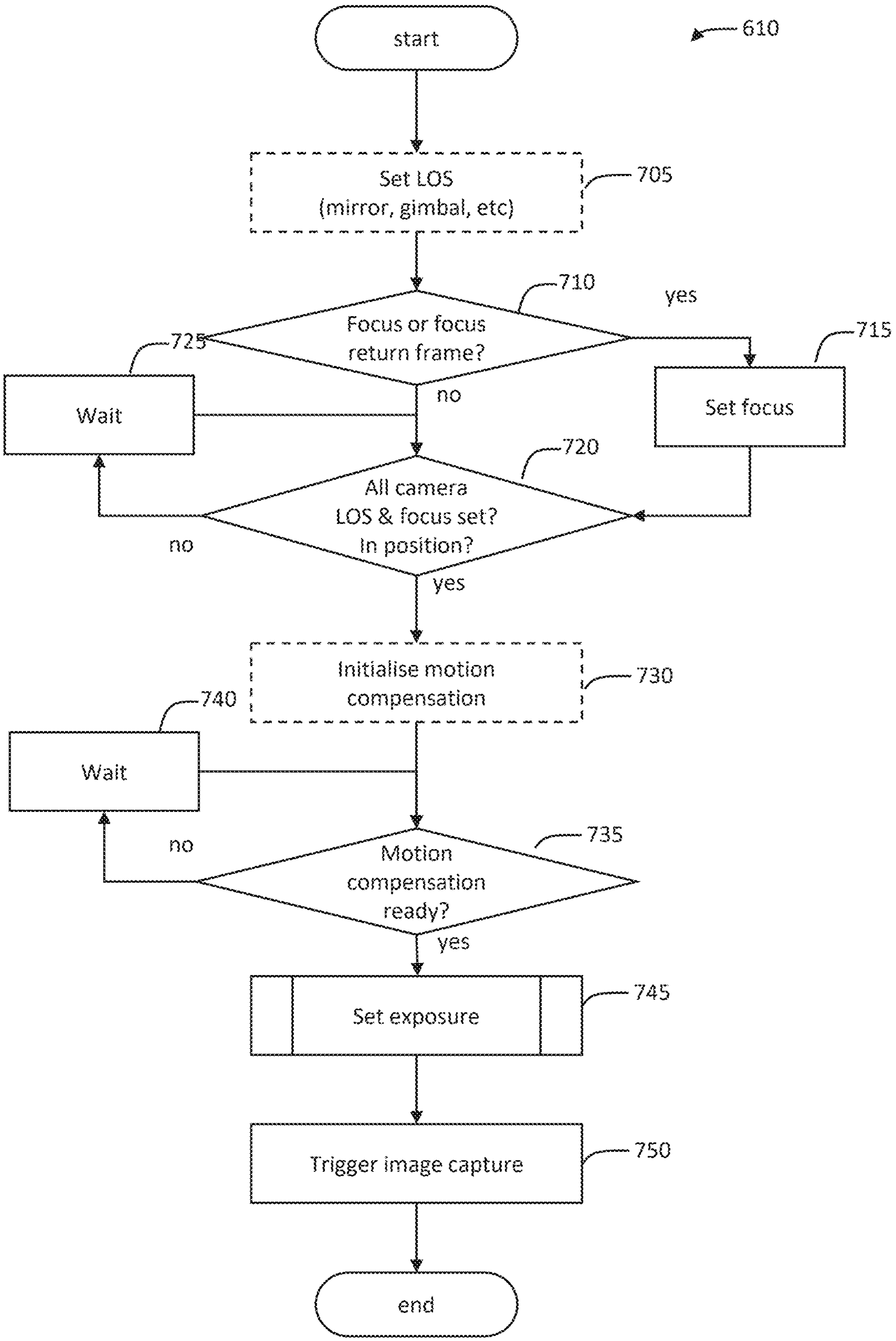
FIG. 7 is a flow chart of capture of a frame according to exemplary aspects of the present disclosure.

FIG. 7 is a flow chart that illustrates the capture of a frame 610. Processing starts at step 705 which optionally sets the LOS of the camera. The setting of LOS may be primarily controlled through the angle of one or more mirrors in the optical path but may also be controlled through setting of the target pose of the gimbal of the aircraft. In one exemplary embodiment, for a scanning camera the target gimbal pose is set to be horizontal, and the LOS of a scanning camera is controlled to match the desired LOS for the specific frame according to a look up table for example based on the parameters discussed in Table 1 to Table 6 above which provide details of the azimuth and elevation of frames for 6 different scan drive units that were discussed with respect to the scan patterns shown in FIG. 1 above. In this embodiment, the fixed cameras already target the appropriate direction.

In an alternative embodiment, the gimbal may be directed away from the horizontal. For example, the roll of the gimbal may be altered so that a line of sight normal to the gimbal plane intersects with the current flight segment being captured as was discussed above with reference to FIGS. 2*c* and 2*d*. This rotation can improve the survey capture performance by centering the capture on the desired ground location while only slightly changing the azimuth and elevation of the captured images. Alternatively, the pitch (possibly in combination with the roll) may be varied in order to allow time to recapture one or more frames or one or more hypershots on one or more cameras if process 655 requires additional processing time in order to handle gaps in the coverage due to frames that have been marked as not acceptable. This will be discussed further below with respect to FIG. 11.

Processing from step 705 may proceed to step 710 as soon as the commands to control systems (e.g., gimbal and/or mirror control systems) that handle the LOS have been sent. The mechanical steps of setting the LOS may be concurrent with further processing of step 610. Step 710 checks if the current frame is a focus or focus return frame for the current camera. If it is, then the focus position of the camera may be updated at step 715. The focus position may be updated by mechanically altering the spacings of elements within the camera lens, altering the spacing of the sensor plane from the camera sensor, or other suitable mechanism. For example, at a focus step the focus position may be offset compared to the current focus position by a focus shift that depends on the current confidence in the focus position. For example, the initial focus position may be set at the start of a survey based on calibration data that may include focus measurements from a controlled environment, temperature and pressure data. For the camera system of FIG. 1*c*, frame 1 is a focus return frame and 29 and 30 are focus set frames. At frames 29 the focus position is set to the current estimated focus position reduced by a focus shift along the optical axis of the lens, at frame 30 it is set to the current estimated focus distance increased by the same focus shift while at frame 1 the focus position is returned to the current estimated focus position. In other embodiments autofocus or other suitable focus may be used.

After the focus setting operation has started at step 715, or if the frame is not determined to be a focus or focus return frame at step 710, then processing continues to step 720. Step 720 checks whether the LOS and focus are correctly for the current camera. In a preferred embodiment it also checks that LOS and focus are set for all cameras in the camera system. This is required in order to reduce angular and linear accelerations in the system due to forces and torques to be minimized during image capture and to synchronize the image capture on multiple cameras. If there are still LOS and/or focus setting operations in progress then processing continues to step 725, waits for a suitable timeframe, for example 5 ms, and then returns to step 720. Otherwise, processing continues to step 730.

Step 730 initializes the motion compensation for the current frame. Motion compensation may compensate for aircraft motions including linear motion and rotations during the exposure of an image capture. There may be a ramp up time to get one or more optical and/or mechanical components moving according to a desired profile such that the current aircraft motion does not move the image over the sensor such that a sharp image can be captured. Various techniques for motion compensation could be used including tilting or rotating optical plates between the lens and the sensor, but of course any other technique is also possible as can be appreciated. Step 735 checks whether the motion compensation is ready for image capture, in which case processing continues to step 745, otherwise processing waits for a suitable time (e.g. 1 ms) at step 740 then returns to step 735. Preferably, motion compensation initialization should be synchronous on all cameras to minimize forces and/or torques from other camera motion compensation units during image capture. Further, if the timing of previous steps 710 and 715 are predictable and known, the system may initialize the motion compensation such that it will be ready synchronously with all cameras having LOS and focus set as checked at step 720.

Step 745 sets the exposure time for image capture based on a process that will be described in more detail with respect to FIG. 19 below, then step 750 triggers image capture on the camera and image pixels are stored.

In some exemplary embodiments, where the timing of LOS setting, motion compensation initialization and gimbal setting may be well known and well understood and the process of 610 may be adapted such that they are coordinated to complete at the same time. This may be achieved through the characterization of the performance of the various components (scanning mirrors, tilt plates, actuators, motors, focus mechanism, and all associated control circuitry, etc.) in terms of time budgets to reach completion of the action required to get to the appropriate state for capture. Based on the time budgets, a pre-determined time in the future at or around which an image capture at step 750 may be performed can be planned, the control of each component can be initialized at a time prior to the set capture time determined by its time budget. The performance of the components may be tracked and modified in the lead up to the capture time to ensure everything is on track. If for some reason, one or more component is not expected to be in the correct state at the capture time then either the capture time or the control of one or more component or both may be modified in order to achieve a coordinated synchronized preparation for image capture.

Figure 8:
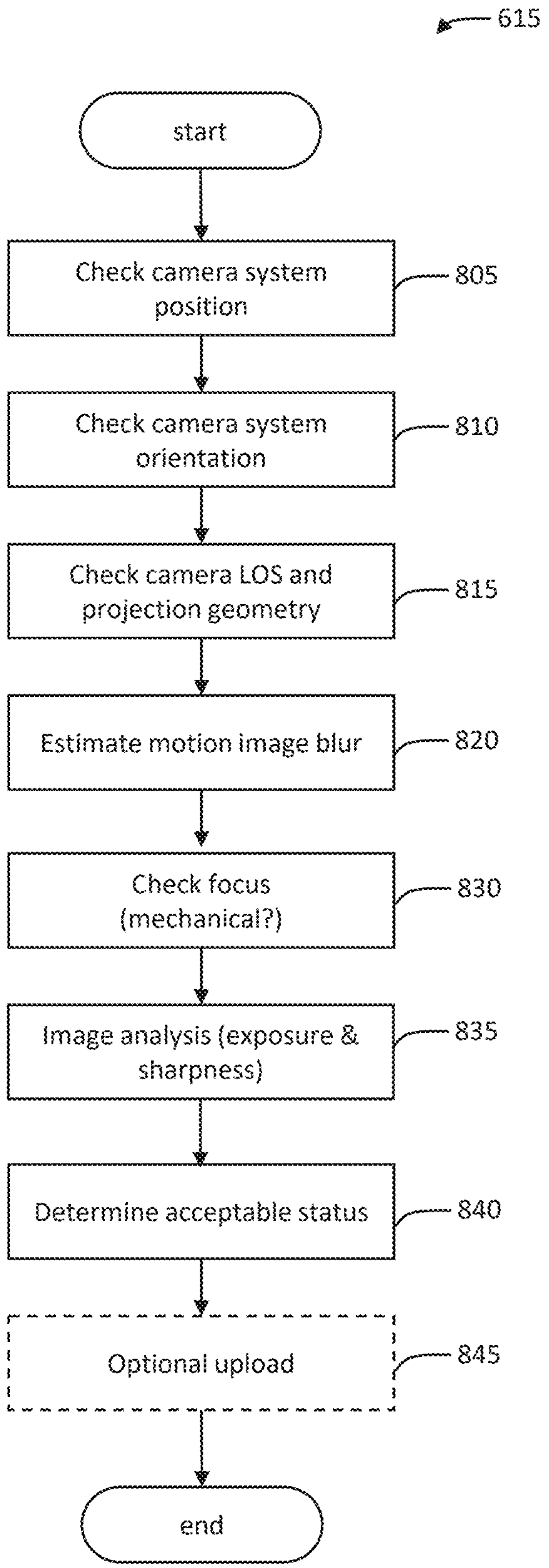
FIG. 8 is a flow chart of frame analysis according to exemplary aspects of the present disclosure.

FIG. 8 is a flow chart that illustrates the process 615 of frame analysis for a captured frame that also determines an acceptable status for the frame based on an expected image quality. Process 615 starts at step 805 which checks the camera system position at the time of the exposure for the current frame capture. The check may use GPS location data from a GPS device on board the camera system, for example in the form of latitude, longitude and altitude. Alternatively, other location information may be used, for example the relative location of a GPS antenna relative to the camera system. Step 805 may calculate the distance of the camera system from the current flight segment, both horizontally and vertically.

Processing then continues to step 810 which checks the orientation of the camera system at the time of the current frame capture, for example based on an inertial navigation system (INS) or inertial measurement unit (IMU) on board the aircraft. The orientation may be expressed in terms of roll, pitch and yaw with respect to the axes of the aerial vehicle or with respect to the current flight line segment. However, other manners of expressing orientation are also possible without departing from the scope of the present disclosure.

Processing then continues to step 815 which checks the camera LOS and projection geometry at the time of the current frame capture. The LOS is calculated by analysis of the geometry of the optical path taking into account the camera system orientation and the orientation of optical components such as mirrors and other reflecting or refracting elements in the optical path. The LOS may be compared with a desired LOS, and the frame may be marked as not acceptable if the difference between the two is too high. The difference may be expressed as an angle, for example in degrees. An unacceptable difference may be based on a threshold set according to the field of view of the camera calculated from the sensor geometry and the lens parameters (e.g. focal length). This may occur for example when:

- the camera system is poorly oriented with respect to the flight line segment for example due to the orientation of the aerial vehicle.
- the camera system is mounted on a gimbal that approaches operational limits so that it cannot control the camera system orientation as desired.
- an optical component such as a mirror, lens or sensor is incorrectly oriented, for example when a scanning mirror does not move to the correct angular orientation.

The decision as to what LOS is unacceptable may be made based on the likelihood of a drop in the expected coverage for the camera system given the difference in LOS compared to the desired LOS. The likely drop in coverage may be estimated based on the geometry of the camera system and the flight map, which may be performed using techniques described herein. Alternatively, simple rules may be applied based on the previous flights or previous calculations for a range of scenarios. For example, an absolute azimuthal error of in excess of 15 degrees in the LOS caused by aircraft yaw may be deemed too high, or an LOS error in excess of some threshold percentage of the field of view of the camera may be deemed unacceptable. In this case the threshold percentage may be set based on the intended overlap of adjacent image captures. For example, if the field of view is 4 degrees, and the overlap is 1 degree, then a suitable fraction may be 10%. Thus, the exact method used to determine whether the LOS is unacceptable is not limiting upon the present disclosure.

Step 815 may compute the projection geometry of the camera system based on the known camera position and orientation plus orientations and parameters of optical components at the time of capture (e.g., sensor geometry, lens focal length, mirror orientations, etc.). It may also use information related to the height of the ground that may be stored on the aerial vehicle in the form of a digital elevation map (DEM) or other suitable format. The extend of the ground projection grows with the difference in altitude or height between the aerial vehicle and the ground. Ray tracing methods may be appropriate to find the ground height at specific points in the projection geometry. A full projection geometry may be computed based on the full size of the sensor capturing images, or a reduced projection may be obtained based on a reduced sensor size where a region around the outside of the sensor is excluded from the projection based on assumed overlap requirements. The projection geometry may be compared to the intended projection geometry (computed from the ideal system position, orientation and component orientations at the scheduled capture time). For example, the intersection and union of current projection and ideal projection geometries may be compared, and if the intersection is too low then the frame may be marked as not acceptable, for example if it is less than a quarter of the intersection. For example, the intersection of the current projection with previously computed projection geometries from the same camera or other cameras that should overlap the current capture and if the intersection is too small (for example less than half of the intersection for the ideal geometries), or does not cover the desired ground region, then the frame may be marked as not acceptable. The scan patterns of various camera systems shown in FIG. 1 illustrate nominal overlap of adjacent frame projections. In normal operation these overlaps should be sufficient to allow for tolerances of the optics of the camera system and aerial vehicle motion plus required image overlap for the generation of image derived products.

Processing continues to step 820 which estimates the image blur due to the change in optical capture geometry during the exposure time of the current frame. This estimate combines image blur from multiple sources including the motion of the camera system and the change in orientation of the camera system and its components (for example scanning mirror angles) during image capture. If motion compensation was operational during capture, then the image blur estimate may also take this into account (in normal operating conditions this should reduce the estimated image blur). If the estimated image blur is too large, for example if it is above one image pixel in magnitude, then the frame may be marked as not acceptable.

Processing then continues to step 830 which optionally checks the focus data for the current frame. If the focus shift during exposure is excessive, or if the focus position moves outside of a suitable range around the current programmed focus location, then the frame may be marked as not acceptable. For example, the allowable focus shift or range of focus may be set based on the depth of field of the camera which may be estimated from the parameters of the lens (e.g., focal length, aperture) and sensor (e.g., pixel pitch). For example, a shift of a quarter of the depth of field might be considered excessive.

Processing continues to step 835 which performs exposure and or sharpness analysis of the captured image for the current frame of the current camera. Exposure analysis may form statistics of the pixel values over some portion of the pixels of the frame image in a suitable color space. It may apply known color gains for the optical system, perform black point subtraction and other appropriate color operations, and may generate an average exposure in linear space or some other appropriate color space (e.g. sRGB). The exposure may be represented as one or more pixel values expressed in pixel space, as fractions or as percentages of maximum exposure. These values may represent average or percentiles or other statistics that may be used to determine whether the captured image is over or under-exposed and therefore may be marked as not acceptable. The statistics may also be used to determine exposure times of later image captures as will be described in more detail below. Like exposure analysis, sharpness analysis may be computed based on the pixel values over some portion of the pixels of the frame image in a suitable color space. For example, it may be based on a suitable texture metric such as a Sobel or Laplacian operators, or a pixel variance. In some cases, the texture metric may be used to determine whether an image capture is acceptable. Alternatively, the sharpness metric may be compared with a sharpness metric for one or more images of the same ground region captured previously, either during the current aerial survey or one or more previous surveys. The comparison metric may take into account the LOS and/or projection geometry of the current frame determined at step 815, the sun position during the current and previous captures, the current and previous exposure times, and any obstructions to the current and previous captures due to, for example, the aerial vehicle blocking or partially blocking the optical path between the ground and the camera. It may take into account models that are available during the flight such as the weather model, wind & turbulence model, cloud model, and/or exposure model discussed with respect to steps 1810, 1820, 1830 and 1840 of FIG. 18. If the sharpness is too low compared to the comparison metric, then the captured image may be marked as not acceptable. For example if the variance is half of the expected variance then the image may be marked as not acceptable.

Processing then continues to step 840 which determines an overall acceptable status for the frame based on the acceptable status values computed at previous steps 805 to 835. For example, if any status is set to not acceptable then the frame is marked as not acceptable. Next, step 845 may optionally upload data from steps 805 to 840 related to for example focus, exposure, sharpness, LOS, projection geometry, etc., to a base station via a suitable communications link 420 as discussed with respect to FIG. 4 above and then processing step 615 ends.

It is noted that one or more of the processes 805 to 835 may be performed concurrently, and also, that if a frame is marked as not acceptable in any of these processes, the result may be immediately passed to the step 625 so that a request to update the hypershot queue may be generated at step 655 as soon as possible.

FIG. 9 is a flow chart that illustrates the process 630 of frame image analysis for a captured image from a camera of the camera system. Processing starts at step 910 which performs a general check of image quality over the image. Step 910 may use image processing techniques and or machine learning techniques both globally and locally across the image, for example, to detect degraded imagery that might render the image not acceptable for ongoing processing. For example, local sharpness metrics may be measured on particular objects imaged and image blur or softness may be detected. Particular features may also be detected in the image that indicate the presence of unwanted signals due to, among other factors:

- clouds, haze, precipitation or other atmospheric particulates that affect the optical path.
- poor lighting, exposure issues (such as over or under exposure).
- vignetting (e.g. from the aerial vehicle blocking the optical path of the image capture).
- atmospheric effects such as turbulence both through the atmosphere, but also specifically in the boundary layers near the aircraft.
- other obstructions that wholly or partially block the optical path such as aircraft, balloons, kites, paragliders, etc., flying at a lower altitude than the aerial vehicle.

In some cases, the image processing may be complemented or performed by an operator, either based on viewing the image in the aircraft or remotely after the image may be uploaded via communications link 420. Ideally this analysis would be performed in parallel with the ongoing processing of step 630 so that the aerial survey can continue. However, the analysis does not need to be performed in parallel as one of ordinary skill would recognize.

Alternatively, input from an operator and/or pilot may be used to weight the detection of the above features. For example, the pilot may indicate to the system that clouds, haze, or other occluding objects such as other aircraft based on observations or other available data. This might be input to step 910 as an indication of an increased likelihood of unwanted signals. Of course, input of these features may also be without human intervention, such as with an artificial intelligence based image recognition system processing images either from the camera system or other sources such other cameras mounted on the aerial vehicle.

Processing continues to step 915 which optionally may align the frame more accurately to imagery or other data representing the survey region that is available on the aerial vehicle. This may be used to determine a more accurate projection geometry for the image than that generated at step 815. The improved projection geometry estimate may be used to determine whether the captured image is acceptable. For example, in some situations the image may not provide coverage of the desired region on the ground and therefore may be deemed as not acceptable The vehicle may be pre-populated with a payload of imagery stored at a variety of resolutions that may include lower resolutions than the captured images. The payload of imagery may be updated during the flight through the communications link 420, for example this may be beneficial if the aerial vehicle is redirected to capture an alternative flight map for which no payload of imagery was pre-loaded to the aerial vehicle. The imagery may be in the form of photomaps (vertical and oblique). Photogrammetric techniques may be employed comparing the captured image or parts thereof to the payload imagery including but not limited to feature matching, image alignment, neural networks, etc. In one embodiment the payload may take the form of a 3D representation of the survey region from which aerial imagery may be synthesized from a virtual camera with controllable pose and parameters. For example, imagery may be generated from a virtual camera matching the projection geometry of the frame determined at step 815 and aligned to the captured frame image.

Step 915 may also determine image quality issues or the presence of unwanted signals such as those described at step 910 above. For example, image comparison may detect degradation in the current image that was not found in the payload imagery. This can be used to determine that the frame is not acceptable. Step 915 may also be used to generate useful calibration data for the camera system. For example, it may assist with calibration of the angles of scanning mirrors so that they may be more accurately controlled to achieve a desired LOS. The calibration may take the form of an offset angle for the encoder of a mirror drive that controls the mirror location.

Processing continues to step 920 which optionally performs aligned image pair analysis between the current image and another image captured in the current survey on the same or another camera. The other image or images should be selected to have a reasonable expected overlap with the current image frame. Photogrammetric image alignment techniques may be used to determine the difference in projection geometry between the two images, and this difference may be compared with the expected projection geometry difference. The difference may be expressed in terms of a suitable transform such as a projective or affine transform, or more simply as a translation and/or rotation. Step 920 may also optionally compare the images in an overlapping region to determine for example relative image quality metrics. For example, it may use image deconvolution techniques to determine a blur kernel that defines the relative blur of one image compared to the other. It may also detect image degradation or unwanted signals in the overlap region such as those described with respect to step 910 above. The analysis may be used to determine if the frame is not acceptable. Furthermore, step 920, like step 915 above, may be used to determine if a frame is not acceptable due to an inaccurate LOS, or may generate useful calibration data for the camera system such as offset angles for scanning mirror encoders and calibration data for any motion compensation used in the system.

Next, step 925 may optionally upload data from steps 910 related to for example focus, exposure, image quality, calibration, air quality and unwanted signals to a base station or other remote system via a suitable communications link 420 as discussed with respect to FIG. 4 above and then processing of step 630 ends. It is noted that one or more of the processes 910 to 920 may be performed concurrently, and also, that if a frame is marked as not acceptable in any of these processes, the result may be immediately passed to the step 635 so that a request to update the hypershot queue may be generated at step 655 as soon as possible.

Figure 10:
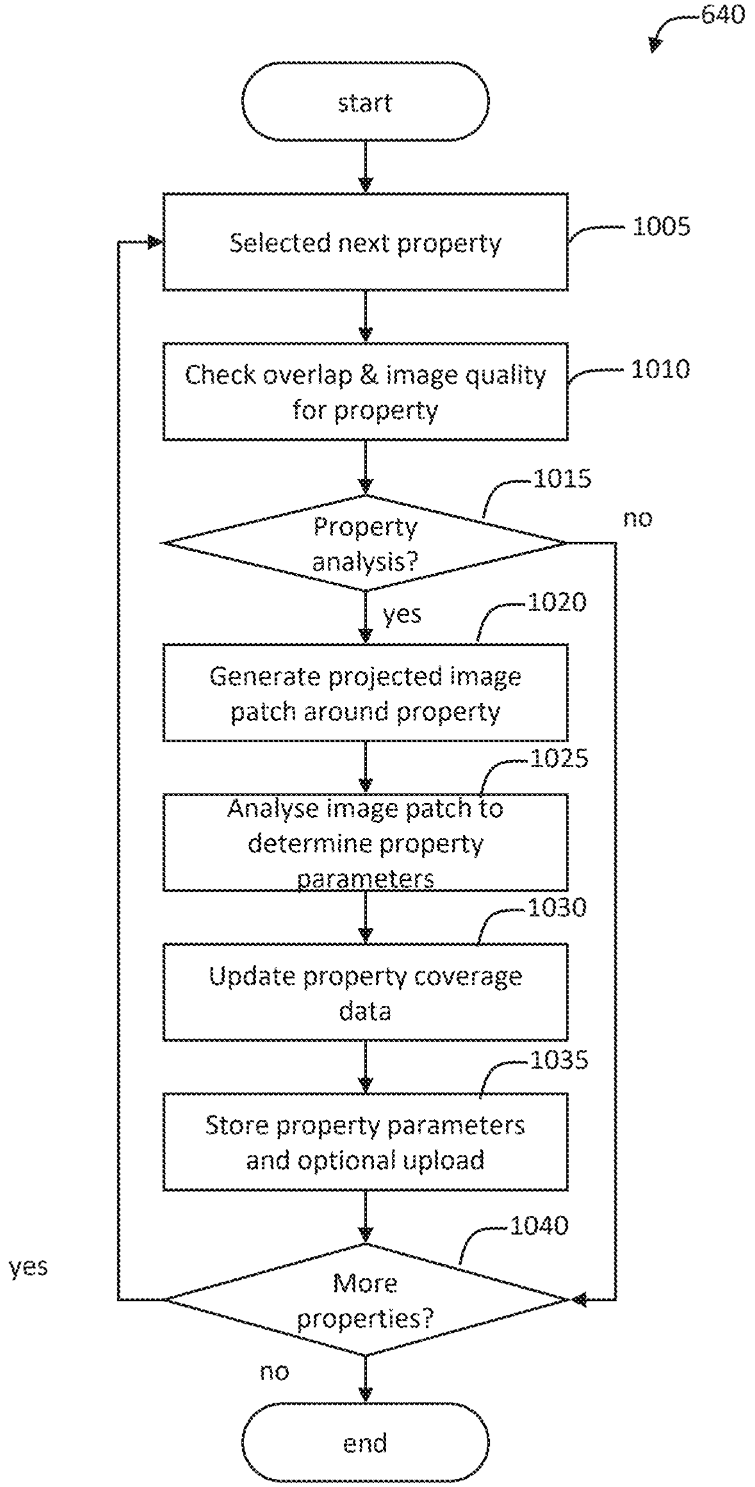
FIG. 10 is a flow chart of property image analysis according to exemplary aspects of the present disclosure.

FIG. 10 is a flow chart that illustrates the process 640 of property image analysis for a captured image from a camera of the camera system. Process 640 monitors incoming imagery with respect to a list of properties of interest, for example the portfolio of properties insured by an insurance company, managed by a local council, real estate or utilities company or other such.

Processing starts at step 1005 which selects the first property in the list, then proceeds to step 1010 which checks the projection geometry of the current frame computed previously (e.g., from step 815 or 920) to determine whether it would include the selected property. If it does include the property (step 1015), then processing continues to step 1020, otherwise it continues to step 1040 which checks for more properties.

Step 1020 generates an image patch around the property for analysis further analysis. The image may be projected on to a suitable ground plane, for example based on a known projection geometry from previous steps and photogrammetric projection methods. It may also be cropped to exclude regions that do not include the property. Next, at step 1025, the image patch is analyzed to determine property metrics and parameters for the property. These may include parameters that estimate the condition or damage to the property, or to parts of the property such as the roof, facades, windows, etc., along with confidence measure of associated with the measurements. The confidence measures may be provided by machine learning tools used to generate the parameters or may relate to the determined coverage of the property by the image patch, the quality of the image as either in this step or previously or other. Processing continues to step 1030 which may update coverage data for the property according to the results of step 1025. The coverage data for the property may be determined based on property location or property boundary data. It may consist of a list of LOS from which imagery of the property has been captured, or may be based on the intersection of the projection geometry of captured images with the property boundary. It is noted that other coverage data generated by the camera system may be used to infer coverage information for a specific property, for example a polygon intersection of the property boundary with one or more photomap coverage data may provide suitable coverage data for a specific property.

Processing continues to step 1035 which may optionally upload data from step 1020, 1025 and 1030 above related to the parameters of the property, confidence scores, coverage, etc., to a base station or other remote system via a suitable communications link 420 as discussed above with respect to FIG. 4 and then processing of step 640 ends. Optionally, step 1035 may upload the image or image patch data via communications link 420, for example to allow targeted analysis of the property to take place at a ground station It may further use appropriate compression techniques in order to upload the data with a limited communications bandwidth. It is noted that one or more of the processes of steps 1005 to 1035 may be performed concurrently, and also, that if a frame is marked as not acceptable in any of these processes (e.g. through a confidence score that is too low), the result may be immediately passed to the step 640 so that a request to update the hypershot queue may be generated at step 655 as soon as possible.

Figure 11:
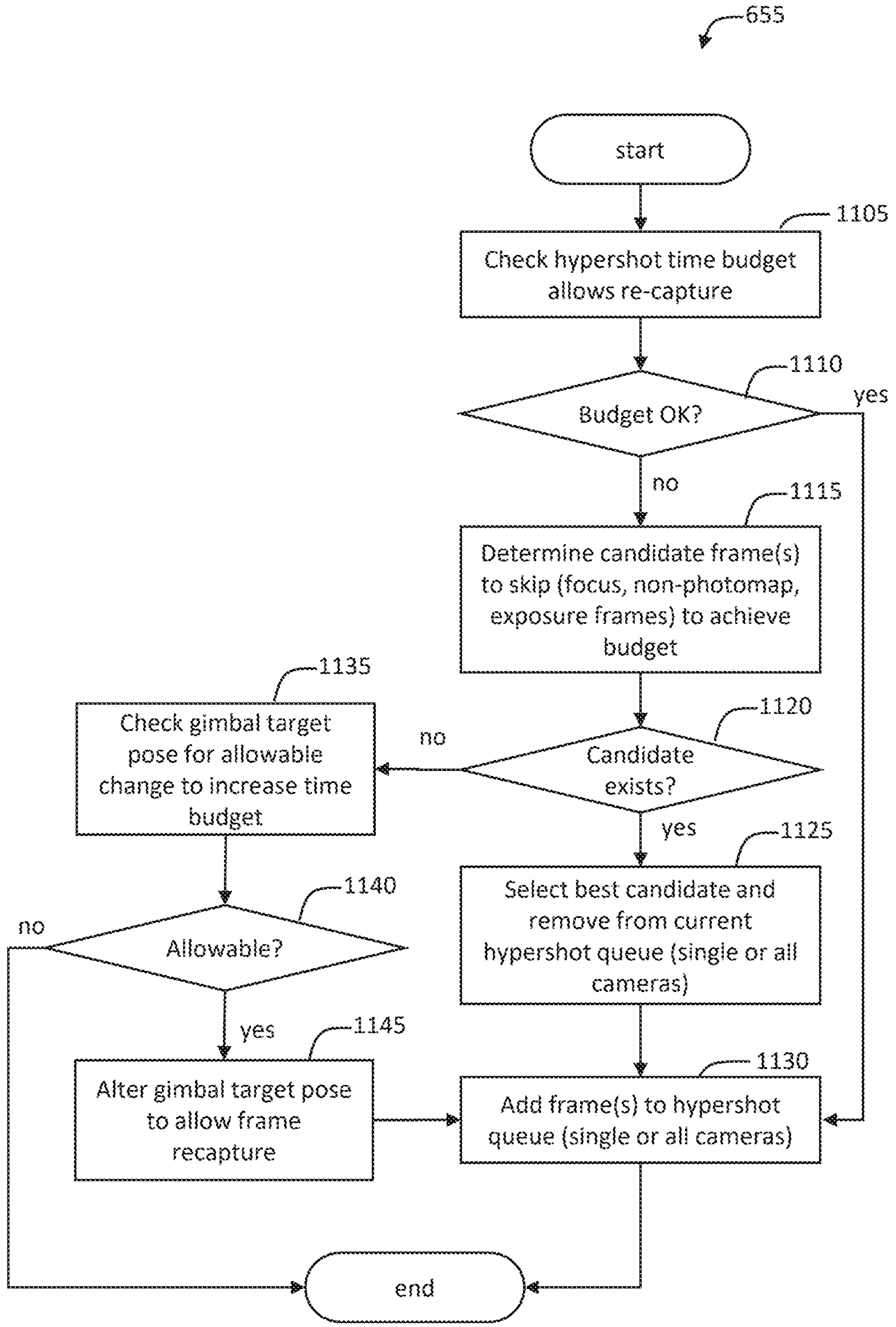
FIG. 11 is a flow chart of hypershot update request according to exemplary aspects of the present disclosure.

FIG. 11 is a flow chart that illustrates the process 655 of requesting a hypershot update to handle the case of a captured image marked as not acceptable without loss of survey coverage. It achieves this by analyzing the timing of the hypershot and allocating recapture of the frame accordingly. The camera system needs to perform a number of steps for each frame capture, some of which may happen partly in parallel, as was discussed with reference to FIG. 7 above. It also needs to capture survey images with sufficient overlap that the give full coverage on the ground for one or more image derived products. This may be expressed as a hypershot time as discussed above with respect to FIG. 1.

The hypershot time budget is the expected residual time remaining within the current hypershot during which one or more additional captures may be performed. The residual time may be at the end of the hypershot, in which case it may be the time between the end of the current hypershot and the start of the next one. The frames may be captured evenly throughout the hypershot, in which case this time may be small. Alternatively, the frames may be captured at a higher rate to leave a larger hypershot time budget at the end of the hypershot. Alternatively, if the hypershot timing is broken up into groups then the residual time may be found at a number of specific times during the hypershot. For example, for the scan pattern of FIGS. 1*a* to 1*d*, the scan frames may be split into two halves, with some available hypershot time budget at the end of each half. This configuration is advantageous as the hypershot includes a repeat set of LOS angles on the first two scanning cameras, and the split timing allows the same LOS frames of the first and second pass to be evenly spaced in time such that the overlap of the scan pattern in the forward direction is even. In this case the hypershot time budget for the first and second sweeps of the scanning camera may be considered as separate, and the budget in the first sweep of the hypershot may only be used for adding scan frames from the first sweep to the queue, while the budget of the second half may only be used to add scan frames from the second sweep to the queue.

Process 655 starts at step 1105 which checks the hypershot time budget to determine whether there is enough time remaining to recapture the frame on one or multiple cameras. This may be achieved by comparing the time to recapture the current frame image with the hypershot time budget. As discussed above, the time to recapture may include the time to move or initialized components such as motion compensation, and the time to capture and store image data, for example using a framegrabber. It may include time for movement of components corresponding to other camera captures so as to allow synchronous capture on multiple or all cameras of the camera system. If there is sufficient time then processing continues from decision step 1110 to step 1130 which adds the current frame on the current camera to the hypershot queue. Preferably the shot is added as the next frame to be captured as the components of the camera are correctly oriented to capture on this LOS. Depending on the configuration of the system, it may also add the current frame for all other cameras to the hypershot queue, or just a subset. For example, this may be required when there is a shared scanning mirror used by multiple cameras. It is noted that the processing flow for the camera system may operate partially concurrently, so that the camera may have captured one or more images corresponding to later frames from the current hypershot queue by the time that the request to re-take the current frame is made at 655. In this case, if a scanning mirror has moved since the capture of the not acceptable image for the current frame, then it will need to move back when re-taking the image, as is handled in step 610. In this case, the time to perform the additional mirror moves is accounted for in the estimate of the time to recapture the current frame prior to comparison with the time budget.

If step 1105 determines that there is not sufficient time budget, then processing continues to step 1115 which determines whether there are any candidate frames in the current sweep of the current hypershot queue (i.e., not already captured in the current hypershot) that could be skipped without affecting the coverage of the survey or the creation of derived image products. Frames may be prioritized, with images that are to be used in image derived products considered highest priority, whereas other frames, including focus and exposure frames may be considered lower priority and skippable. In some configurations, focus frames may preferably not be skipped if a full set of focus frames has not been collected for a multiple hypershots in succession, or for a period of time (e.g., 10 hypershots or 60 seconds) or if the current focus estimate has a low confidence and the lack of focus frames might impact all captured images on the current camera. The current focus may have a low confidence if the focus position has been unstable, or has failed to show an expected convergence. If one or more suitable candidate frame to skip is found at step 1120 then processing continues to step 1125 which selects the best candidate frame and removes it from the current hypershot queue. The best candidate may be the lowest priority frame, or the candidate frame scheduled for the earliest capture, or according to some other suitable criteria. Processing then continues to step 1130 which adds the current frame into the hypershot queue as described above.

If no suitable candidate frame to skip is found at step 1120 then processing continues to step 1135 which checks the gimbal target pose and gimbal encoder settings to determine if it would be possible to use the gimbal to direct the LOS for the entire camera system back along the current flight segment thereby allowing a recapture of the current frame, or indeed of the entire hypershot. The gimbal encoder settings can be used to check whether the gimbal has sufficient room to move before hitting any limits to its motion, while the target pose is checked as there may be a maximum allowable offset for gimbal pose without impacting the LOS of images such that they are unable to provide appropriate coverage and overlap for image products. For example, a maximum gimbal target pose may be 5 degrees from horizontal, and this would include gimbal offsets to steer the entire camera system towards the flight line as discussed above with respect to FIGS. 1*i* and 1*j* and steps 570 and 705. The gimbal pose change required to allow a recapture of the current frame may be determined according to the current motion of the aerial vehicle and the expected time before a recapture of the current frame may be taken. Trigonometric relations may be used to determine the angle required to offset this distance based on the altitude for the current frame of the current camera. Alternatively, the change in gimbal pose may be determined based on the time since the beginning of the current hypershot, or the time between hypershots for the current position and motion of the aerial vehicle relative to the ground. In some circumstances, for example if the gimbal of the aerial vehicle is aligned with the current flight line then the change in gimbal pose may be performed using a change in the pitch of the gimbal alone. In other circumstances it may be performed by a change of roll and pitch of the gimbal. The target pose of the gimbal may be initialized and reset to a pose that would allow more movement and hence give more time to recapture a hypershot frame or frames. For example, the target pitch may be set to point forward along the flight line ahead of the current aircraft position. In this case the available change of pitch that could be performed is advantageously larger thus potentially improving the robustness of the camera system.

If at step 1135 it is determined that a change in target gimbal pose is allowable then processing continues to step 1145 which sets a target pose change update that will be actuated at step 705 so that the change in LOS of the gimbal does not coincide with image capture as it may cause degradation of image quality due to image blur. Processing then continues to step 1130 which adds the current frame back into the hypershot queue as described above.

After step 1130, or if the change in gimbal pose is found to be not allowable at step 1140, then processing of step 655 ends. In an alternative arrangement, the gimbal pose change selected at step 1145 allows for the current hypershot to be restarted from scratch. In this case the hypershot queue is entirely reinitialized at step 1130. This arrangement typically requires a larger change in gimbal pose than the case where a single frame is to be added to the hypershot queue.

Figure 12:
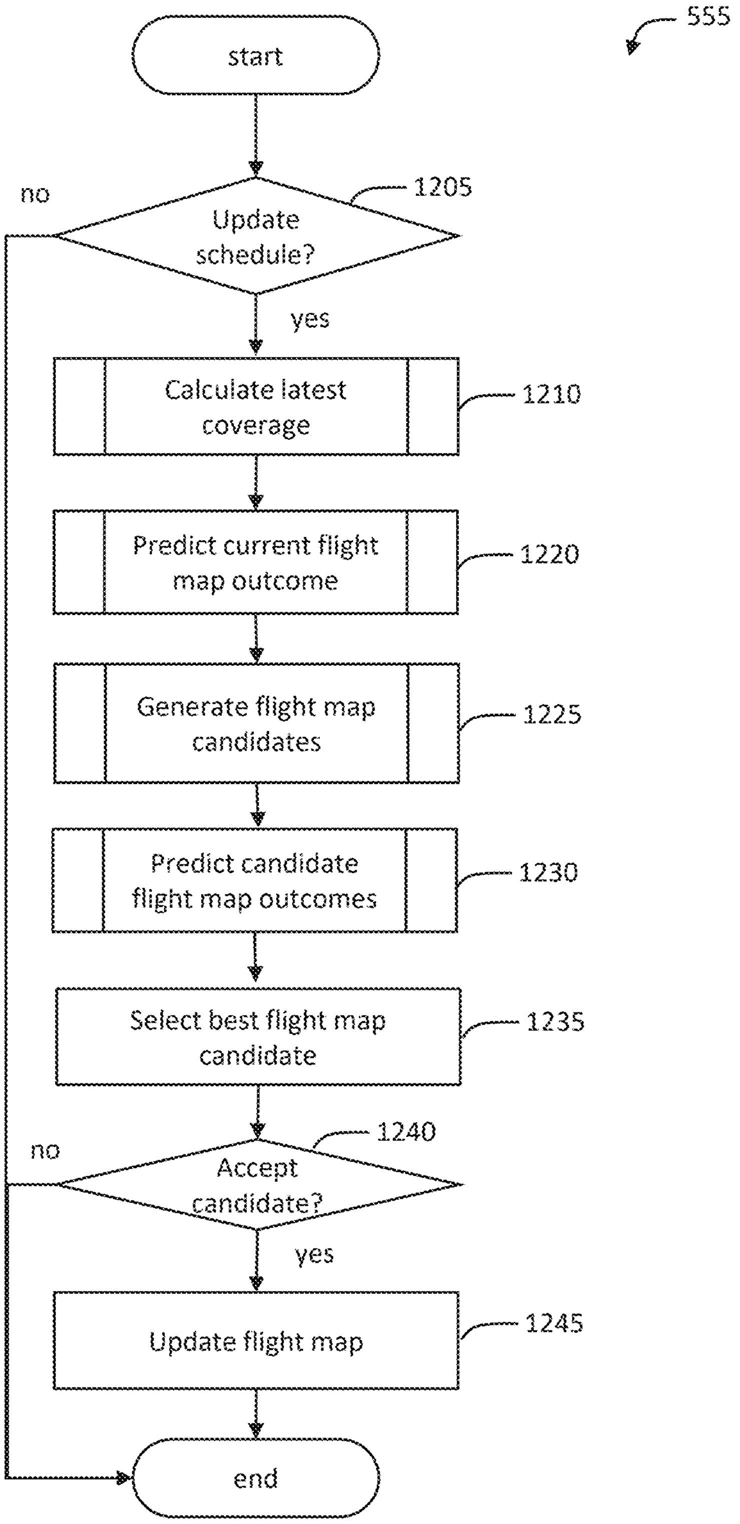
FIG. 12 is a flow chart for updating a flight map according to exemplary aspects of the present disclosure.

FIG. 12 is a flow chart that illustrates the process 555 of updating the current flight map for the aerial vehicle based on the progress made, the current conditions and other such factors. In one exemplary embodiment the processing of 555 and its sub-processes takes place on the aerial vehicle flying a survey. However, in other embodiments, some or all may take place remotely at a base station or other remote system and the results may be communicated to the aerial vehicle via a suitable communications link 420 as discussed above with respect to FIG. 4. For example, it may take place at a central flight control center that manages a fleet of aerial vehicles to efficiently capture high value survey regions that may include specific target properties in a coordinated manner.

Processing starts at step 1205 which checks whether an update is scheduled. A suitable update rate may depend on the particular flight parameters, the reliability of the system, and the available compute resources to calculate an updated flight map. Flight map update may be set to be performed once per fixed number of hypershots, once per segment or on a regular schedule in time.

If no update is scheduled at step 1205 then processing ends, otherwise it continues to step 1210 which calculates the latest coverage metrics according to a method that will be described in further detail below with respect to FIG. 14. Processing then continues to step 1220 which predicts the outcome that is expected if the aerial vehicle continues on the current flight map according to a method that will be described in further detail below with respect to FIG. 13. Step 1220 may also optionally prioritize the current flight map segments, setting the order of capture to be advantageous in terms of the expected survey outcome. The outcome may be expressed in terms of the coverage, derived image products, etc. Processing then continues to step 1225 which generates a set of alternative candidate flight maps that the aerial vehicle could adopt in place of the current flight map, as will be described in further detail below with respect to FIG. 16. Next, at step 1230, each candidate flight map expected outcome is predicted according to the same method used by step 1220 above and described in further detail with respect to FIG. 13, and optionally the segment order may be prioritized for each candidate flight map. Next, at step 1235, the candidate flight map with the best expected outcome is selected, and then its outcome is compared to the current flight map at step 1240. If it is a sufficient improvement then processing continues to step 1245 which updates the current flight map with the best candidate flight map then processing of step 555 ends. If at step 1240 the candidate is not accepted then processing step 555 ends.

Figure 13:
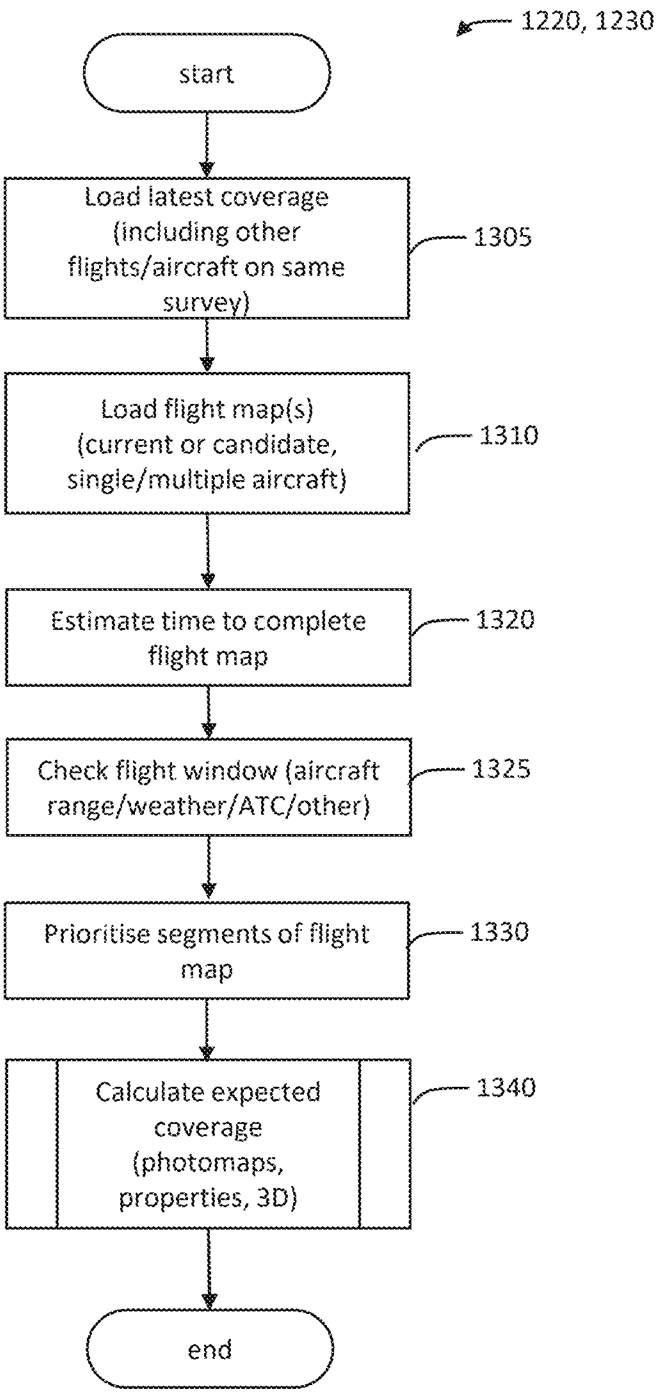
FIG. 13 is a flow chart for predicting a flight map outcome according to exemplary aspects of the present disclosure.

FIG. 13 is a flow chart that illustrates the process 1220 and 1230 of predicting a flight map outcome which as discussed above may be performed on an aerial vehicle or remotely. The survey capture of the flight map may be partially complete, complete, or not yet started.

Processing starts at step 1305 which loads any coverage data already generated for the flight map. This may include coverage data from a single aerial vehicle, or multiple aerial vehicles in a fleet that are capturing flight line segments from the same flight map.

Processing then continues to step 1310 which loads the flight map for which an outcome is to be predicted. This may be the current flight map of a single aerial vehicle, or a flight map currently being flown by multiple aerial vehicles, or a candidate future flight map for consideration.

Processing then continues to step 1320 which estimates the time to complete the flight map. This time may assume a single or multiple aerial vehicles are performing the survey of the flight map. It may take into account the current locations of the aircraft, the performance statistics of the aerial vehicles (ground speed, accuracy of tracking a flight line, etc.) their fuel levels or range, the current flight conditions (e.g., wind speed and direction). Step 1320 may compute the expected time to complete each segment of the flight map remaining and may also compute the expected time for each turn between those segments. It may also take into account the time for the aerial vehicle to return to base or continue to another flight map.

The analysis may also take into account confidence levels in the parameters used in the estimate, and may provide statistics such as upper and lower bounds or percentile statistics on the estimated time for example by taking into account the range of expected weather conditions such as wind speeds and directions, the possibility of capturing images that are not acceptable due to factors that may include climatic conditions such as clouds and the ability of the system to handle those issues. It may generate alternative metrics that assume a variety of conditions (single or combinations of multiple aerial vehicles), etc.

Processing then continues to step 1330 which checks the flight window available to the aircraft (i.e., whether it would be able to achieve the survey) based on factors including the range and/or performance of the one or more aircraft, input from air traffic control (ATC), the current weather conditions, or other conditions. For example, if a bank of cloud is known to be moving towards the survey region based on satellite or other data this may impact the likely flight window. Based on the known planned flight map, expecting flight timing from step 1320 above, and performance of the aircraft, the impact of the clouds may be estimated.

Next, at step 1330, the set of segments of the flight map may be prioritized according to the flight window data from step 1325. For example, if it is known that a bank of weather is moving towards the survey region, it may be desirable to prioritize parts of the survey based on the timing of the change in weather and/or the direction in which it will arrive. For example, if the poor weather is arriving from a particular direction, it may be advantageous to capture the flight lines towards that direction first, so that the candidate update may only require a change in the priority order of capture of flight line segments. Next at step 1340, the expected coverage is generated according to a process that will be described in further detail below with respect to FIG. 15. This may take into account expected coverage based on factors determined at steps 1320 and 1330 above. The processing then ends.

Figure 14:
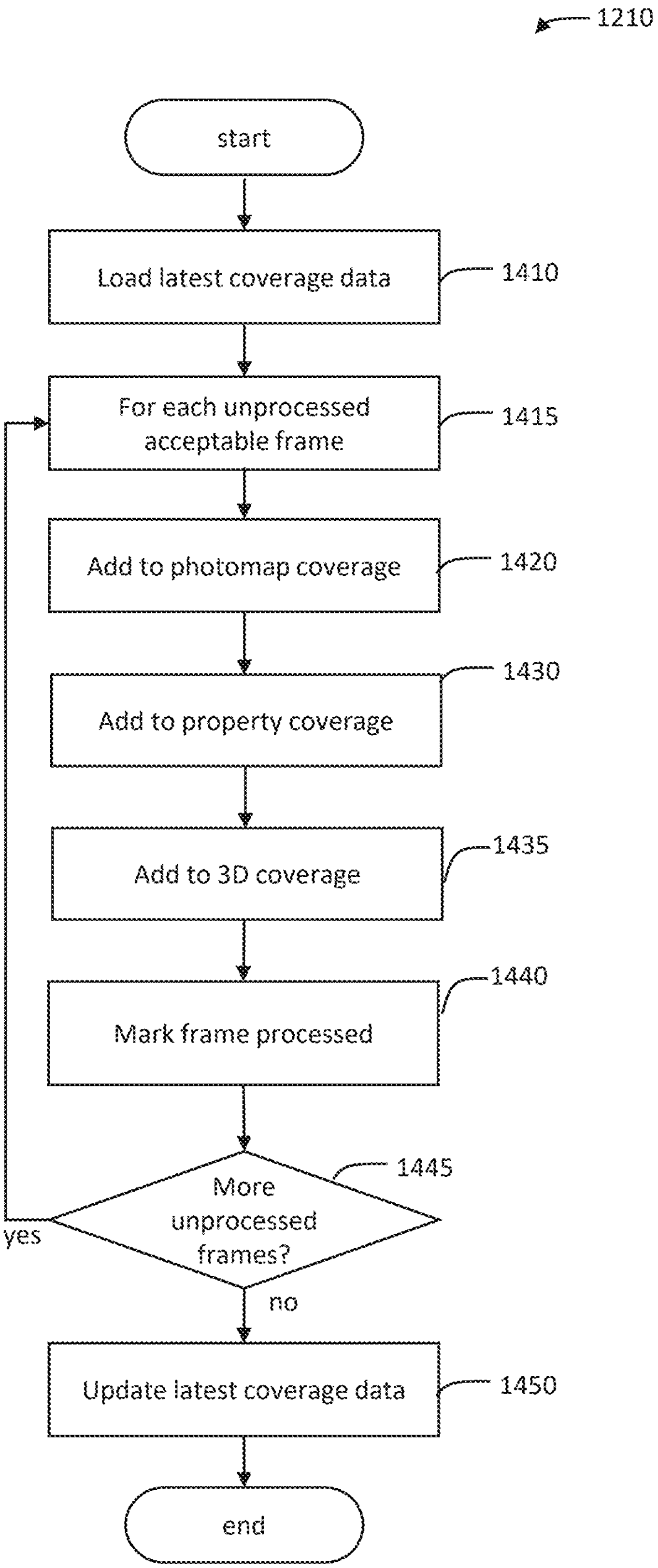
FIG. 14 is a flow chart for updating the latest coverage data according to exemplary aspects of the present disclosure.

FIG. 14 is a flow chart that illustrates the process 1210 of updating the latest coverage data. Processing starts at step 1410 which loads the coverage data to initialize the calculation. If no coverage data has been created for the current flight map, the latest coverage is set to empty. As discussed above with respect to FIG. 3, the coverage data may include ground coverage of vertical and oblique photomaps, 3D coverage data, property coverage data and other suitable coverage data. Further discussion and details are given below with respect to FIGS. 20-30.

Next, starting at step 1415, each unprocessed acceptable capture frame (from all cameras) are processed in a loop structure in turn. Step 1415 selects the next unprocessed acceptable frame. Step 1420 updates all photomap coverage data according to the frame, for example based on the projection geometry and LOS of the frame and the criteria for each photomap as was discussed above with respect to FIG. 3. Next, step 1430 adds the frame to the property coverage according to the list of properties and their geometries, the projection geometry and LOS as discussed above with respect to FIG. 3 and below with respect to FIG. 27. Next step 1435 adds the frame to the 3D coverage according to the projection geometry and LOS and a suitable set of criteria for 3D coverage as discussed above with respect to FIG. 3. The frame is then marked as processed at step 1440. Step 1445 checks for any more unprocessed frames, in which case processing returns to step 1415, otherwise processing continues to step 1450 which updates the latest coverage data to the updated coverage data generated through steps 1410 to 1445 and then processing of step 1210 ends.

Figure 15:
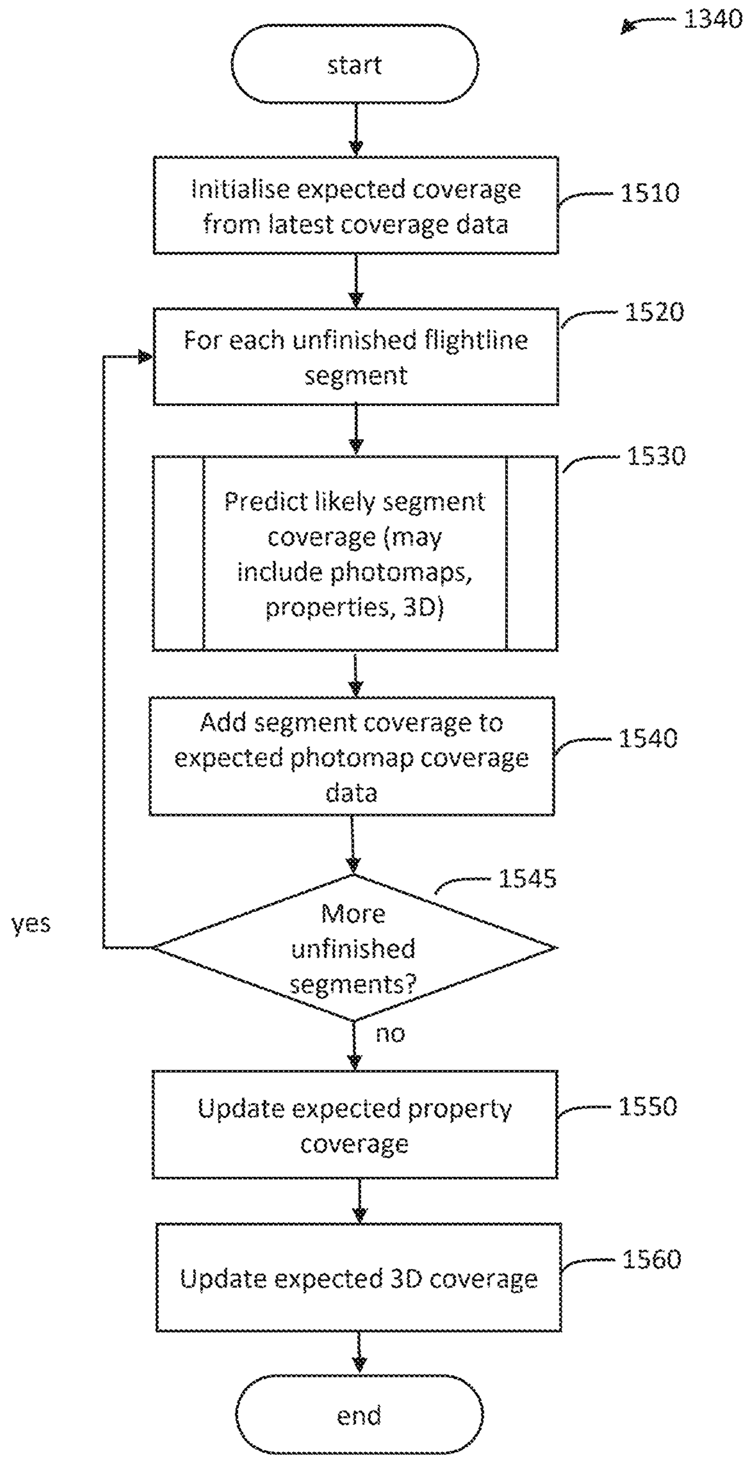
FIG. 15 is a flow chart for calculating the expected coverage for a given flight map according to exemplary aspects of the present disclosure.

FIG. 15 is a flow chart that illustrates the process 1340 of calculating the expected coverage for a given flight map by iterating over the remaining incomplete flight line segments in the flight map. Processing starts at step 1510 which initializes the expected coverage based on the latest coverage data (which may be empty as discussed above with respect to FIG. 14). Next, starting at step 1520, each remaining incomplete flight line is processed in a loop structure in turn. Step 1530 predicts the likely segment coverage as will be discussed in further detail below with respect to FIG. 17. Step 1530 may return segment coverage data in the form of a set of photomap coverage data.

Next, step 1540 combines the segment coverage with the expected photomap coverage data. Photomap coverage data may be combined using polygon operations, for example by taking a union of the expected coverage with the segment coverage for each photomap. In alternative embodiments, step 1530 may return photomap coverage data that give a probabilistic coverage rather than a Boolean coverage. These may be combined in a probabilistic sense to give an overall likelihood of coverage at each point defined in the coverage data. In alternative embodiments, step 1530 may return a set of projection geometries and LOS which may be combined with the expected coverage data using techniques as discussed with respect to FIG. 14 above.

Processing continues to step 1545 which checks for more unfinished segments, in which case processing returns to step 1520, otherwise processing continues to step 1550. Step 1550 updates the expected property coverage. For example, it may calculate the property coverage based on the expected photomap coverage data. Each property of the set of properties may be checked for coverage within the expected photomap coverage data by comparing the location or boundary data for the property with the geometry of the coverage data. For example, any property for which the location and/or boundary are contained by the segment vertical photomap coverage data may be marked as expected to be covered. Next, step 1560 combines the segment coverage with the expected 3D coverage. This may be achieved by recomputing the 3D coverage based on the set of photomap data. Processing of step 1340 then ends.

Figure 16:
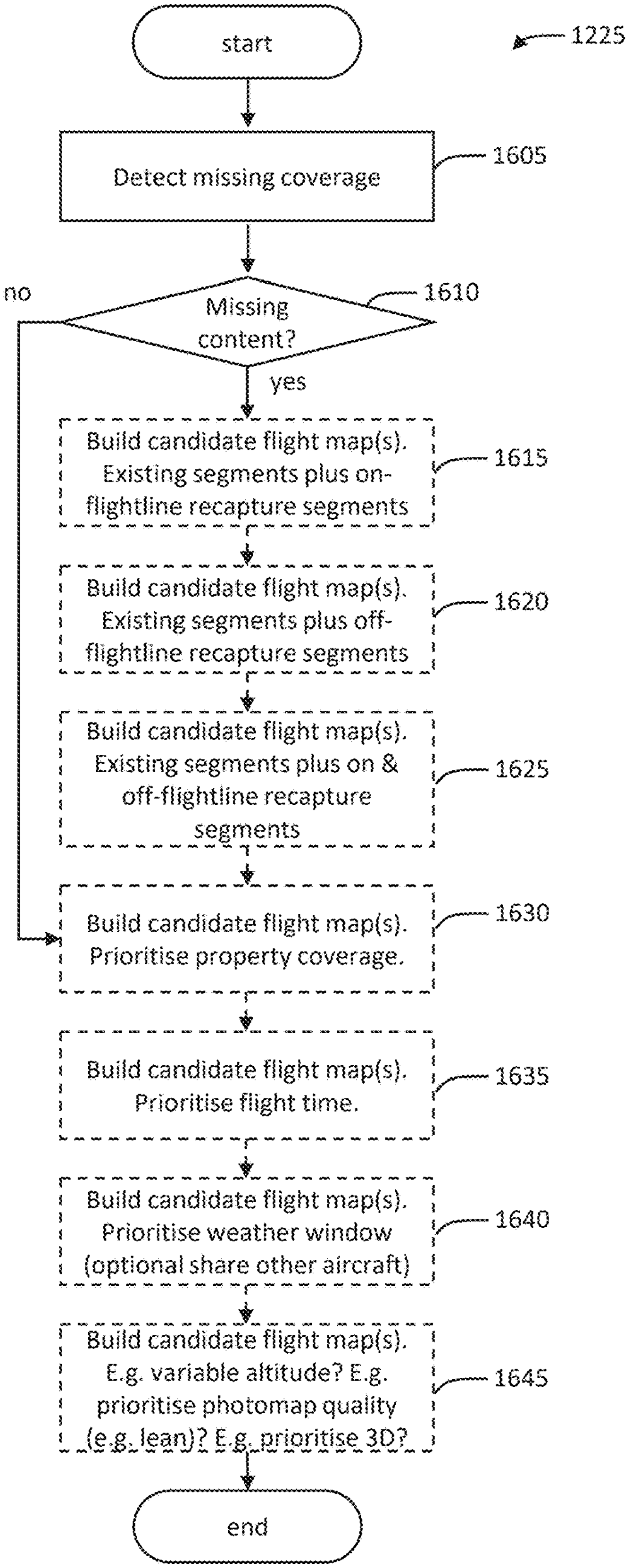
FIG. 16 is a flow chart for generating flight map candidates for an aerial vehicle according to exemplary aspects of the present disclosure.

FIG. 16 is a flow chart that illustrates the process 1225 of generating a set of flight map candidates for an aerial vehicle including of a set of flight line segments. Candidate flight maps may be constructed to suit the performance of the aerial vehicle, for example they may be constructed so that the aerial vehicle may be efficiently flown given the turning radius of the aerial vehicle, the power of the vehicle and its ability to handle the expected environmental conditions such as wind, or other such factors. Suitable trajectories for connected the segments of a flight map flown by an aerial vehicle may be generated based on Dubin's paths given the minimum turn radius of the aerial vehicle or other suitable methods, and may comprise vertical in addition to horizontal location components (e.g. latitude, longitude, altitude, or casting, northing and altitude).

Processing starts at step 1605 which determines missing coverage from the predicted current flight map outcome generated at step 1220 above. Missing coverage may be determined from one or multiple photomap coverage estimates, from 3D coverage estimates, from property coverage estimates or any combination of the above. Missing coverage may be determined based on a comparison of the required coverage from the flight map in order to meet the overall survey requirements. Processing then continues to step 1610 which checks for missing content determined at step 1610 above. If there is no missing content then processing continues to step 1630, otherwise it proceeds to step 1615. Step 1615 optionally builds one or more flight map candidates based on the current segments of the flight map plus one or more on-flight line recapture segments. FIG. 25*a*, as discussed above, shows a set of flight lines of a flight map including two additional segments, 8 and 9, flown on flight lines 3 and 4 respectively (top left). The flight map candidates may be generated based on current and/or estimated photomap coverage data, the set of acceptable and not acceptable frames captured in the survey, a combination thereof or some other factors. Step 1620 optionally builds one or more flight map candidates based on the current segments of the flight map plus one or more off-flight line recapture segments. FIG. 26*a*, as discussed above, shows a set of flight lines of a flight map including one additional segment, 8, flown in a South to North direction (top left). The flight map candidates may be generated based on current and/or estimated photomap coverage data, the set of acceptable and not acceptable frames captured in the survey, a combination thereof or some other factors.

Step 1625 optionally builds one or more flight map candidates based on the current segments of the flight map plus additional on-flight line and off-flight line recapture segments. It may be advantageous to use both types of additional flight line segments, for example in terms of capture time and/or efficiency.

Step 1630 optionally builds one or more flight map candidates that prioritize the expected property coverage. The flight map candidate may be prepared in order to accelerate the achievement of a high property coverage at the expense of other metrics, for example due to changing environmental conditions that increase the risk of damage to properties (such as severe weather events like cyclones, wildfire or other) or changing environmental conditions that might be expected to cut short the current capture prior to achieving full coverage according to the current flight map resulting in a lower than anticipated property coverage. Alternatively, the flight map may be prepared in order to re-capture specific properties if an event has occurred at that property since it was previously covered. Such events may be communicated using the system communications 420. Alternatively, the list of properties may vary over time, for example (i) as a result of other aerial vehicles not achieving their expected coverage and the operator needing to re-prioritize the current aerial vehicle flight map to compensate. (ii) changed priorities from customers, (iii) or events in nearby regions.

Step 1635 optionally builds one or more candidate flight maps that prioritize the time to complete the flight map. For example, the flight line spacing of the incomplete parts of the flight map may be increased to speed up the survey. For example, if the environmental conditions are such that the current flight map is inefficient, for example due to the aerial vehicle power being too low to maintain a reasonable groundspeed in the face of a strong headwind, then the flight map may be updated, for example based on a set of flight lines at 90 degrees to the current set of flight lines. For example, a flight map based primarily on a set of flight lines oriented North East to South West may have a poor outcome in terms of time to complete the survey, in which case it may make sense to build an alternative flight map covering the same region but based primarily on flight lines oriented North-West to South-East.

Step 1640 optionally builds one or more candidate flight maps that prioritize the weather window available for image capture. For example, if it is known that a bank of weather is moving towards the survey region, it may be desirable to prioritize parts of the survey based on the timing of the change in weather and/or the direction in which it will arrive. For example, if the poor weather is arriving from a particular direction, it may be advantageous to capture the flight lines towards that direction first, so that the candidate update may only require a change in the priority order of capture of flight line segments. Alternatively, if the planned flight line segments are poorly aligned such that re-prioritizing capture would not improve the outcome of the survey, then it may be advantageous to generate a candidate flight map that is better aligned with the arrival of the bank of weather. For example, if bad weather is arriving from the North-East, it may be advantageous to generate a candidate flight map that is oriented predominantly along North-West to South-East flight lines and to prioritize capture of the flight lines furthest to the North-East of the survey region. Candidate flight maps with wider flight line spacing may be generated such that the survey region could be completed faster (and within the weather window) but at a cost of slightly lower quality coverage in terms of vertical and/or oblique and/or other image derived products. Likewise, candidates with narrow flight line spacings may be generated if the weather window is sufficient to permit a survey with a denser capture of images and higher quality coverage. Candidates with narrower flight line spacings may also be advantageous in urban areas where tall buildings (creating so called "urban canyons") cause severe occlusions that may be detected in captured images or may be predicted from the pre-known geometry of the urban area.

Step 1645 optionally builds other candidate flight maps that may combine features of the previously described candidates. They may advantageously use variable altitude in order to fly under obstructions such as clouds, or to reduce the impact of other aerial particulates. They may prioritize the quality or coverage of the photomaps or 3D, etc. The quality of the photomap may be estimated in terms of the expected lean of building in photomaps or other factors.

Figure 17:
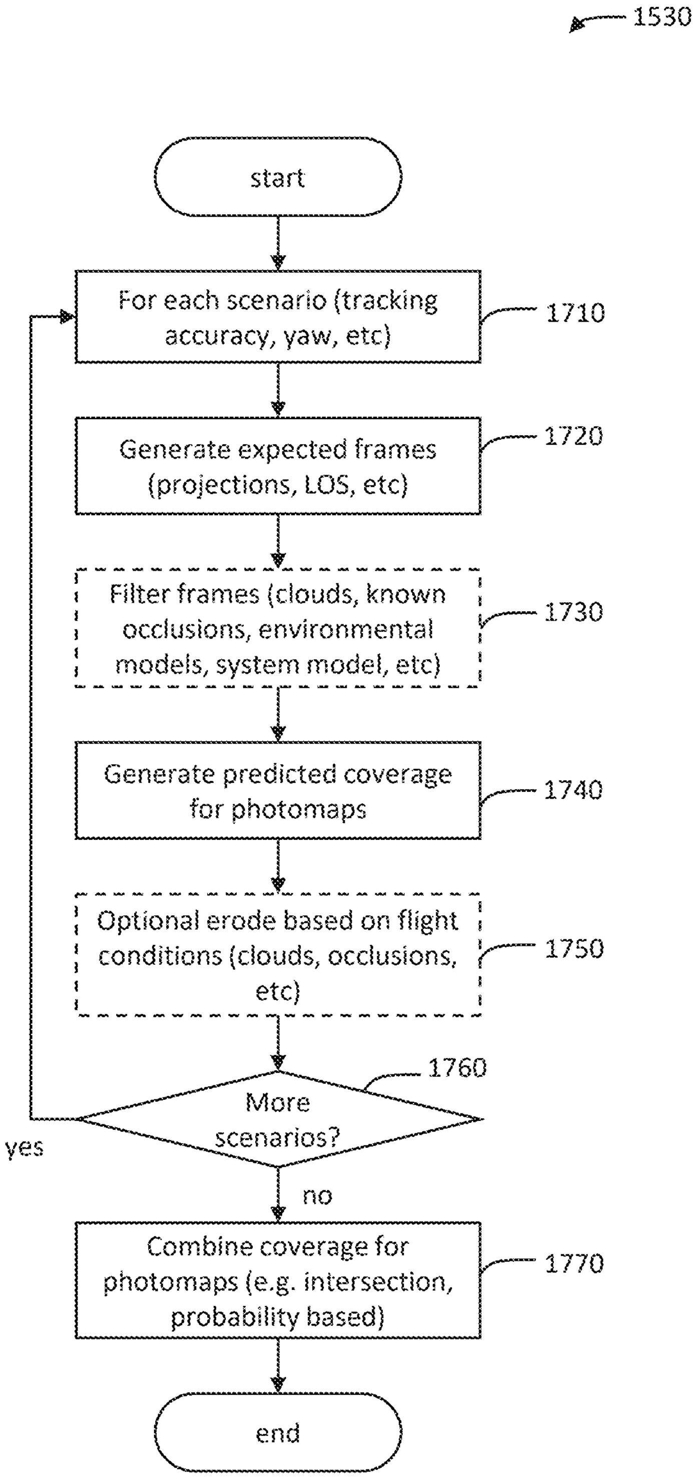
FIG. 17 is flow chart for predicting segment coverage for an incomplete segment according to exemplary aspects of the present disclosure.

FIG. 17 is a flow chart that illustrates the process 1530 of predicting segment coverage from an incomplete flight segment based on the flight line data of the segment, and other factors including the current flight conditions. Starting at step 1710, a set of scenarios are processed in turn that described possible outcomes of capturing images using the camera system flown along the flight segment. The set of scenarios may include:

- a neutral scenario in which the aerial vehicle follows the segment correctly without deviation and without yaw, occlusions, or other factors.
- one or more extreme scenarios in which the aerial vehicle may follow the segment along a worst case location, and/or yaw computed based on a model of the flight conditions such as that described with respect to step 550 of process 500 above.
- one or more scenarios in which the aerial vehicle may follow the segment along a realistic path and with realistic yaw models based for example on a forward prediction model of the aerial vehicle along the flight segment based on a model of the flight conditions and the recent location, pose, flight accuracy and other such data.
- any combination of the above.

These scenarios may define hypershot rates, aerial vehicle location, pose and velocity, etc., over the duration of the capture of the flight line segment.

Step 1720 generates a set of expected frames for the scenario, including for example projection geometries and LOS geometries. These may be generated based partly on a set of pre-computed frame geometries such as the various scan pattern geometries shown in FIG. 1, modified according to the scenario (e.g., in terms of location and pose of the aerial vehicle during each capture). Alternatively, they may be generated directly based on a model of the camera system.

Step 1730 optionally filters the set of expected frames according to various factors that may impact the acceptability of frames captured with the current scenario. For example, it may filter frames expected to be occluded based on occlusions (e.g. clouds, vignetting due to optical path blocking within the aerial vehicle and its optical components, other aerial vehicles, air quality), poor environmental conditions (haze, light conditions, air turbulence), or system issues (e.g., aircraft forced off segment due to limited fuel, pilot error, system error etc.). Step 1730 may use models generated in flight, for example wind and turbulence model updated at step 1820, cloud models updated at step 1830, exposure model updated at 1840 described in further detail below with respect to FIG. 18.

Step 1740 generates predicted coverage for photomaps based on the set of (unfiltered) frames for the scenario based on the projection geometries, LOS, etc., of the frames and the criteria for the photomaps as discussed above with respect to FIG. 3. Next, step 1750 optionally erodes the coverage for photomaps based on a model of flight conditions, expected occlusions, etc. Step 1550 may perform a similar function to step 1730 but may be different in terms of efficiency and accuracy depending on the camera system and other factors.

Next, step 1760 checks for more scenarios, in which case processing returns to step 1710, otherwise it continues to step 1770. Step 1770 combines the set of coverage for photomaps for the scenarios. For example, it may take an intersection the collection of scenario coverage for photomaps of each type (e.g. vertical, oblique N, S, E and W) to create a single photomap of each type. Alternatively, it may form a probabilistic coverage estimate of each photomap type, for example by computing the likelihood of each location in the survey being covered based on a comparison of the set of scenario photomaps of that type. For example, it may compute the fraction of scenario coverage photomaps of each type covering each point on the ground. Following step 1770, processing of step 1530 ends.

Figure 18:
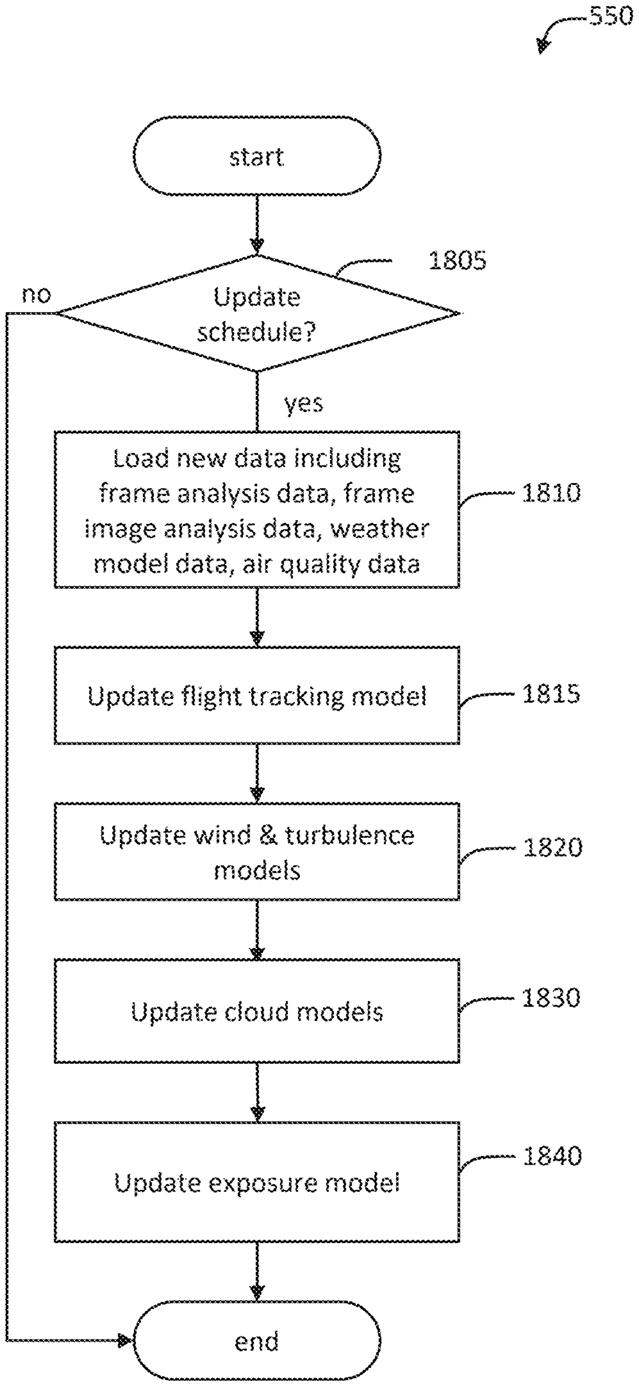
FIG. 18 is a flow chart for updating a flight conditions model according to exemplary aspects of the present disclosure.

FIG. 18 is a flow chart that illustrates the process 550 of updating a flight conditions model based on measured data from the segments of the current flight map. Process 550 may run on a schedule, or based on available computation, or on the availability of new data to update the model. This is controlled by step 1805 which checks if an update should be performed. If not, process 550 ends.

If an update is scheduled, processing continues to step 1810 which loads the most recently generated data including frame analysis data from step 615 described above with respect to FIG. 8, frame image analysis data from step 630, described above with respect to FIG. 9, weather data uploaded to system control by an appropriate communications link 420, flight navigation data from on board navigation systems (GPS, INU, INS, etc.) and other and other instrumentation (compass, anemometer, etc.).

Processing continues to step 1815 which updates a flight tracking model. This model may estimate the perpendicular offset of the aerial vehicle location to the flight lines of the segments of the flight map during the flight or specifically at capture frames. Statistics on the distribution of perpendicular errors in addition to data related to temporal variability of the perpendicular errors (for example coherence times calculated by time series analysis or Fourier analysis, etc.) may be formed as part of the flight tracking accuracy model. Statistics may also be formed on the relative pose of the aerial vehicle to the flight line throughout the flight or specifically at frame capture times. The flight tracking model may be used to assess how accurately the aerial vehicle is tracking the flight map, and based on this model instructions or feedback may be provided to the pilot or autopilot. For example, the instructions may trigger the aerial vehicle to re-stabilize and/or circle back the current segment or an alternative segment to continue the aerial survey.

Processing continues to step 1820 which updates a wind and turbulence model. For example, wind speed and direction at any specific time in flight may be estimated based on the ground velocity of the aircraft and the air velocity of the aircraft. These parameters may be estimated based on data from instruments such as GPS, INU and anemometers on board the aerial vehicle. Alternatively, wind speed may be estimated based on the ground speed and the pose of the aircraft and/or estimates of the instantaneous aircraft thrust. Air turbulence may be estimated from the navigation data and wind model data available to the system control. For example, an air turbulence model may be generated based on the variability in wind speed over time, measured accelerations from navigation data, etc. The accuracy of wind and air turbulence wind models may be improved with inputs from external weather data or air turbulence data that may be available to the system control via the communications link 420.

A secondary air turbulence model made be formed at step 1820 based on suitable data related to the effect of air turbulence effects on light transmission that may affect the quality of imaging through atmospheric layers that may be stored on the aerial vehicle or received by the system control via the communications link 420. This data may take the form of 3D volumetric data and may be used to estimate loss of image quality when capturing along a path through the atmosphere. The data may be used to estimate parameters such as the index of refraction structure constant (C2) along the optical path, the atmospheric coherence length or Fried parameter (ro), or other parameter related to atmospheric "seeing" along the optical path for a captured frame. It may also be used to determine time constants related to turbulence imaging such as the Greenwood time constant, which may be analyzed with respect to the exposure duration of image capture. Suitable air turbulence data may be found, for example, in the Laser Environmental Effects Definition and Reference (LEEDR) Weather Cubes. Suitable data may be found in satellite data such as weather data, for example provided by European Space Agency or other satellite operators.

A third air turbulence model may be generated based on the geometry of the camera system and the aerial vehicle, and the known dynamics of the vehicle in addition to measurements of air velocity or speed, pressure and/or temperatures both of externally but also internally in the aerial vehicle. This model may consider the effect of air flow around the camera system optics in terms of, for example boundary layers and/or shear layers. It may further consider the impact on the sharpness of captured imagery and potentially determine that particular captured frames would not be of acceptable quality.

In some systems, image data may be processed to refine the estimate of atmospheric effects on image quality, for example through processing of sequences of images that follow substantially similar paths through the atmosphere. The processing may be based on relative alignment and sharpness of the image or images and/or may use machine learning techniques to determine properties of the atmosphere and/or the impact of the atmosphere on image quality.

Processing continues to step 1830 which updates a model of clouds in the vicinity of the capture survey. The cloud model is built from the detection of clouds in images, for example at step 910 described above with respect to FIG. 9. Each time a cloud is detected in a captured image, the LOS of the frame capture and the extent of the detected cloud are combined with the current state of the cloud model and used to build confidence in the presence of clouds in through a 3D model. Tomographic methods may be applied to estimate the confidence and extent of cloud objects based on these measurements. Wind models and other atmospheric data such as satellite image derived data accessible via the communications link may be factored into the model-both in terms of adding tomographic data, but also in terms of estimating the motion and dissipation of clouds over time. The cloud model may be accessed to check the likelihood of clouds affecting proposed image captures on candidate flight maps to help to determine the best survey parameters in flight. It is noted that specific spectral data, for example near infrared or other bands outside the visible spectrum, may be particularly useful in the detection and tracking of clouds and these measurements may contribute to the cloud model with larger weightings.

Processing continues to step 1840 which updates an exposure model that may be used to estimate an exposure time at step 745 above. The exposure model may be a function of one or more of the following factors:

- camera parameters (e.g., aperture, focal length, sensor pixel size, etc.).
- line of sight (e.g., azimuth and elevation angles for a frame).
- solar model of sun position relative to the projection geometry of a capture on the ground and the local time of capture.
- vignetting model of blocking of light by parts of the aerial vehicle including apertures within optical components.
- airlight model of scattering and absorption due to particulates in the atmosphere (including haze, etc.).
- ground content (that may be uploaded to the aerial vehicle prior or during to the flight, and updated based on projection geometries and frame images).

The solar model may be a model of the position of the sun, for example in terms of elevation and azimuthal angles, through the day as a function of date, time and location of the aerial vehicle, for example in longitude and latitude. The angle of the sun to the ground affects the expected radiance from the ground captured by the sensor and therefore is an important parameter in estimating exposure time.

The vignetting model may be based on the known geometry of the camera system, its optical components, and the aerial vehicle. It may be used to determine the expected effect of vignetting over a captured image frame.

The airlight model may be a model of the directional scattering and absorption of light by the atmosphere that may be a function of various parameters of an optical path for a capture such as the LOS, the optical path length, the altitude of the imaged ground location, the solar model described above, and other factors. For example, there may be dependence on volumetric or otherwise sampled particulate functions of altitude and/or spatial location, for example through path integrals. There may also be dependence or reliance, at least partly on measurements of aerosols and/or particulates from sources such as satellite or ground measurements (e.g. LEEDR, Purple Air™).

The ground content model may be a model of the ground cover over the survey region, for example in the form of an image with multiple channels corresponding to the spectral capture of the imaging cameras (e.g. red, green, blue and near infra-red). It may be pre-loaded on the aerial vehicle or uploaded via the communications link 420. It may be stored at a lower resolution than the capture resolution for the purpose of reducing processing, storage and data access costs. Image data from fixed, lower resolution, wider field cameras may be suitable for updating the ground content model, for example images from the fixed cameras of the camera systems discussed with respect to FIGS. 1*a* and 1*f* above. The ground content model may handle water bodies and reflective surfaces that may cause specular reflections and overexposure in images.

The many parameters of the exposure model may be updated over time based on some or all of the images captured by the camera system. For example, the parameters may be determined in order to best match the image exposure data and exposure times of many captured images sampled during the flight. The exposure model may be initialized based on average parameters from previous surveys from the current or other aerial vehicles, or expected values based on a model of camera imaging, or other suitable models.

Figure 19:
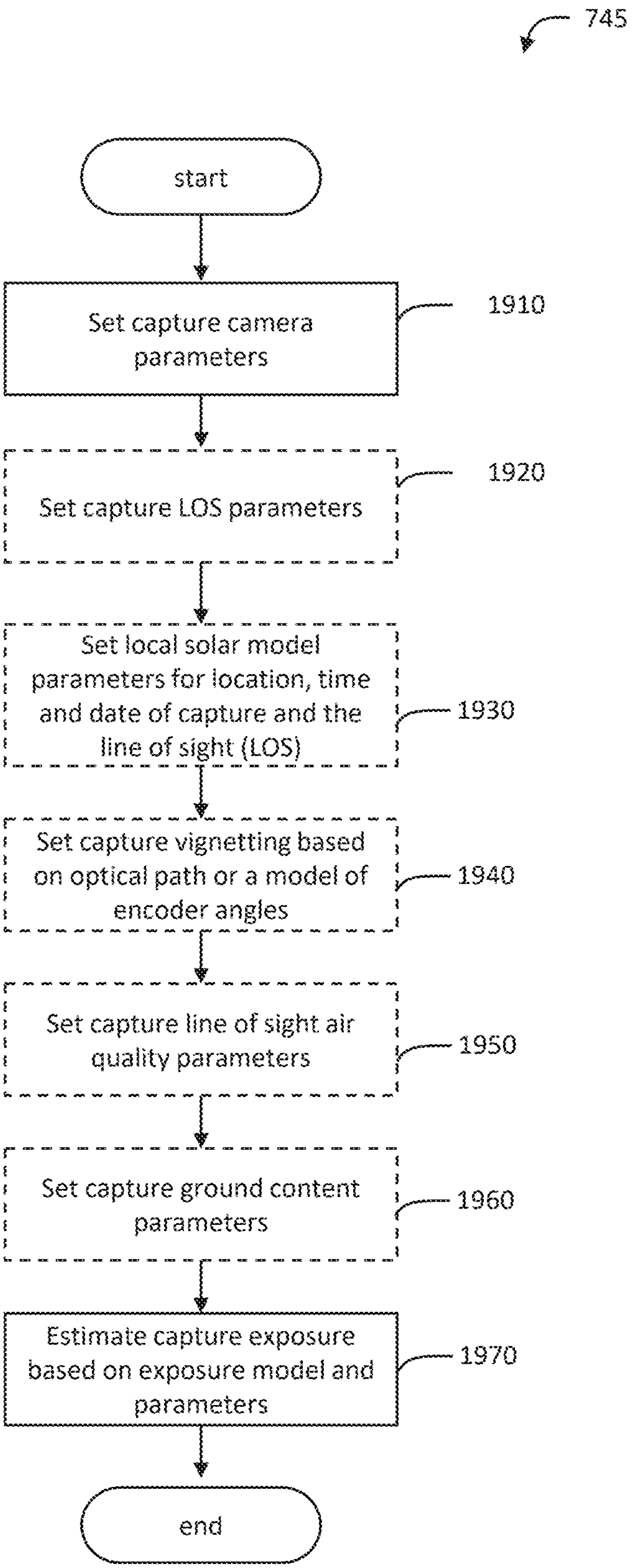
FIG. 19 is a flow chart for estimating exposure time for image capture according to exemplary aspects of the present disclosure.
Figure 20A:
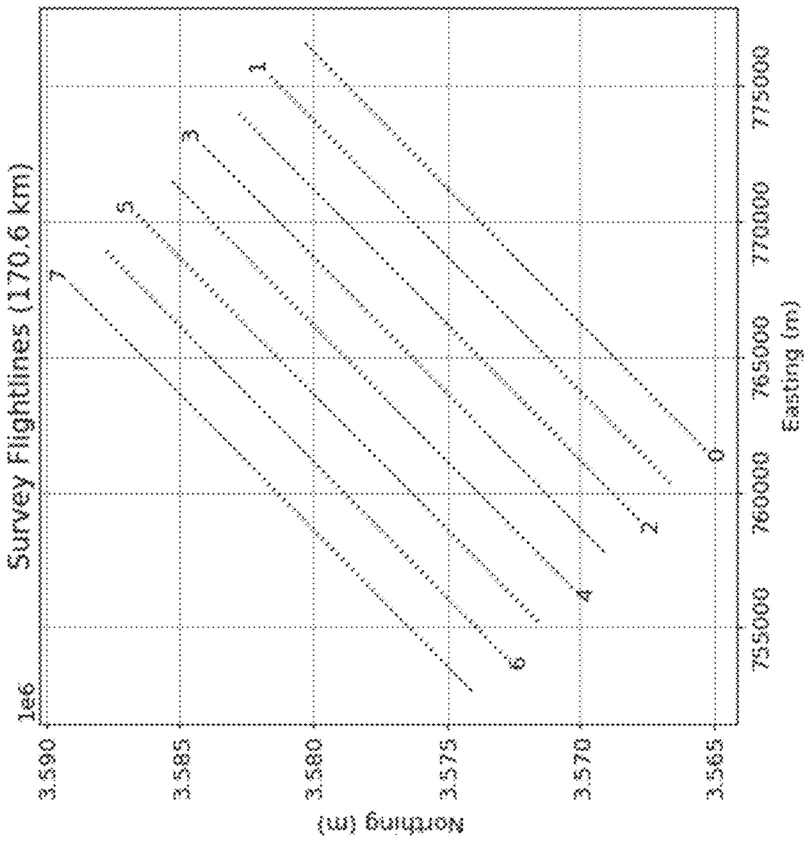
FIG. 20*a* are survey flight lines according to exemplary aspects of the present disclosure.
Figure 20B:
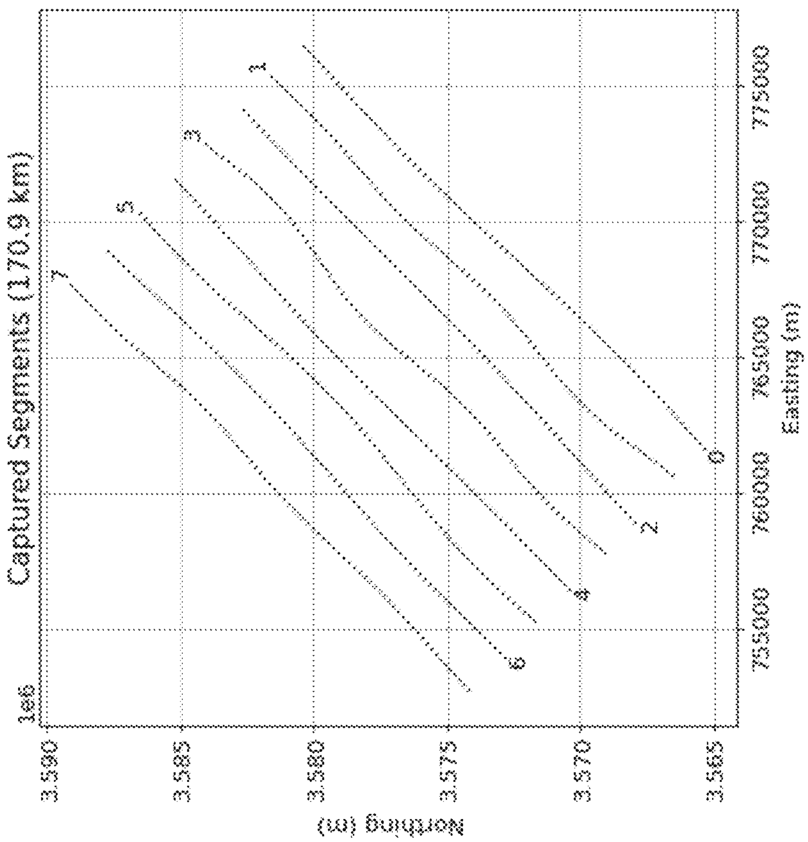
FIG. 20*b* is a set of captured segments according to exemplary aspects of the present disclosure.
Figure 20C:
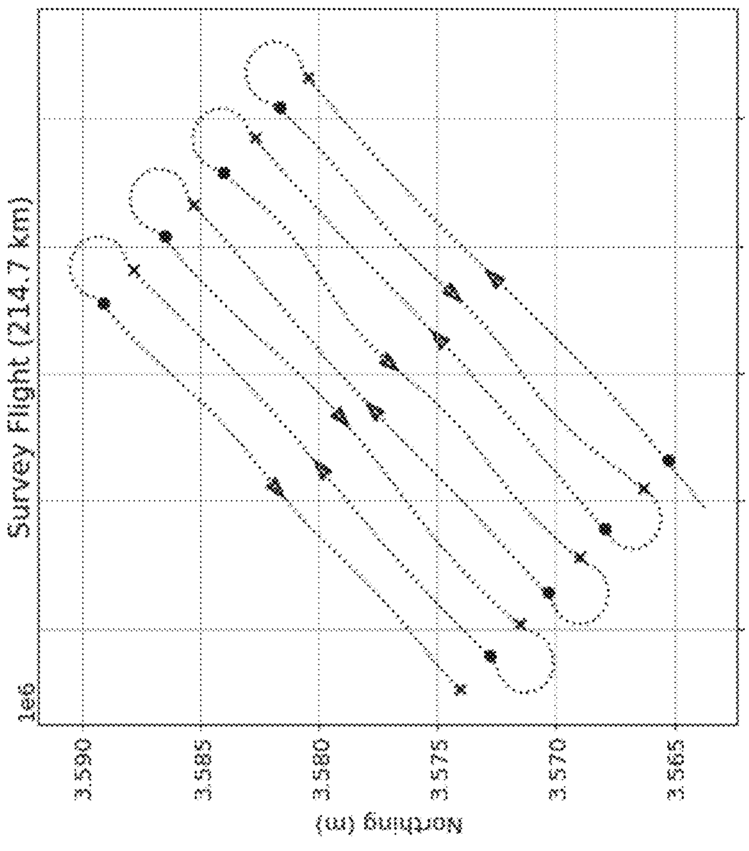
FIG. 20*c* is a survey flight according to exemplary aspects of the present disclosure.
Figure 20D:
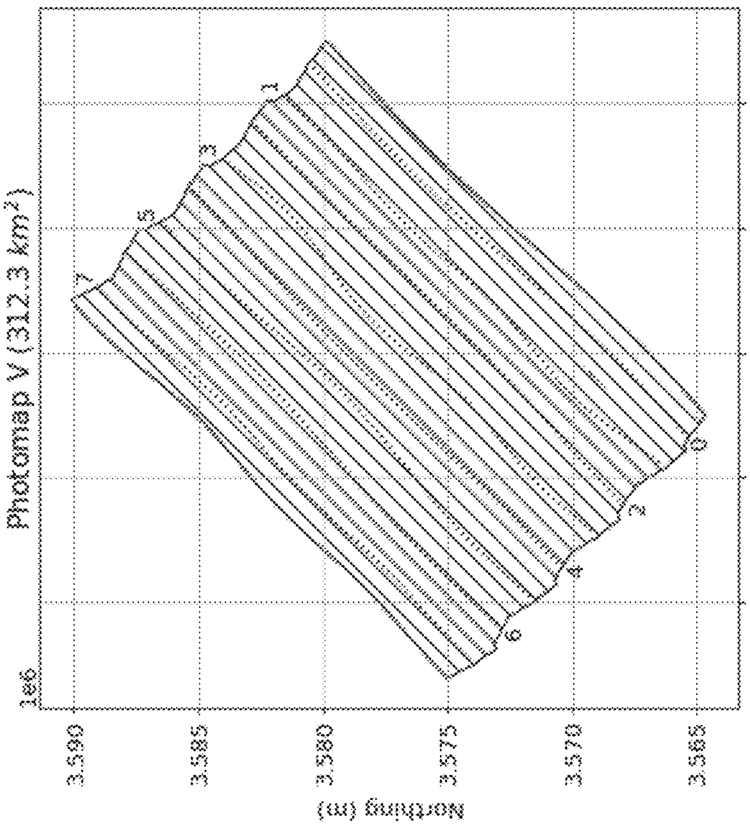
FIG. 20*d* is an illustration of the part of the ground covered by vertical imagery of a vertical photomap according to exemplary aspects of the present disclosure.
Figure 20E:
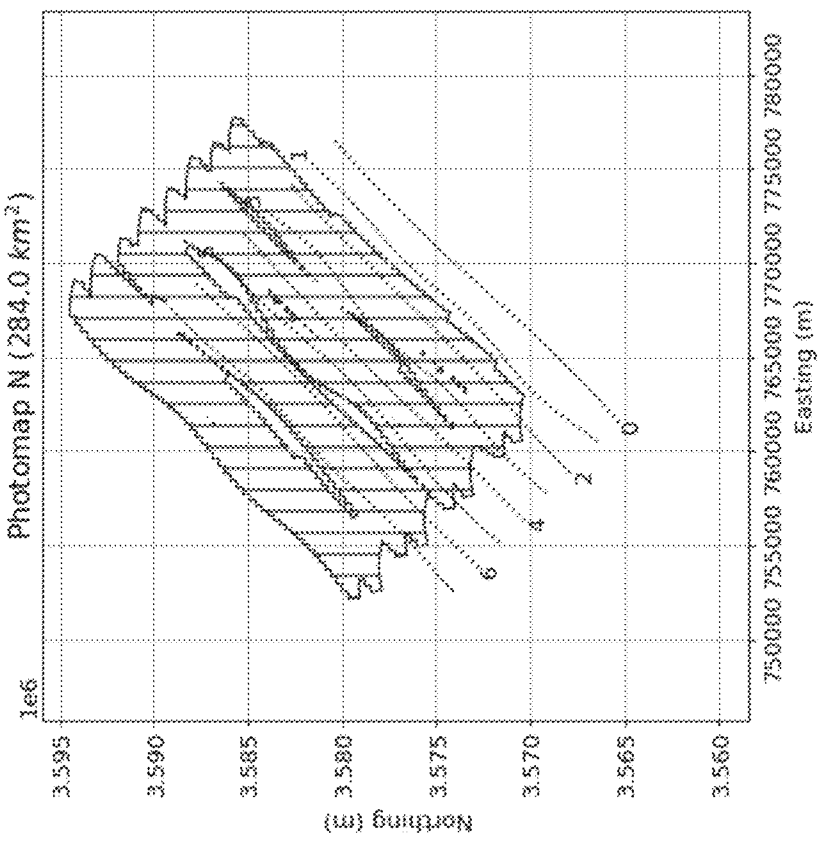
FIG. 20*e* is an illustration of the part of the ground covered by a north directed oblique photomap according to exemplary aspects of the present disclosure.
Figure 20F:
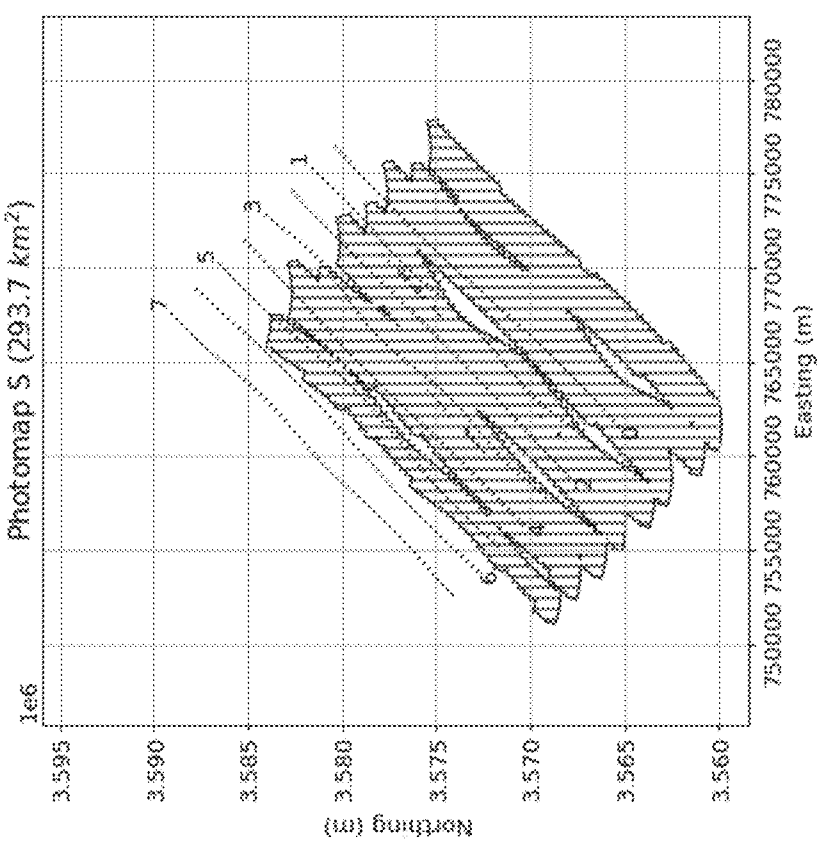
FIG. 20*f* is an illustration of the part of the ground covered by a south directed oblique photomap according to exemplary aspects of the present disclosure.
Figure 20H:
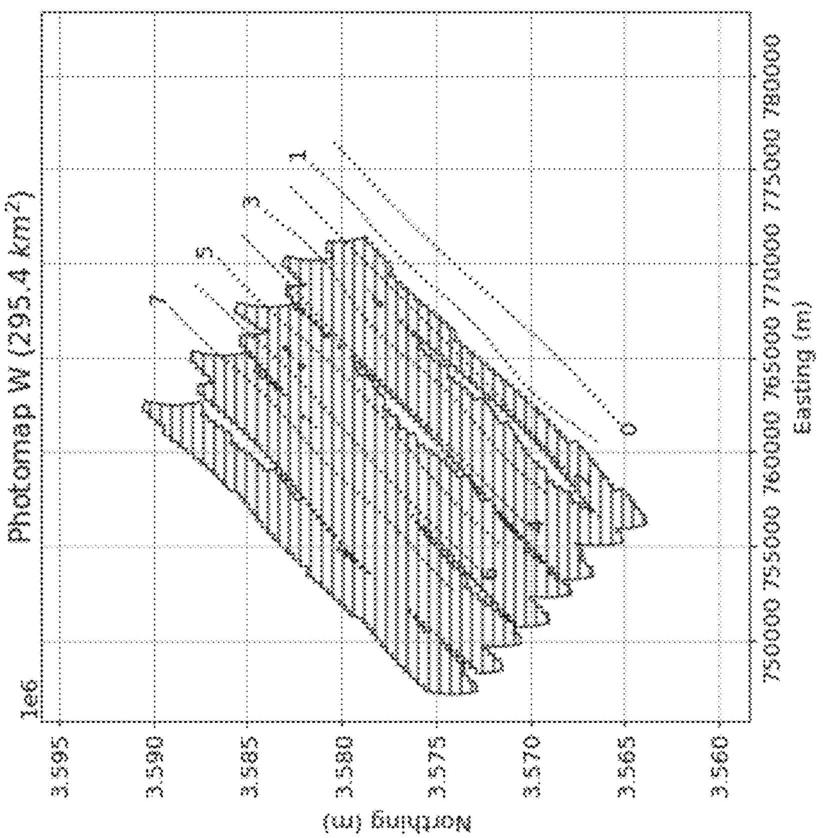
FIG. 20*h* is an illustration of the part of the ground covered by a west directed oblique photomap according to exemplary aspects of the present disclosure.
Figure 20G:
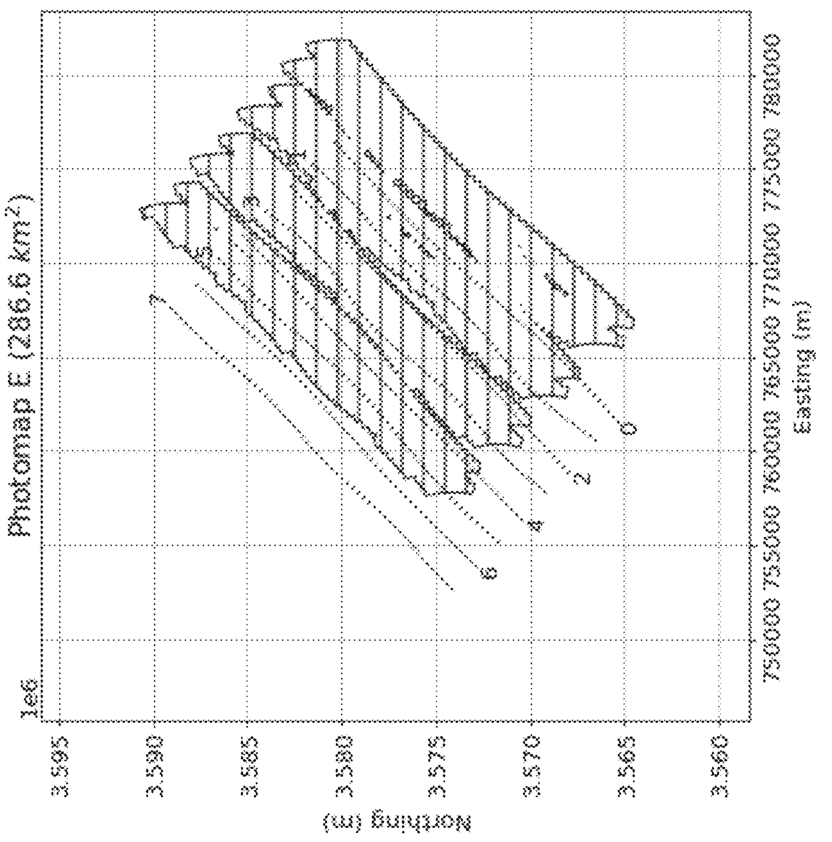
FIG. 20*g* is an illustration of the part of the ground covered by an east directed oblique photomap according to exemplary aspects of the present disclosure.
Figure 21B:
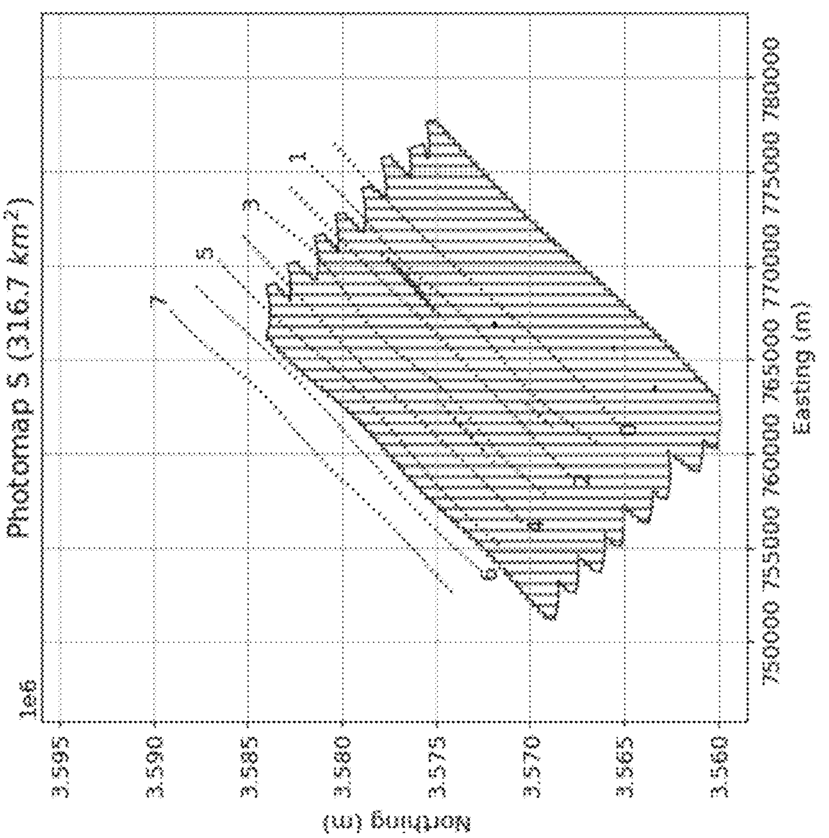
FIG. 21*b* is an illustration of the part of the ground covered by a south directed oblique photomap according to exemplary aspects of the present disclosure.
Figure 21A:
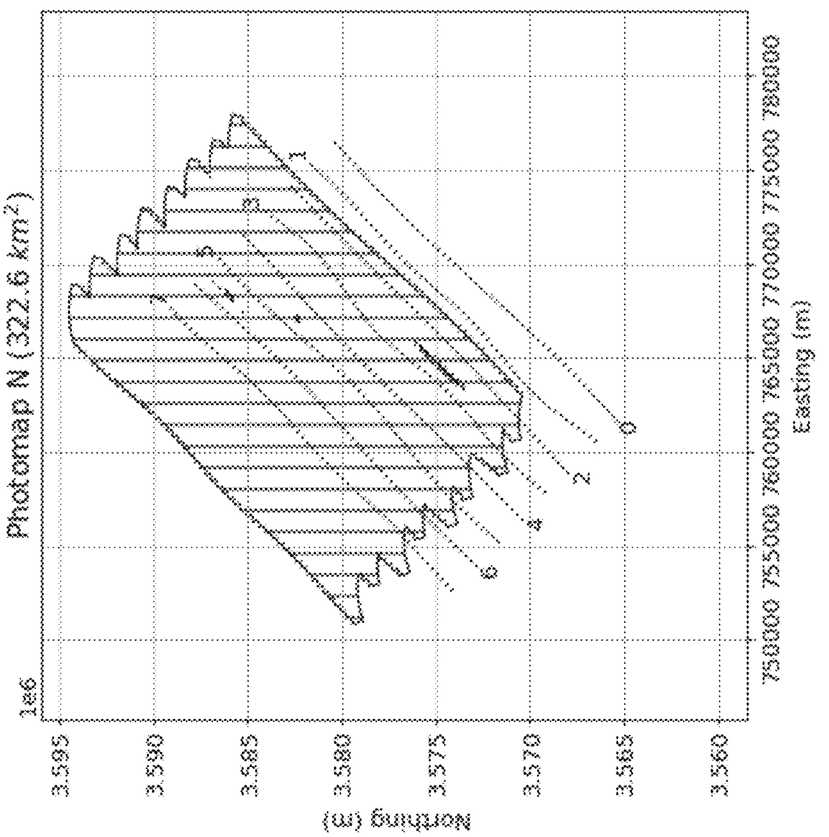
FIG. 21*a* is an illustration of the part of the ground covered by a north directed oblique photomap according to exemplary aspects of the present disclosure.
Figure 21D:
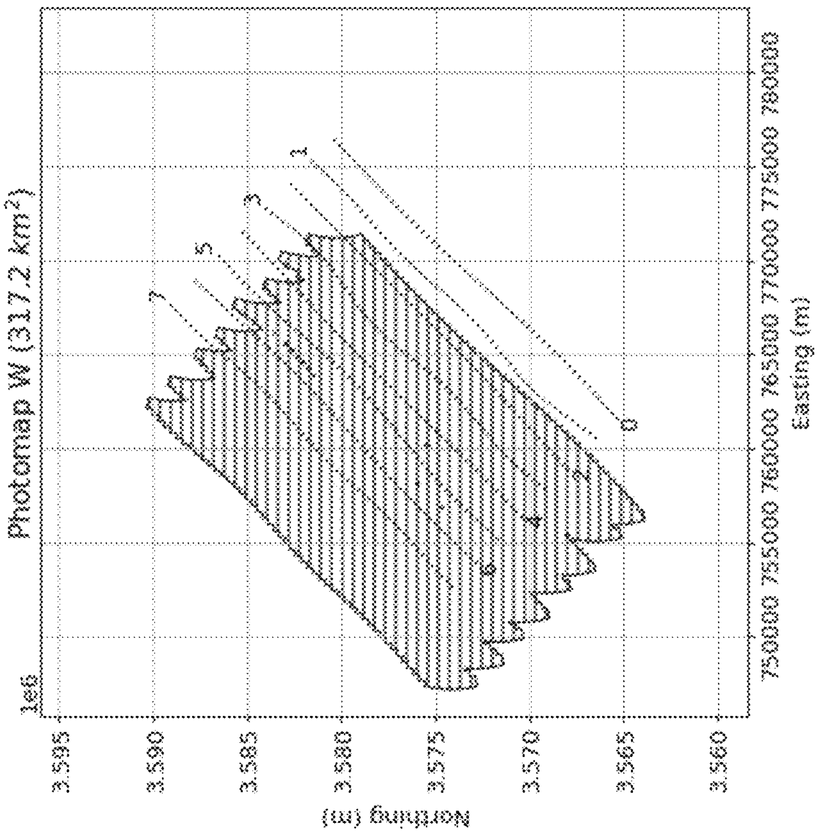
FIG. 21*d* is an illustration of the part of the ground covered by a west directed oblique photomap according to exemplary aspects of the present disclosure.
Figure 21C:
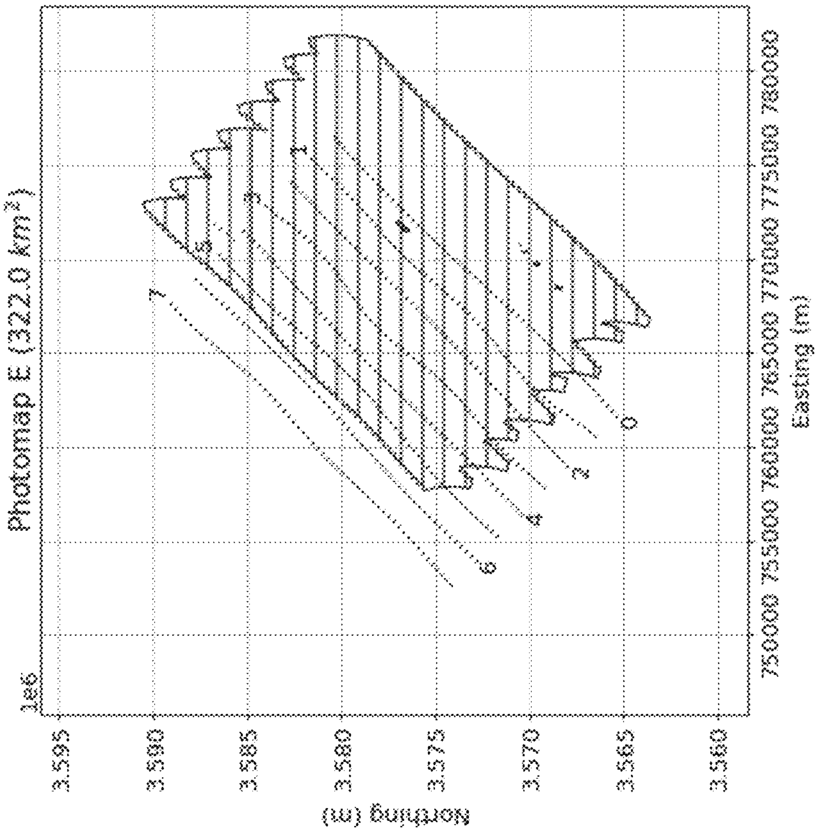
FIG. 21*c* is an illustration of the part of the ground covered by an east directed oblique photomap according to exemplary aspects of the present disclosure.
Figure 22A:
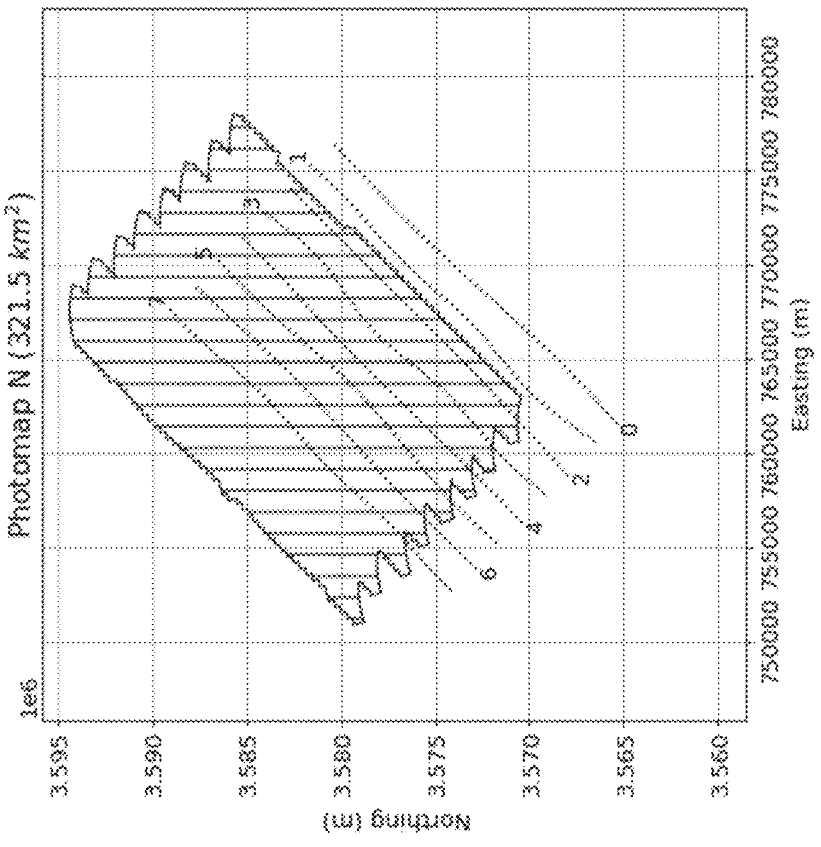
FIG. 22*a* is an illustration of the part of the ground covered by a north directed oblique photomap according to exemplary aspects of the present disclosure.
Figure 22B:
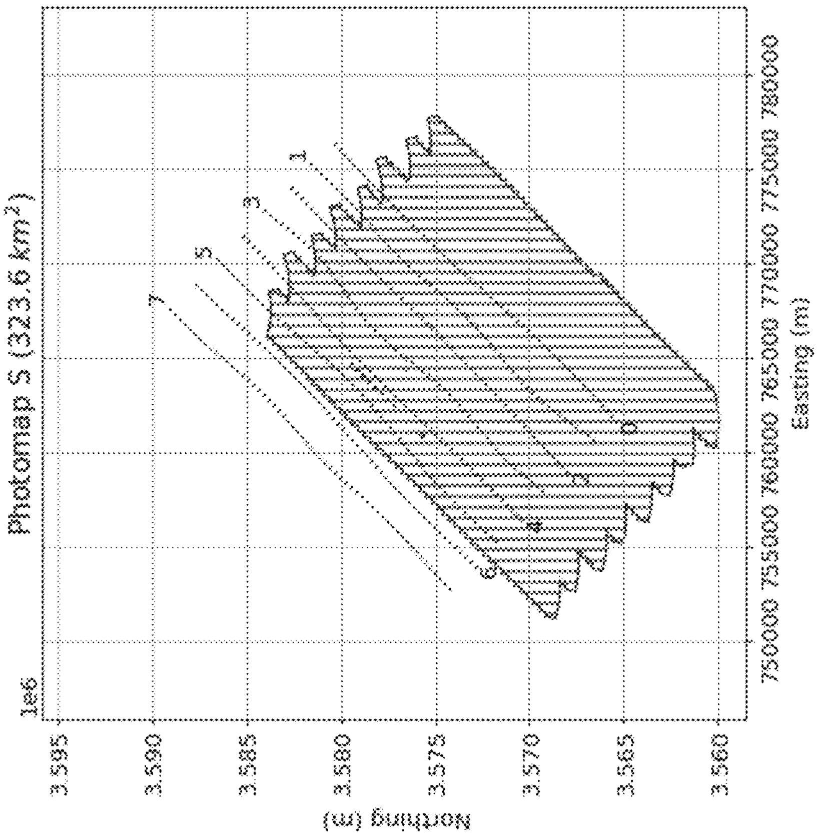
FIG. 22*b* is an illustration of the part of the ground covered by a south directed oblique photomap according to exemplary aspects of the present disclosure.
Figure 22C:
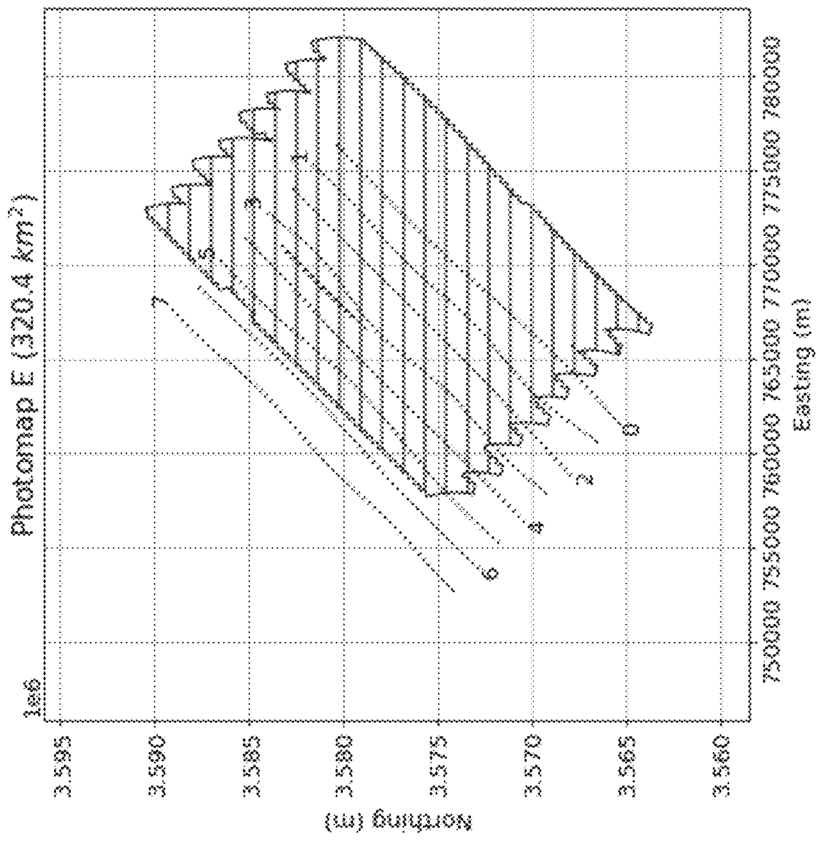
FIG. 22*c* is an illustration of the part of the ground covered by an east directed oblique photomap according to exemplary aspects of the present disclosure.
Figure 22D:
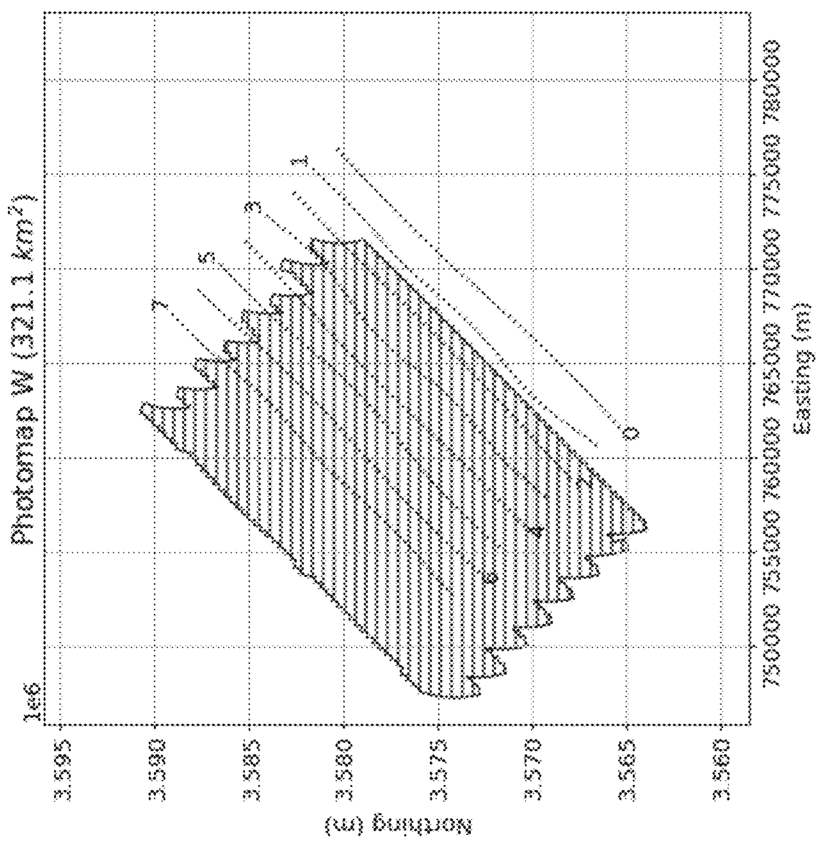
FIG. 22*d* is an illustration of the part of the ground covered by a west directed oblique photomap according to exemplary aspects of the present disclosure.
Figure 23A:
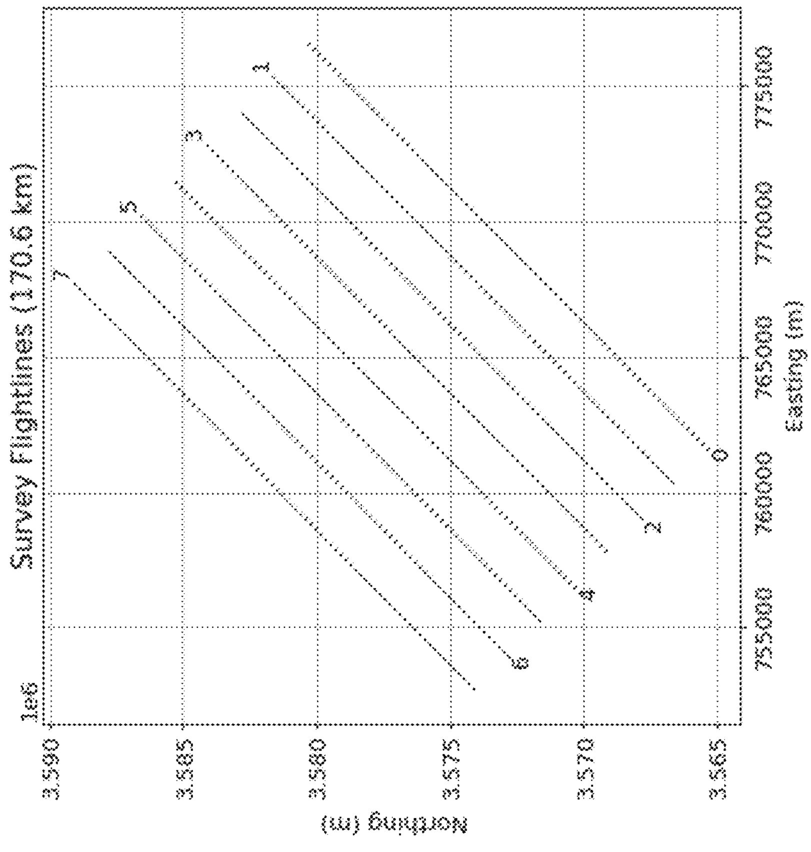
FIG. 23*a* are survey flight lines according to exemplary aspects of the present disclosure.
Figure 23B:
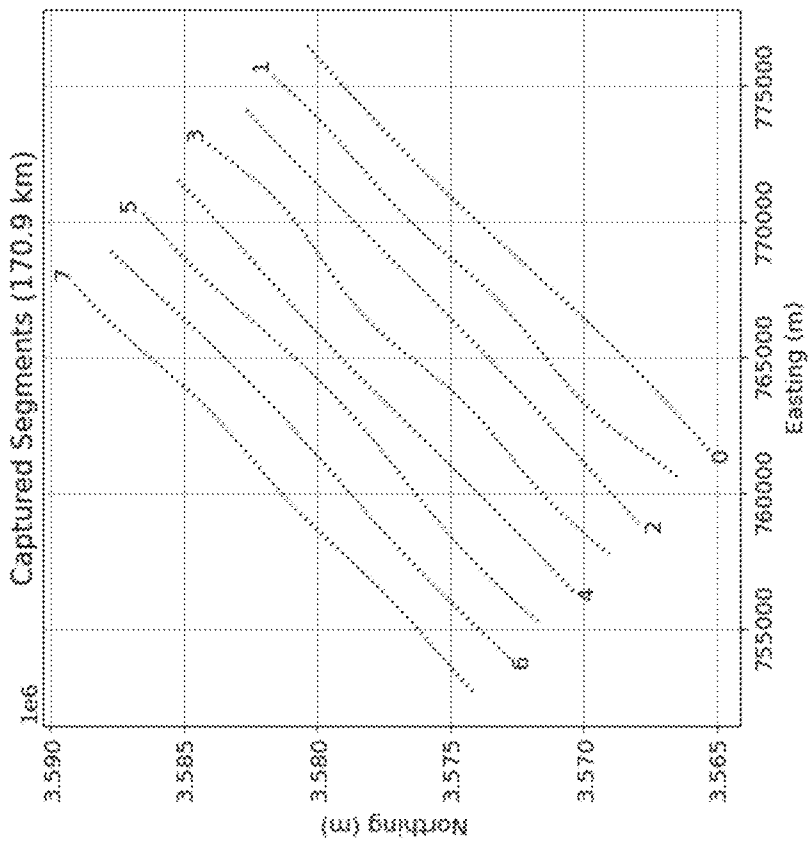
FIG. 23*b* is a set of captured segments according to exemplary aspects of the present disclosure.
Figure 23C:
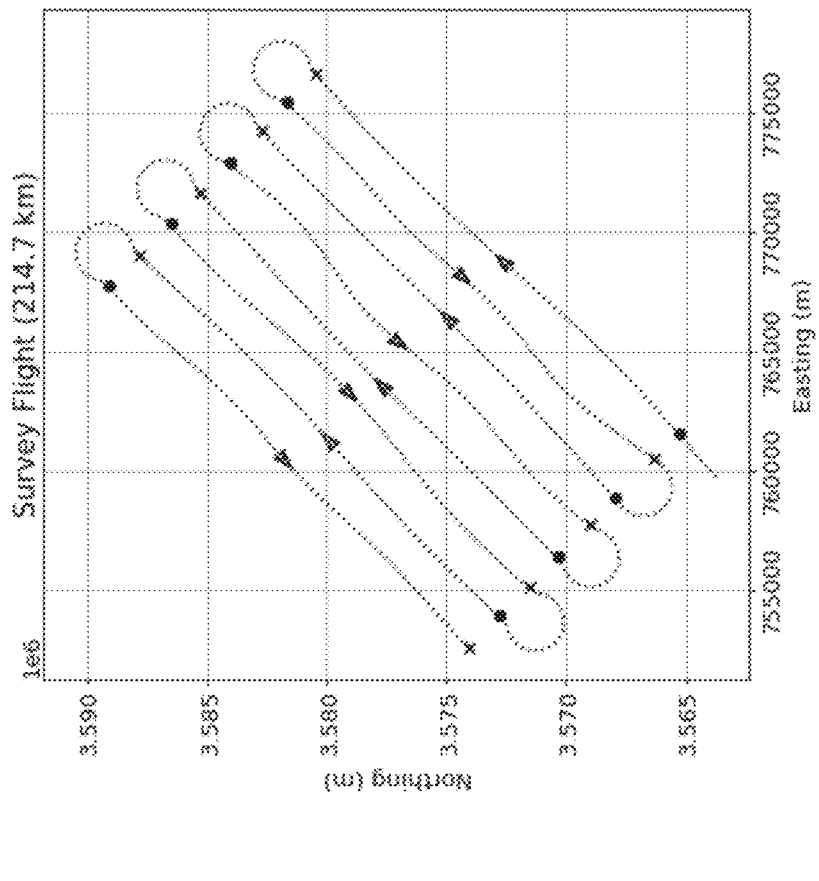
FIG. 23*c* is a survey flight according to exemplary aspects of the present disclosure.
Figure 23D:
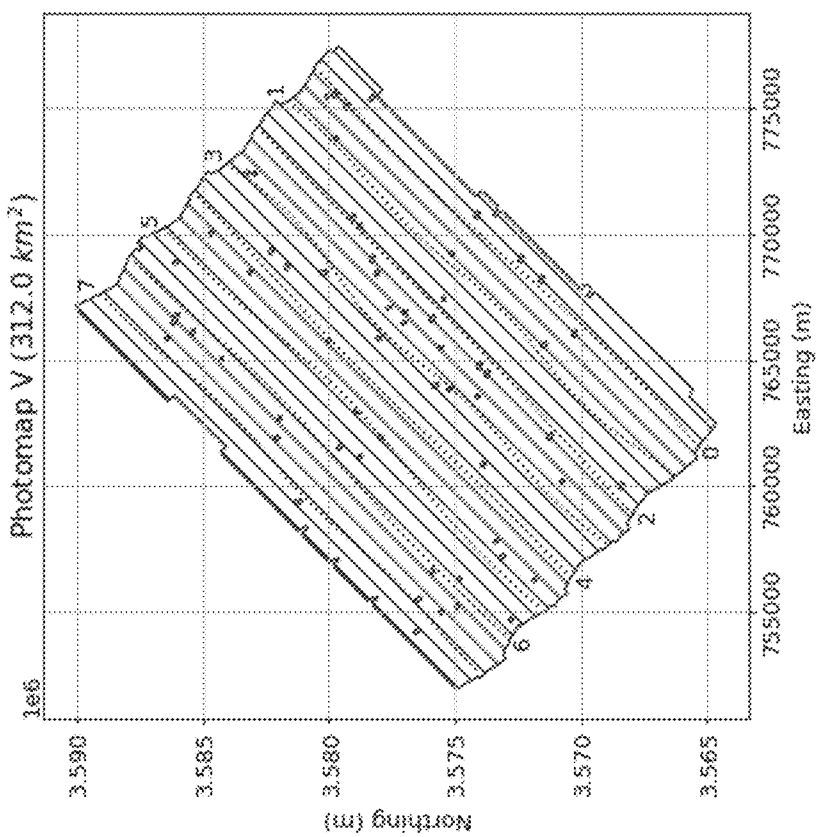
FIG. 23*d* is an illustration of the part of the ground covered by vertical imagery of a vertical photomap according to exemplary aspects of the present disclosure.
Figure 23E:
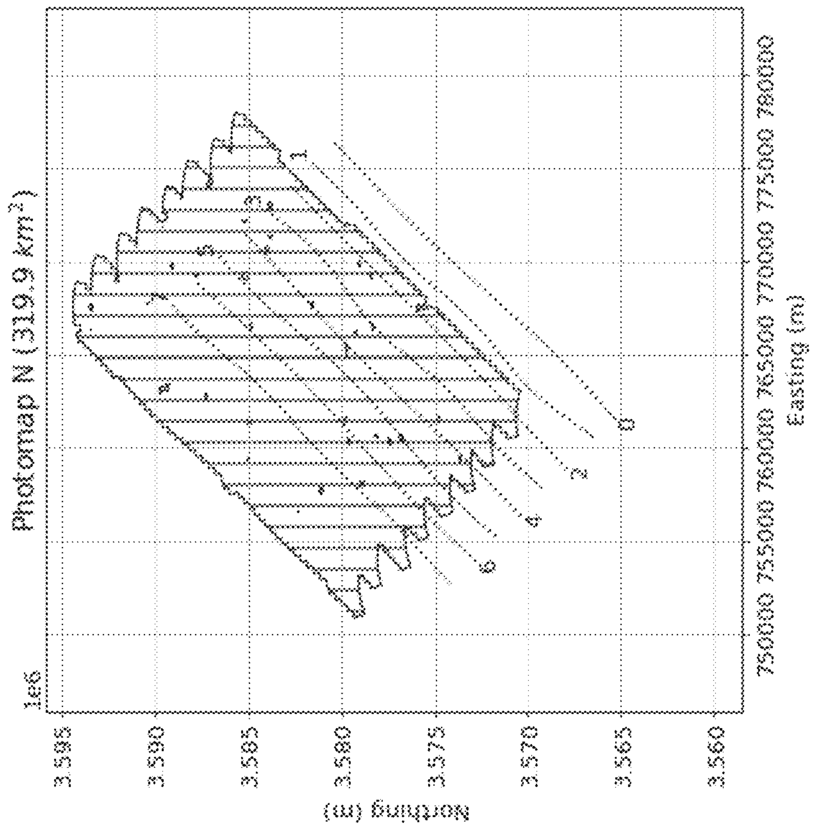
FIG. 23*e* is an illustration of the part of the ground covered by a north directed oblique photomap according to exemplary aspects of the present disclosure.
Figure 23F:
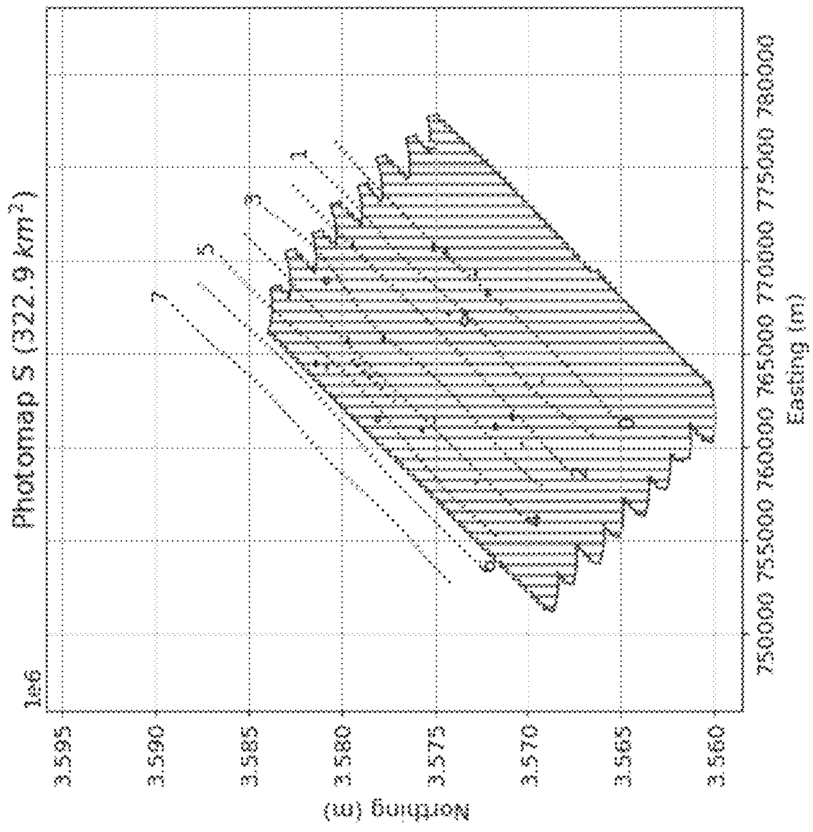
FIG. 23*f* is an illustration of the part of the ground covered by a south directed oblique photomap according to exemplary aspects of the present disclosure.
Figure 23G:
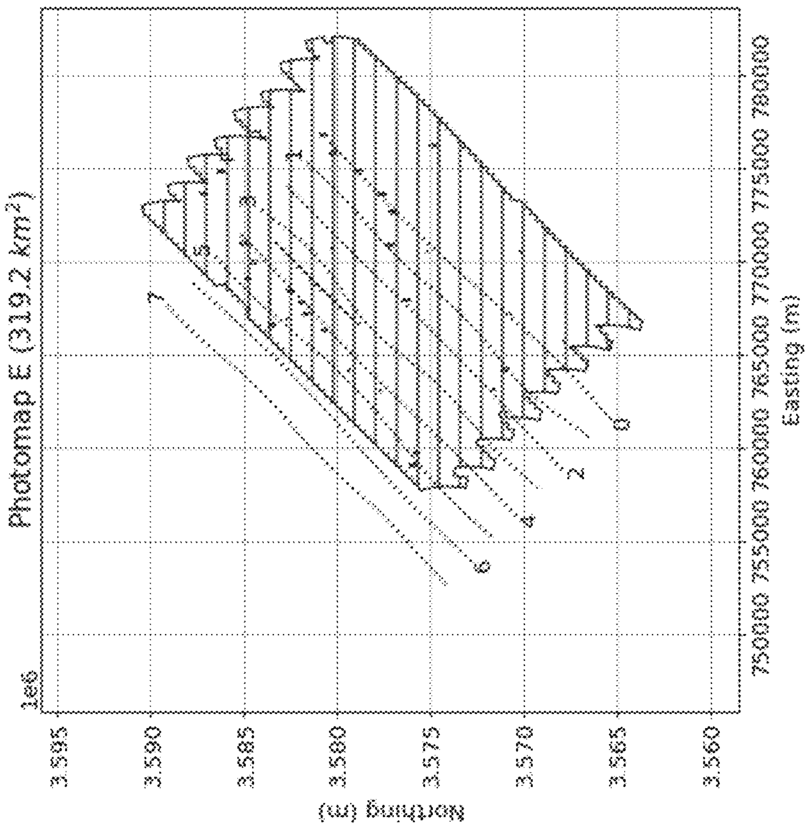
FIG. 23*g* is an illustration of the part of the ground covered by an east directed oblique photomap according to exemplary aspects of the present disclosure.
Figure 23H:
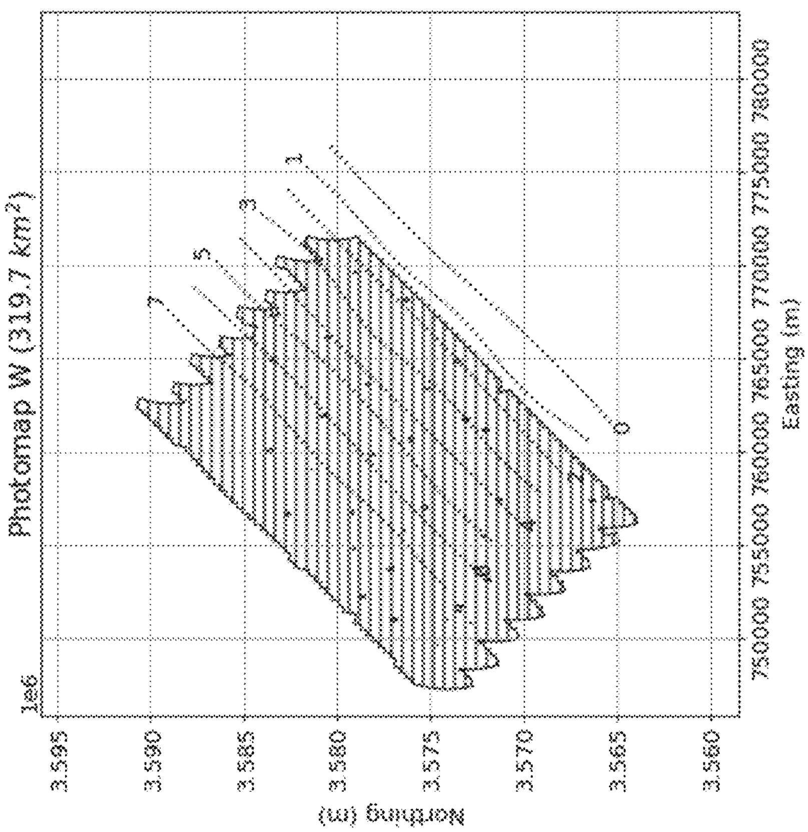
FIG. 23*h* is an illustration of the part of the ground covered by a west directed oblique photomap according to exemplary aspects of the present disclosure.
Figure 24B:
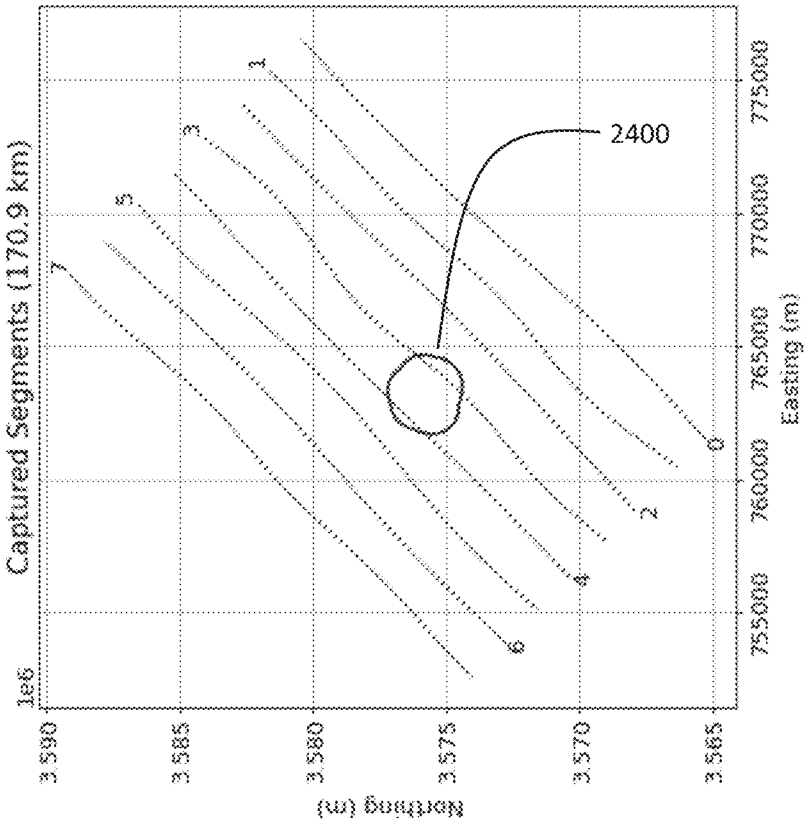
FIG. 24*b* is a set of captured segments according to exemplary aspects of the present disclosure.
Figure 24A:
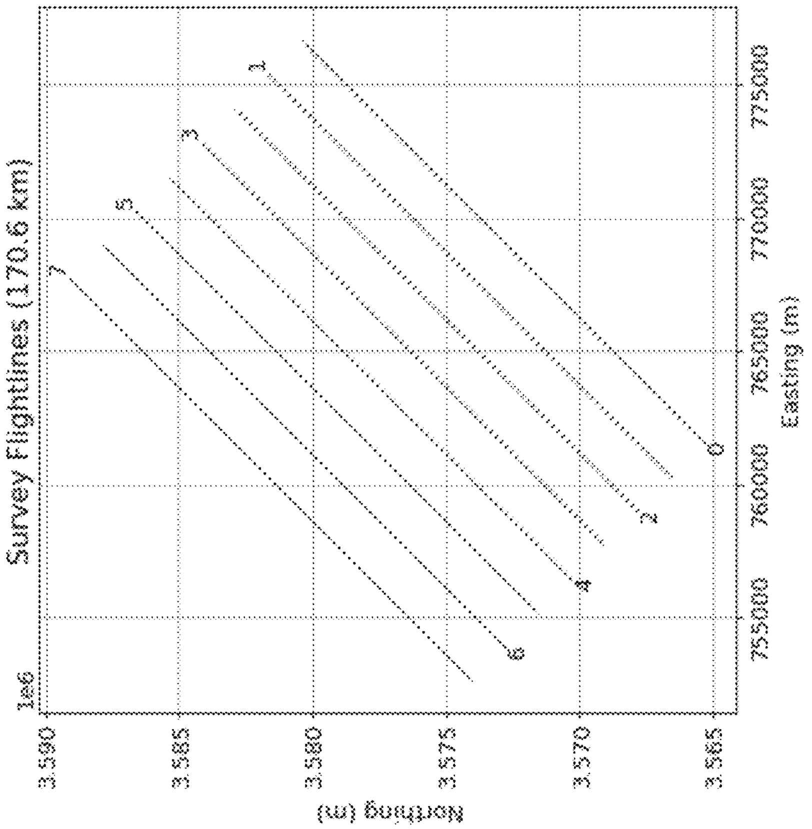
FIG. 24*a* are survey flight lines according to exemplary aspects of the present disclosure.
Figure 24C:
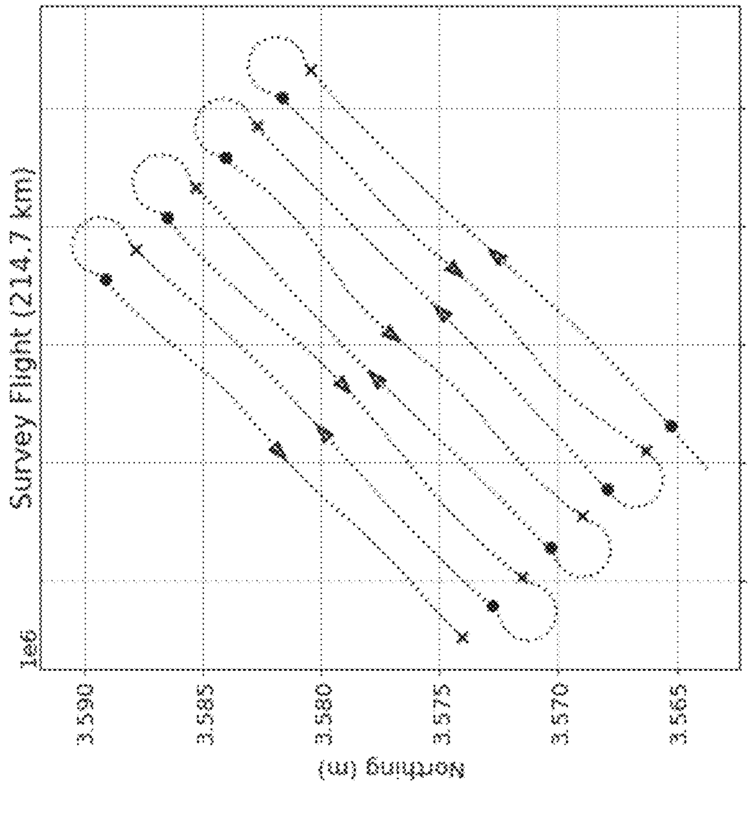
FIG. 24*c* is a survey flight according to exemplary aspects of the present disclosure.
Figure 24D:
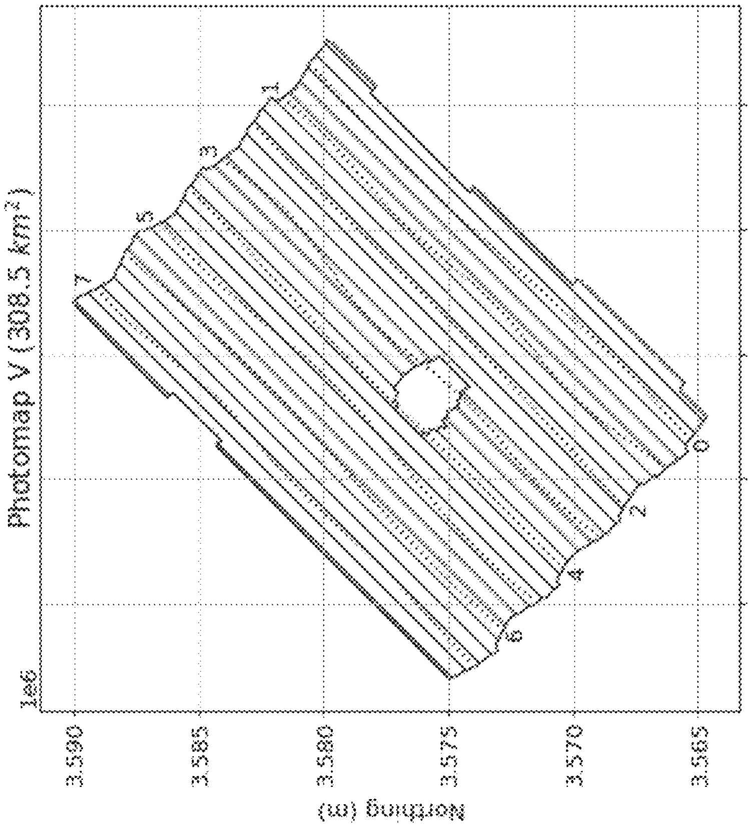
FIG. 24*d* is an illustration of the part of the ground covered by vertical imagery of a vertical photomap according to exemplary aspects of the present disclosure.
Figure 24E:
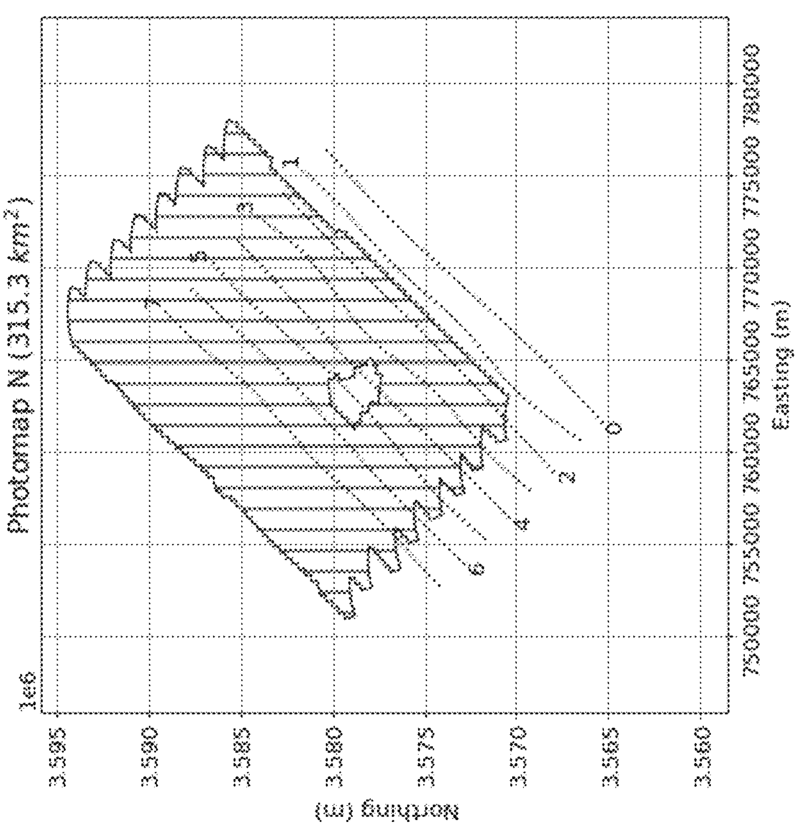
FIG. 24*e* is an illustration of the part of the ground covered by a north directed oblique photomap according to exemplary aspects of the present disclosure.
Figure 24F:
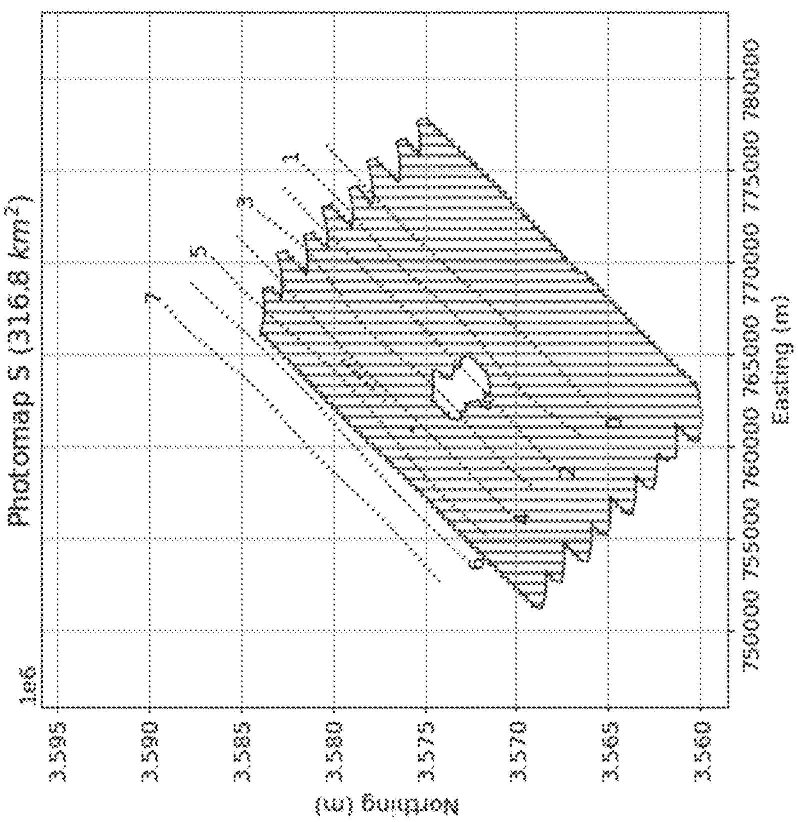
FIG. 24*f* is an illustration of the part of the ground covered by a south directed oblique photomap according to exemplary aspects of the present disclosure.
Figure 24G:
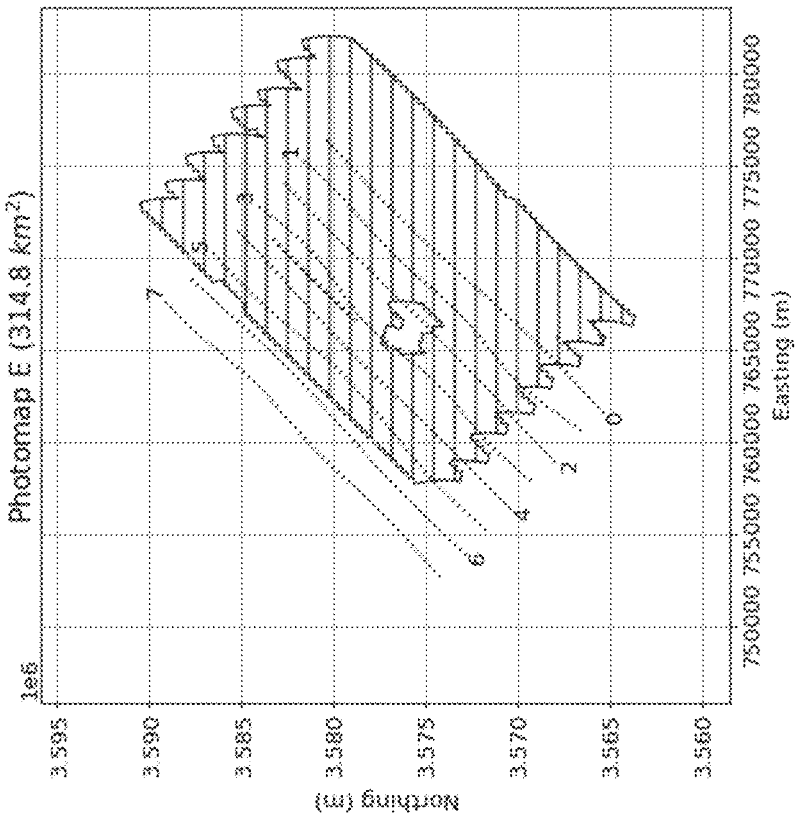
FIG. 24*g* is an illustration of the part of the ground covered by an east directed oblique photomap according to exemplary aspects of the present disclosure.
Figure 24H:
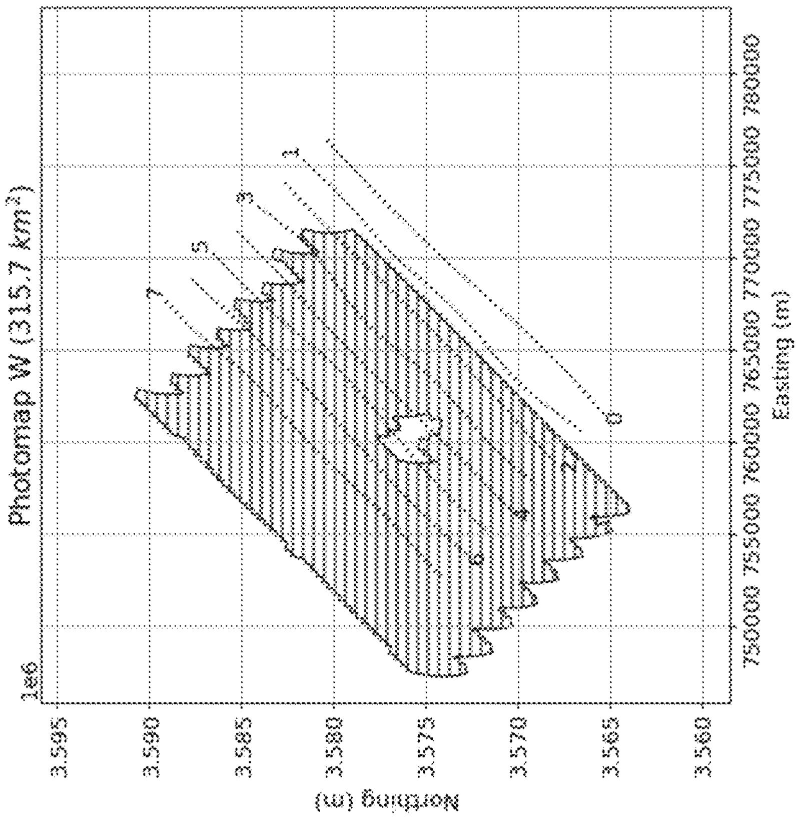
FIG. 24*h* is an illustration of the part of the ground covered by a west directed oblique photomap according to exemplary aspects of the present disclosure.

FIG. 19 is a flow chart that illustrates the process 745 of estimating a suitable exposure time for the capture of an image on one of the cameras of the camera system based on a sampling an exposure model based on a number of sample terms. Processing starts at step 1910 sets the camera parameters for the capture, which may include the identity of the camera of the camera system, and/or parameters such as aperture, focal length and pixel size related to the sampling of light to generate an image on the sensor.

Next, optionally at step 1920 the local solar model parameters are set based on the location, time and date of capture, and the line of sight (LOS). Next at step 1930, the local solar model parameters are set for the location, time, date of capture and the LOS of the frame. These parameters may define the strength and direction of the light incident on the ground. Then optionally at 1940 the capture vignetting parameters may be handled through for example input data related to the pose of the aircraft and the encoder angles of any stabilization platform such as a gimbal and optionally also in terms of a model of the geometry of the camera system and aerial vehicle. Next, optionally at step 1950, the capture line of sight air quality parameters are set, for example based on the altitude of the aerial vehicle, the line of sight of the capture, various data (volumetric or other) related to air quality. Next, optionally at step 1960 the ground content parameters are set based on the ground projection of the capture frame. Processing then continues to step 1970 which estimates an exposure time for the capture based on exposure model and parameters, which is the final step of process 745.

An exemplary version of process 745 may skip all of the optional steps 1920 to 1960 and simply estimate the exposure time based on the exposure time and exposure statistics of the previous frame captured on the current camera, for example by scaling the previous exposure time such that the statistics of the next exposure frame might meet some target, for example a percentage average exposure. Alternatively, it may base the exposure time on the most recent frame capture taken with an LOS within some tolerance of the frame for which the exposure is to be estimate. Alternatively, it may store previous exposure times with respect to LOS and use a time weighted sum over these to estimate an exposure time for a given LOS. This may be achieved using a bank of LOS states that are updated during the flight, for example implemented in terms of a suitable filter or process (e.g. Kalman filter, Gauss Markov Model, etc.). More accurate exposure models may be formed by including inputs based on the optional steps 1920 to 1960 to achieve the desired average exposure more reliably. A reliable estimate of exposure time gives higher quality imagery. An exposure model may also be used to determine whether a capture may require a higher dynamic range capture that may be achieved by fusing capture image data from multiple images with different exposure times The scanning camera system is suitable for deployment in a wide range of aerial vehicles for operation over a variety of operating altitudes and ground speeds, with a range of GSDs and capture efficiencies. Additionally, it is robust to a range of operating conditions such as variable wind and turbulence conditions that result in dynamic instabilities such as roll, pitch and yaw of the aerial vehicle. By way of example, this includes (but is not limited to) twin piston aircraft such as a Cessna 310, turboprop aircraft such as a Beechworth KingAir 200 and 300 series, and turbofan (jet)

aircraft such as a Cessna Citation, allowing aerial imaging from low altitudes to altitudes in excess of 40,000 feet, at speeds ranging from less than 100 knots to over 500 knots. The aircraft may be unpressurized or pressurized, and each survey hole may be open or contain an optical glass window as appropriate. Each survey hole may be optionally protected by a door which can be closed when the camera system is not in operation. Other suitable aerial vehicles include drones, unmanned aerial vehicles (UAV), airships, helicopters, quadcopters, balloons, spacecraft and satellites.

It is noted that the scanning camera system may use an overview camera in order to achieve certain photogrammetry related requirements. The flight line spacings may be selected based on maximum obliqueness of vertical imagery, and the overview camera sensor and focal length should be selected such that the projective geometry 115 of the overview camera is sufficient to achieve those requirements with a given flight line spacing.

The present disclosure may be embodied as a system, a method, and/or a computer program product. The computer program product may include a computer readable storage medium on which computer readable program instructions are recorded that may cause one or more processors to carry out aspects of the embodiment.

The computer readable storage medium may be a tangible device that can store instructions for use by an instruction execution device (processor). The computer readable storage medium may be, for example, but is not limited to, an electronic storage device, a magnetic storage device, an optical storage device, an electromagnetic storage device, a semiconductor storage device, or any appropriate combination of these devices. A non-exhaustive list of more specific examples of the computer readable storage medium includes each of the following (and appropriate combinations): flexible disk, hard disk, solid-state drive (SSD), random access memory (RAM), read-only memory (ROM), erasable programmable read-only memory (EPROM or Flash), static random access memory (SRAM), compact disc (CD or CD-ROM), digital versatile disk (DVD) and memory card or stick. A computer readable storage medium, as used in this disclosure, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described in this disclosure can be downloaded to an appropriate computing or processing device from a computer readable storage medium or to an external computer or external storage device via a global network (i.e., the Internet), a local area network, a wide area network and/or a wireless network. The network may include copper transmission wires, optical communication fibers, wireless transmission, routers, firewalls, switches, gateway computers and/or edge servers. A network adapter card or network interface in each computing or processing device may receive computer readable program instructions from the network and forward the computer readable program instructions for storage in a computer readable storage medium within the computing or processing device.

Computer readable program instructions for carrying out operations of the present disclosure may include machine language instructions and/or microcode, which may be compiled or interpreted from source code written in any combination of one or more programming languages, including assembly language, Basic, Fortran, Java, Python, R, C, C++, C# or similar programming languages. The computer readable program instructions may execute entirely on a user's personal computer, notebook computer, tablet, or smartphone, entirely on a remote computer or computer server, or any combination of these computing devices. The remote computer or computer server may be connected to the user's device or devices through a computer network, including a local area network or a wide area network, or a global network (i.e., the Internet). In some embodiments, electronic circuitry including, for example, programmable logic circuitry, field-programmable gate arrays (FPGA), or programmable logic arrays (PLA) may execute the computer readable program instructions by using information from the computer readable program instructions to configure or customize the electronic circuitry, in order to perform aspects of the present disclosure.

Aspects of the present disclosure are described herein with reference to flow diagrams and block diagrams of methods, apparatus (systems), and computer program products according to embodiments of the disclosure. It will be understood by those skilled in the art that each block of the flow diagrams and block diagrams, and combinations of blocks in the flow diagrams and block diagrams, can be implemented by computer readable program instructions.

The computer readable program instructions that may implement the systems and methods described in this disclosure may be provided to one or more processors (and/or one or more cores within a processor) of a general purpose computer, special purpose computer, or other programmable apparatus to produce a machine, such that the instructions, which execute via the processor of the computer or other programmable apparatus, create a system for implementing the functions specified in the flow diagrams and block diagrams in the present disclosure. These computer readable program instructions may also be stored in a computer readable storage medium that can direct a computer, a programmable apparatus, and/or other devices to function in a particular manner, such that the computer readable storage medium having stored instructions is an article of manufacture including instructions which implement aspects of the functions specified in the flow diagrams and block diagrams in the present disclosure.

The computer readable program instructions may also be loaded onto a computer, other programmable apparatus, or other device to cause a series of operational steps to be performed on the computer, other programmable apparatus or other device to produce a computer implemented process, such that the instructions which execute on the computer, other programmable apparatus, or other device implement the functions specified in the flow diagrams and block diagrams in the present disclosure.

Obviously, numerous modifications and variations of the present disclosure are possible in light of the above teachings. It is therefore to be understood that within the scope of the appended claims, the disclosure may be practiced otherwise than as specifically described herein.

The invention claimed is:

1. A method of performing an adaptive aerial survey comprising:

capturing images of a target area, by at least one camera system disposed on an aerial vehicle, as the aerial vehicle travels along a flight map that includes a plurality of flight lines;

determining, as the aerial vehicle continues to travel along the fight map, coverage of the target area based on the images captured by the at least one camera system; and adjusting, as the aerial vehicle continues to travel along the flight map, the flight map and an orientation of the at least one camera system based on the coverage of the target area determined based on the images captured by the at least one camera system, wherein determining coverage of the target area based on the images captured by the at least one camera system includes determining unacceptable images based on whether the images include an occlusion, are blurred, have incorrect exposure, or are erroneously directed, and wherein the method further comprises:

predicting coverage of the target area based on the images of the target area captured by the at least one camera system; and further adjusting at least one of the flight map and an orientation of the at least one camera system based on the coverage of the target area predicted.

2. The method according to claim 1, wherein adjusting at least one of the flight map and the orientation of the at least one camera system further includes modifying at least one of the plurality of flight lines included in the flight map.

3. The method according to claim 1, wherein adjusting at least one of the flight map and the orientation of the at least one camera system further includes adding at least one flight line to the plurality of flight lines included in the flight map.

4. The method according to claim 1, wherein adjusting at least one of the flight map and the orientation of the at least one camera system includes controlling a gimbal on which the at least one camera system is mounted in order to adjust the orientation of the at least one camera system.

5. The method according to claim 1, wherein the at least one camera system captures a plurality of images in a predetermined coverage pattern.

6. The method according to claim 5, wherein the plurality of images includes at least one of oblique images and vertical images.

7. The method according to claim 1, wherein the target area includes a property of interest, and coverage of a portion of the target area including the property of interest is prioritized over coverage of other portions of the target area.

8. The method according to claim 7, wherein adjustment of at least one of the flight map and an orientation of the at least one camera system is based on prioritization of the portion of the target area including the property of interest.

9. The method according to claim 1, wherein determining coverage of the target area based on the images captured by the at least one camera system further includes determining coverage of the target area based on at least one of vertical imagery, oblique imagery, and three-dimensional data corresponding to the target area.

10. The method according to claim 1, wherein the occlusions are due to at least one of cloud cover, other aerial vehicles, or vignetting.

11. The method according to claim 1, further comprising excluding images determined to be unacceptable.

12. The method according to claim 1, wherein the determining and adjusting steps are performed at a ground station, and the method further comprises:

transmitting, from the aerial vehicle to the ground station, the images of the target area captured by the at least one camera system; and receiving, at the aerial vehicle at least one of an updated flight map and a new orientation for the at least one camera system, from the ground station.

13. The method according to claim 1, wherein the camera system includes a scanning camera.

14. The method according to claim 1, wherein the camera system includes a fixed camera.

15. The method according to claim 1, wherein the camera system includes a combination of a scanning camera and a fixed camera.

16. A non-transitory computer-readable medium storing computer-readable instructions that, when executed by processing circuitry, cause the processing circuitry to perform a method comprising:

capturing images of a target area, by at least one camera system disposed on an aerial vehicle, as the aerial vehicle travels along a flight map that includes a plurality of flight lines;

determining, as the aerial vehicle continues to travel along the fight map, coverage of the target area based on the images captured by the at least one camera system; and adjusting, as the aerial vehicle continues to travel along the fight map, the flight map and an orientation of the at least one camera system based on the coverage of the target area determined based on the images captured by the at least one camera system, wherein determining coverage of the target area based on the images captured by the at least one camera system includes determining unacceptable images based on whether the images include an occlusion, are blurred, have incorrect exposure, or are erroneously directed, and wherein the method further comprises:

predicting coverage of the target area based on the images of the target area captured by the at least one camera system; and further adjusting at least one of the flight map and an orientation of the at least one camera system based on the coverage of the target area predicted.

17. A control system for controlling adaptive aerial surveys, comprising circuitry configured to:

capture images of a target area, by at least one camera system disposed on an aerial vehicle, as the aerial vehicle travels along a flight map that includes a plurality of flight lines;

determine, as the aerial vehicle continues to travel along the fight map, coverage of the target area based on the images captured by the at least one camera system; and adjust, as the aerial vehicle continues to travel along the fight map, the flight map and an orientation of the at least one camera system based on the coverage of the target area determined based on the images captured by the at least one camera system, wherein to determine coverage of the target area based on the images captured by the at least one camera system, the circuitry determines unacceptable images based on whether the images include an occlusion, are blurred, have incorrect exposure, or are erroneously directed, and wherein the circuitry is further configured to:

predict coverage of the target area based on the images of the target area captured by the at least one camera system; and further adjust at least one of the flight map and an orientation of the at least one camera system based on the coverage of the target area predicted.

* * * * *